United States Patent [19]
Iiboshi et al.

[11] Patent Number: 6,102,012
[45] Date of Patent: Aug. 15, 2000

[54] AIR HEATER FOR AIR CLEANER

[75] Inventors: Tomohiro Iiboshi; Masahiro Kikuchi; Ikuo Takeishi; Seiji Tomita; Atsuhiko Sakamoto; Masatoshi Tanioka, all of Wako, Japan

[73] Assignee: Honda Giken Kogyo Kabushiki Kaisha, Tokyo, Japan

[21] Appl. No.: 09/267,346

[22] Filed: Mar. 15, 1999

[30] Foreign Application Priority Data

| Apr. 15, 1998 | [JP] | Japan | 10-104433 |
| Apr. 22, 1998 | [JP] | Japan | 10-111592 |
| Apr. 28, 1998 | [JP] | Japan | 10-118256 |
| Apr. 28, 1998 | [JP] | Japan | 10-118257 |
| Apr. 28, 1998 | [JP] | Japan | 10-119379 |

[51] Int. Cl.$^7$ ............ F02M 31/00; F02M 35/02
[52] U.S. Cl. ............................................. 123/556
[58] Field of Search ............................ 123/556, 552

[56] References Cited

U.S. PATENT DOCUMENTS

| 4,244,343 | 1/1981 | Yamaguchi et al. | 123/556 |
| 4,292,949 | 10/1981 | Bendig | 123/556 |
| 4,501,254 | 2/1985 | Zellmer | 123/556 |
| 5,046,473 | 9/1991 | Hokenson | 123/556 |

*Primary Examiner*—Marguerite McMahon
*Attorney, Agent, or Firm*—Armstrong, Westerman, Hattori, McLeland & Naughton

[57] ABSTRACT

An air heater is intended to be used in combination with an air cleaner comprising an air cleaner case, an air cleaner element dividing a space defined by the air cleaner case into a dust chamber on an upstream side with respect to the flowing direction of intake air and a clean chamber on a downstream side with respect to the flowing direction of intake air, and an intake duct connecting an air outlet pipe connected to the clean chamber to a throttle valve. The air heater comprises a heat exchanger case covering an opening formed in the air cleaner case so as to open into the dust chamber, and forming a heating passage for heating intake air; a heat exchanger; through which cooling water is circulated, disposed in the intake air passage defined by the heat exchanger case; a passage selector plate for selectively opening either the heating passage passing the heat exchanger or a bypass passage bypassing the heat exchanger and directly connected to the dust chamber; and a thermosensitive driving means provided with a temperature sensor for sensing intake air temperature and capable of controlling the passage selector plate. The thermosensitive driving means controls the passage selector plate automatically according to the temperature of intake air to heat intake air only when necessary.

21 Claims, 39 Drawing Sheets

F I G. 11
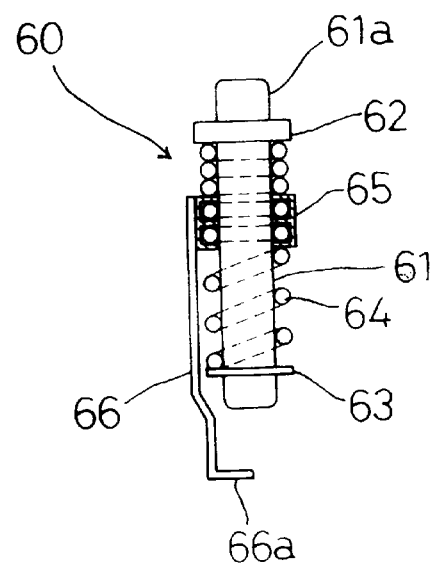
F I G. 12
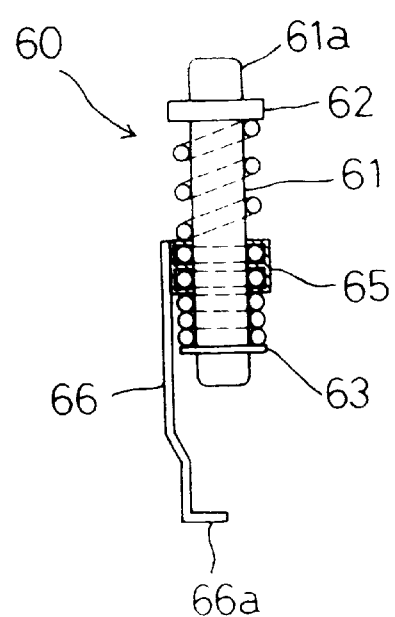

F I G. 15
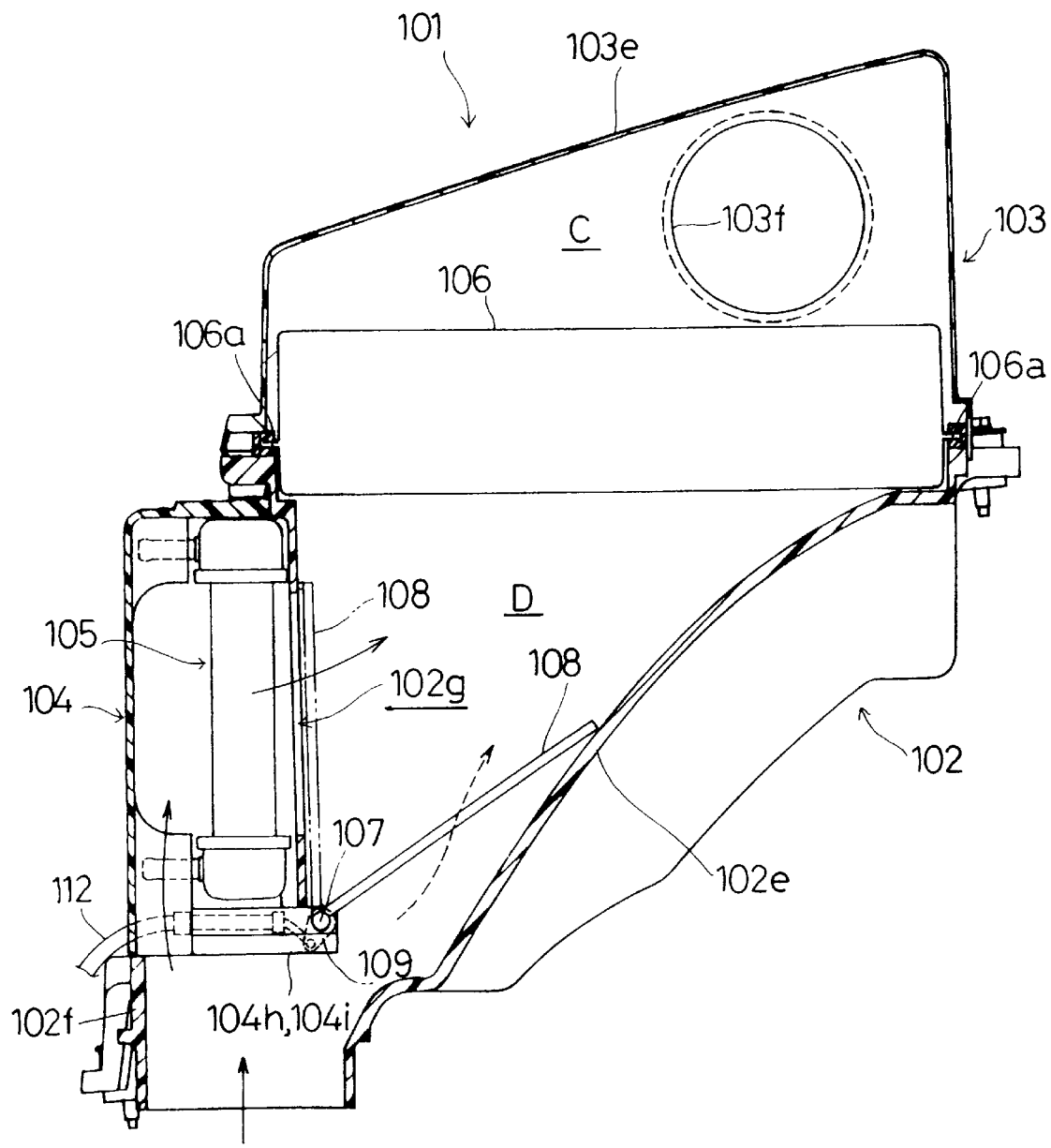

F I G. 16
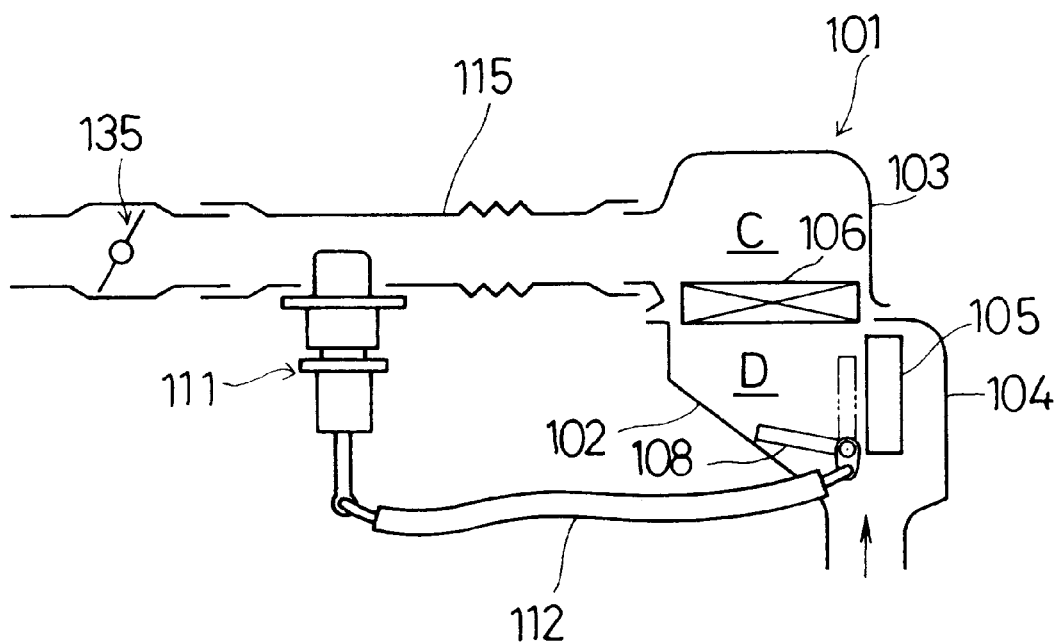

F I G. 28
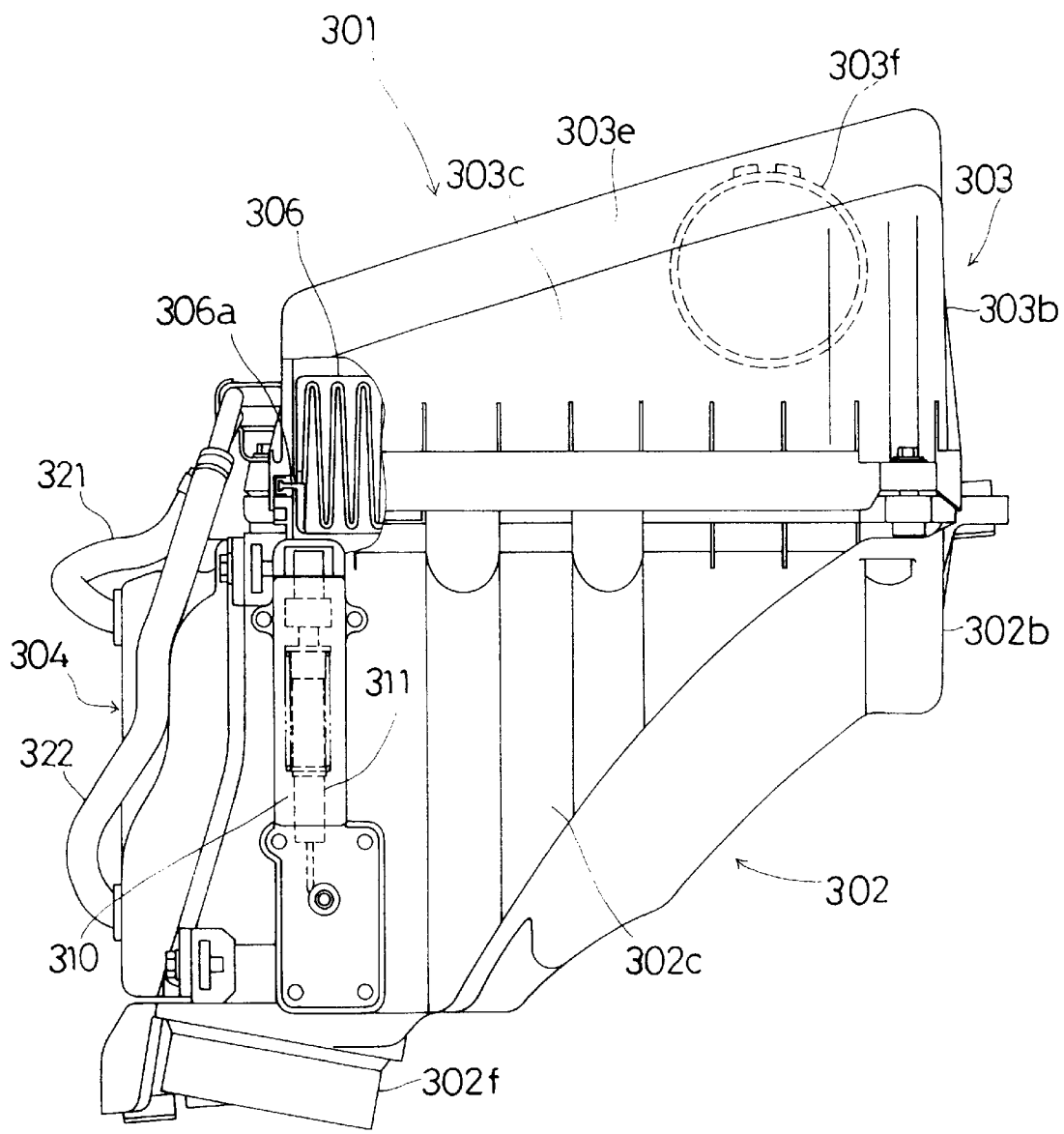

F I G. 30
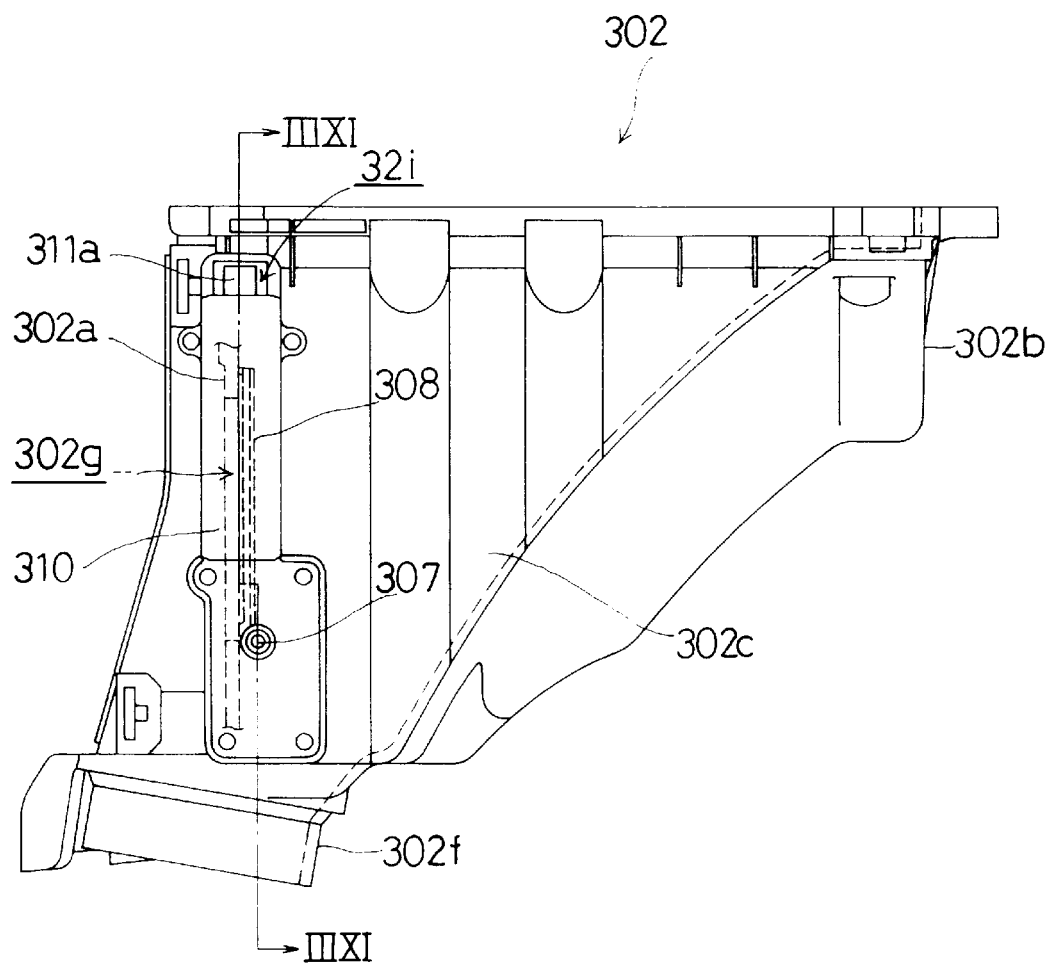

F I G. 36
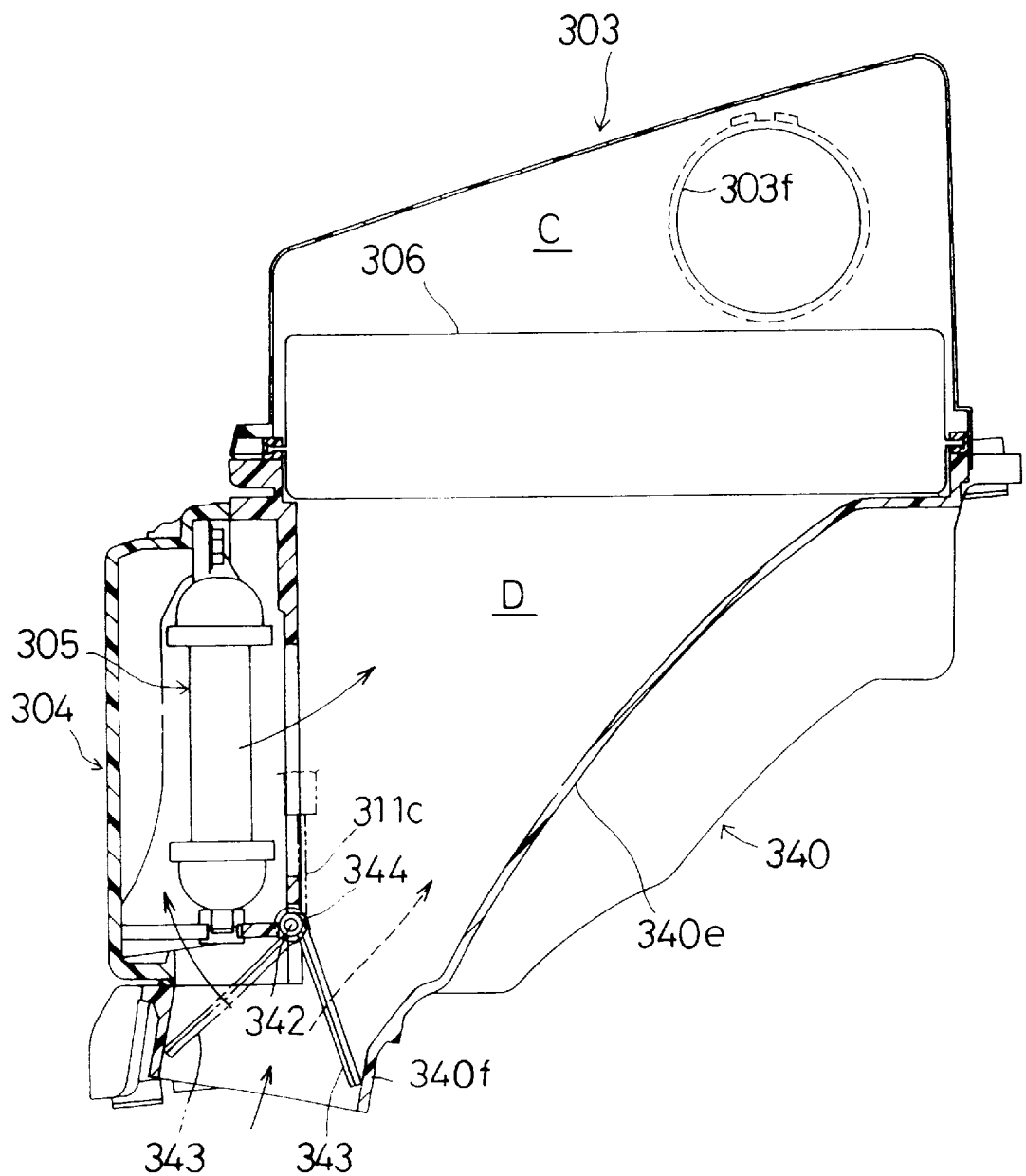

F I G. 40
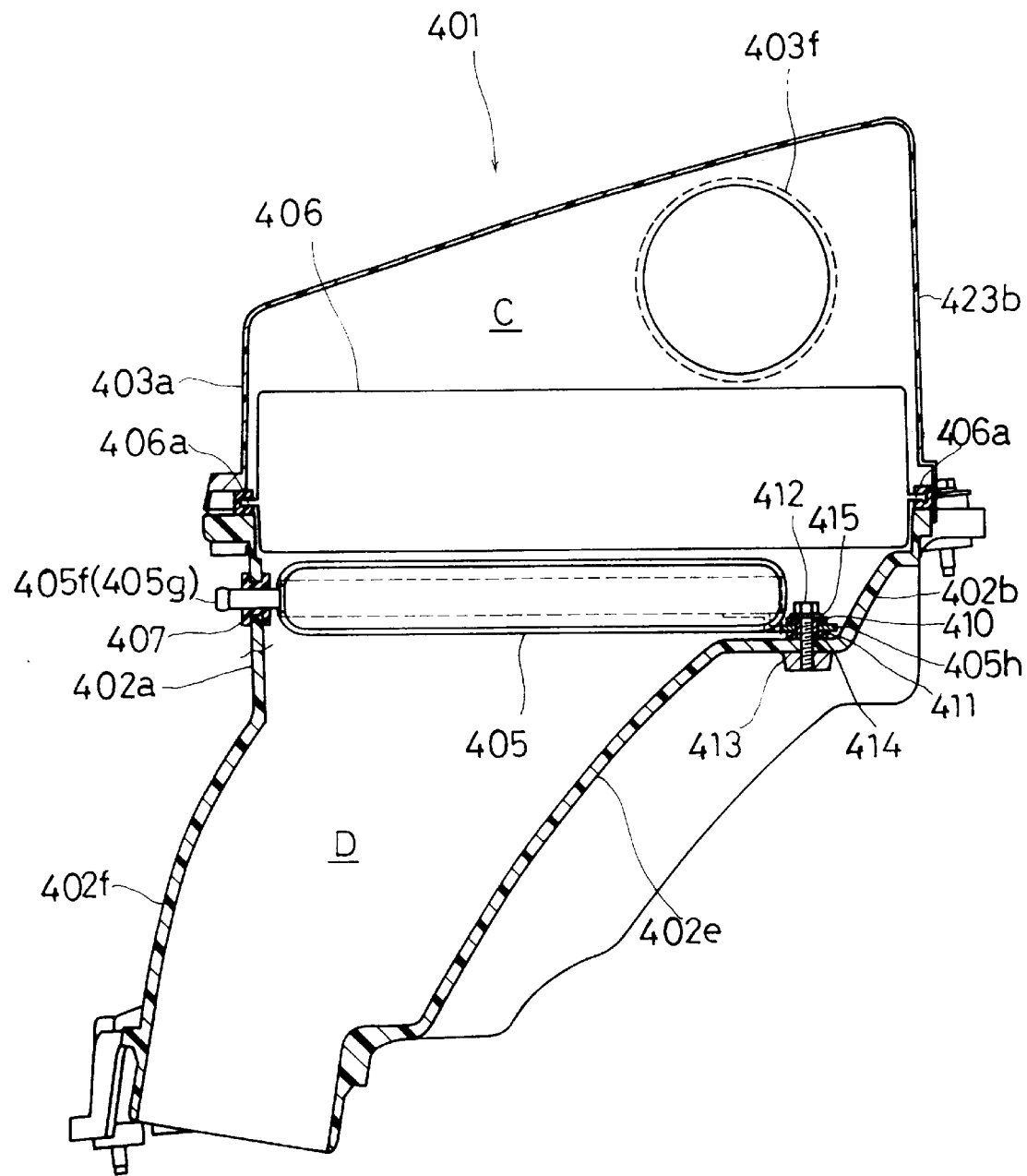

AIR HEATER FOR AIR CLEANER

BACKGROUND OF THE INVENTION

1. Field of the Invention

The present invention relates to an air heater for heating intake air in an air cleaner for an internal combustion engine.

2. Description of the Related Art

When the temperature of intake air supplied from an air cleaner included in an intake system for an internal combustion engine mounted on a vehicle is excessively low, intake air has a large density. Consequently, it is difficult to atomize fuel in such high-density intake air, the exhaust gas discharged from the internal combustion engine has a large hydrocarbon concentration and the output of the internal combustion engine decreases.

An air heater for heating intake air in an air cleaner is proposed in JP-U No. 1-173449. This prior art air heater is used in combination with an air cleaner having an air cleaner case, and an air cleaner element laterally dividing the interior of the air cleaner case into a dust chamber provided with an air inlet and a clean chamber provided with an air outlet. The air heater has a heat radiator disposed in an air passage in the air cleaner case, and the cooling water or the engine oil is circulated through the heat radiator. Air sucked through the air inlet formed in a side wall of the dust chamber is filtered by the air cleaner element, and clean air filtered by the air cleaner element flows from the clean chamber through the air outlet toward the internal combustion engine.

An example of the prior art air heater has an oil-heated heat radiator formed by attaching a plurality of heat radiating fins to a pipe and disposed in the dust chamber of the air cleaner case. The engine oil is circulated through the oil-heated heat radiator. Intake air is thus heated in the air cleaner to avoid the reduction of engine output when the temperature of the atmosphere is low.

The heat radiator is placed in a heating medium circulating passage provided with a manual valve. When necessary, the heating of intake air is stopped by closing the manual valve to prevent the reduction of engine output, the occurrence of knocking and the increase of fuel consumption due to the excessive rise of intake air temperature.

The heat radiator of the heating device is combined integrally with the air cleaner and it is difficult to attach the heat radiator to and remove the same from the air cleaner. This prior art air heater is designed specially for an air cleaner with air heater and cannot be incorporated into an ordinary air cleaner originally not provided with any air heater. When intake air flows through the air cleaner, intake air must necessarily flow through the heat radiator even when intake air need not be heated, and the heat radiator imparts a resistance against the flow of intake air. Since the manual valve placed in the heating medium circulating passage to control the operation of the heat radiator is operated manually, it is difficult to make the heat radiator function properly; that is, the manual valve may possibly be closed before intake air temperature rises to a level not requiring heating or the timing of closing the manual valve may possibly be delayed to heat intake air excessively.

The flow of a heating medium, i.e., the engine oil or the cooling water, through the heating medium circulating passage is controlled by the manual valve and the operation of the manual valve takes effect with a delay behind the operation of the manual valve. It is very difficult to operate the manual valve properly in expectation of a time lag between the time when the manual valve is operated and the time when the operation of the manual valve takes effect.

Since the interior of the air cleaner case is divided laterally into the dust chamber and the clean chamber by the air cleaner element, part of intake air in an upper region of the dust chamber is heated by the heat radiator and heated intake air flows through an upper part of the air cleaner element, while part of intake air in a lower region of the dust chamber is not heated sufficiently and the insufficiently heated intake air flows through a lower part of the air cleaner element. Consequently, the upper and the lower part of the air cleaner element differ from each other in filtering effect, the air cleaner element is unable to function efficiently because the same is clogged locally with dust, and the life of the air cleaner element is shortened.

The heat radiator, such as an oil-heated heat radiator or water-heated heat radiator, placed in the dust chamber is formed by attaching heat radiating fins to bent pipe. The heat radiator tends to disturb the flow of intake air, which is one of causes reducing the air cleaning efficiency of the air cleaner element.

SUMMARY OF THE INVENTION

The present invention has been made in view of the foregoing problems in the prior art air heater and it is therefore an object of the present invention to provide an air heater for an air cleaner included in the intake system of an internal combustion engine, capable of detachably attached to the air cleaner, of not imparting any resistance against the flow of intake air when intake air need not be heated and of automatically and properly controlling intake air temperature to suppress the reduction of the output of the internal combustion engine.

Another object of the present invention is to provide an air heater for an air cleaner included in the intake system of an internal combustion engine and capable of supplying uniformly heated and efficiently filtered intake air to the internal combustion engine.

According to a first aspect of the present invention, an air heater for an air cleaner comprising an air cleaner case, an air cleaner element dividing a space defined by the air cleaner case into a dust chamber on an upstream side with respect to the flowing direction of intake air and a clean chamber on a downstream side with respect to the flowing direction of intake air, and an intake duct connecting an air outlet pipe connected to the clean chamber to a throttle valve comprises a heat exchanger case covering an opening formed in the air cleaner case so as to open into the dust chamber and forming a heating passage for heating intake air, a heat exchanger, through which cooling water for cooling an internal combustion engine is circulated, disposed in the intake air passage defined by the heat exchanger case opposite to part of the opening opening into the dust chamber, a passage selector plate for selectively opening either the heating passage passing the heat exchanger or a bypass passage bypassing the heat exchanger, and a thermosensitive driving means provided with a temperature sensor for sensing intake air temperature and capable of controlling the passage selector plate.

When the temperature of the atmosphere is low, the passage selector plate is controlled so as to open the heating passage. Consequently, intake air is heated while the same flows through the heating passage defined by the heat exchanger case into the dust chamber, is cleaned by the air cleaner element and is supplied from the clean chamber to the internal combustion engine. Thus, intake air is heated so that the density thereof is low to enable the fuel to be atomized properly, increase in the hydrocarbon concentration of the exhaust gas is suppressed, and the reduction of engine output is suppressed.

The temperature of intake air heated by the heat exchanger rises as the temperature of the cooling water rises while the internal combustion engine is in operation. Upon the detection of the rise of the temperature of intake air beyond a predetermined temperature by the temperature sensor of the thermosensitive driving means, the thermosensitive driving means operates the passage selector plate so as to close the heating passage and to open the bypass passage in order that the intake air flows directly into the dust chamber without passing the heat exchanger, is cleaned by the air cleaner element and is supplied from the clean chamber to the internal combustion engine. Thus, the timing of operating the passage selector plate to stop heating intake air is adjusted properly in satisfactory response to the variation of the temperature of intake air to avoid the reduction of engine output, the occurrence of knocking and the increase of fuel consumption due to the excessive rise of the temperature of intake air. When the intake air need not be heated, the intake air flows through the bypass passage bypassing the heat exchanger and is cleaned by the air cleaner element, and hence the heat exchanger does not impart resistance against the flow of intake air. Since the timing of operating the passage selector plate is adjusted automatically and properly by the thermosensitive driving means, the temperature of intake air can automatically be regulated to maintain intake air in an appropriate density and hence the reduction of engine output can be suppressed.

In the air heater according to the present invention, the passage selector plate and the thermosensitive driving means may be disposed on the heat exchanger case. Thus, a mechanism driven by the thermosensitive driving means to operate the passage selector plate can be formed in a compact construction, which facilitates assembling work.

In the air heater according to the present invention, the temperature sensor of the thermosensitive driving means may be a wax type temperature sensor capable of expanding and contracting according to the variation of intake air temperature. Since the wax type temperature sensor expands and contracts accurately in quick response to the variation of intake air temperature, the timing of operating the passage selector plate can properly be controlled.

In the air heater according to the present invention, the passage selector plate may be disposed at an inlet end of the heating passage defined by the heat exchanger case and capable of being tuned between a heating passage opening position where the passage selector plate opens the heating passage and closes the bypass passage, and a heating passage closing position where the passage selector plate closes the heating passage and opens the bypass passage. The passage selector plate is disposed on the upstream side of the heat exchanger, closes the heating passage and opens the bypass passage when the temperature of the atmosphere is high to make intake air flow through the bypass passage and the air cleaner element to the internal combustion engine. The excessive rise of intake air temperature is suppressed to suppress the reduction of engine output and occurrence of knocking. Since the passage selector plate is disposed at the inlet end of the heating passage defined by the heat exchanger case, the passage selector plate may be a relatively small plate and the driving force of the thermosensitive driving means may be relatively low. Accordingly, the air heater can be formed in a compact, relatively small construction.

In the air heater according to the present invention, the heat exchanger case, the heat exchanger, the passage selector plate and the thermosensitive driving means may be combined in an integral heating unit capable of detachably attached to the air cleaner. The heating unit can be constructed by attaching the heat exchanger to the heat exchanger case disposed near the opening of the dust chamber so as to be opposite to part of the opening, attaching the passage selector plate to the heat exchanger case so as be able to open the heating passage and the bypass passage selectively, and attaching the thermosensitive driving means to the heat exchanger case so as to be able to operate the passage selector plate. The heating unit can easily be attached to and removed from the air cleaner. The air heater can easily be combined with an ordinary air cleaner not provided with any air heater.

In the air heater according to the present invention, the thermosensitive driving means may be attached to the heat exchanger case in parallel to a side of the heat exchanger. The disposition of the thermosensitive driving means in parallel to a side of the heat exchanger enables the efficient use of space and enables the air cleaning device to be formed in a compact construction. The disposition of the thermosensitive driving means outside the heat exchanger case enables the temperature sensor to sense the temperature of air around the intake duct approximately equal to that of intake air taken into the internal combustion engine. Consequently, the timing of operation of the passage selector plate can properly be adjusted to supply intake air of an appropriate temperature to the internal combustion engine.

The attachment of the thermosensitive driving means to the inner surface of the heat exchanger case enables the temperature sensor to sense the temperature of air taken into the air cleaner and actually supplied to the internal combustion engine. Consequently, the timing of operation of the passage selector plate can properly be adjusted to supply intake air of an appropriate temperature to the internal combustion engine.

In the air heater according to the present invention, the passage selector plate may be capable of swinging in the dust chamber between a heating passage closing position where the passage selector plate covers a first part of the opening opening into the dust chamber, corresponding to the heat exchanger, and a heating passage opening position where the passage selector plate is separated from the first part of the opening and covers a second part of the opening directly opening into the dust chamber. When the temperature of intake air is high, the first part of the opening is covered with the passage selector plate to stop the flow of intake air through the first part of the opening into the dust chamber and to enable unheated intake air to flow through the second part of the opening into the dust chamber. Consequently, the excessive rise of intake air temperature can be suppressed to suppress the reduction of engine output and occurrence of knocking.

In the air heater according to the present invention, the thermosensitive driving means may be disposed on a part of the intake duct near the throttle valve, and the thermosensitive driving means may be operatively connected to the passage selector plate by a cable or a linkage. Since the thermosensitive driving means is disposed on a part of the intake duct near the throttle valve, the temperature sensor is able to sense the temperature of intake air actually supplied to the internal combustion engine, and the thermosensitive driving means is able to drive the passage selector plate through the cable or the linkage to control heating of intake air. Since heating of intake air is controlled on the basis of the temperature of intake air actually supplied to the internal combustion engine, the optimum adjustment of the timing of operating the passage selector plate can be achieved, so that the reduction of engine output, occurrence of knocking and increase in fuel consumption attributable to the supply of intake air of an excessively high temperature can be prevented. If intake air need not be heated, the passage selector plate is controlled to make intake air flow through the bypass passage and the air cleaner element for cleaning to avoid imparting resistance against the flow of intake air by the heat exchanger.

In the air heater according to the present invention, at least the temperature sensor of the thermosensitive driving means may be inserted in the intake duct. If the temperature sensor is inserted in the intake duct, the temperature of intake air actually being taken into the internal combustion engine can be sensed and hence the optimum heating of intake air can be achieved.

In the air heater according to the present invention, the passage selector plate may be supported on the heat exchanger case. When the elector valve is attached to the heat exchanger case, the heat exchanger and the passage selector plate are combined with the heat exchanger case, the heat exchanger and the passage selector plate, i.e., principal components of the air heater, can easily be attached to and removed from the air cleaner, which facilitates using the air heater in combination with an air cleaner.

In the air heater according to the present invention, the intake duct may integrally be provided with a silencing chamber, and at least the temperature sensor of the thermosensitive driving means may be inserted in the silencing chamber of the intake duct. The silencing chamber formed integrally with the intake duct reinforces the intake duct, the thermosensitive driving means can surely be attached to the intake duct by inserting the temperature sensor in the silencing chamber, the temperature of air actually taken into the internal combustion engine can be sensed in the silencing chamber without being affected by the currents of intake air, and heating operation for heating intake air can properly be controlled on the basis of the stable temperature of intake air.

In the air heater according to the present invention, a shutoff valve may be placed in a cooling water circulating passage through which cooling water is circulated through the heat exchanger to open and close the cooling water circulating passage, and the thermosensitive driving means may simultaneously drive both the passage selector plate and the shutoff valve through a linkage. When intake air temperature is sensed by the heat sensor and the thermosensitive driving means operates, the passage selector plate and the shutoff valve are driven simultaneously to control the heat exchanger automatically for an intake air heating operation. The passage selector plate opens the heating passage, and the shutoff valve is opened to open the cooling water circulating passage when intake air temperature is low, so that intake air is heated in the air cleaner to prevent the reduction of engine output. The thermosensitive driving means controls the passage selector plate so as to close the heating passage and the shutoff valve is closed to stop circulating the cooling water through the heat exchanger when intake air temperature is higher than a predetermined temperature to stop heating intake air surely at an appropriate moment to prevent the reduction of engine output, the occurrence of knocking and the increase of fuel consumption due to the excessive rise of the intake air temperature with reliability. When intake air need not be heated, the passage selector plate closes the heating passage, opens the bypass passage and make intake air to bypass the heat exchanger to avoid heating intake air by the heat exchanger and to avoid imparting resistance against the flow of intake air by the heat exchanger.

In the air heater according to the present invention, the thermosensitive driving means may be attached to the heat exchanger case. The thermosensitive driving means is able to sense the temperature of air taken into the air cleaner and to control an intake air heating operation by properly driving the passage selector plate and the shutoff valve. The air heater can be formed in a compact construction by mounting the thermosensitive driving means and the heat exchanger on the heat exchanger case.

In the air heater according to the present invention, the thermosensitive driving means may be disposed on a part of the intake duct near the throttle valve with at least the temperature sensor inserted in the intake duct, the cable connected to the thermosensitive driving means may be connected to the linkage to operate the passage selector plate and the shutoff valve simultaneously. Since the thermosensitive driving means is disposed on a part of the intake duct near the throttle valve, the temperature sensor is able to sense the temperature of intake air actually being supplied to the internal combustion engine, and the thermosensitive driving means is able to operate on the basis of the temperature of intake air measured by the temperature sensor to drive the passage selector plate and the shutoff valve simultaneously for the control of intake air heating by the heat exchanger. Since the heating of intake air is controlled on the basis of the temperature of intake air being actually supplied to the internal combustion engine, the timing of driving the passage selector plate and the shutoff valve can automatically be adjusted in an optimum mode and hence the reduction of engine output, the occurrence of knocking and the increase of fuel consumption due to the excessive rise of intake air temperature can be prevented.

In the air heater according to the present invention, the passage selector plate may be disposed in the air cleaner case, the thermosensitive driving means may be disposed on the outer surface of the side wall of the air cleaner case, and the cooling water circulating passage through which cooling water is circulated through the heat exchanger may be opened and closed by a shutoff valve according to the temperature of the cooling water flowing through the circulating passage. The temperature sensor senses the temperature of air which is approximately equal to that of air around the air cleaner, the thermosensitive driving means operates the passage selector plate disposed in the air cleaner according to the temperature of air to open and close the heating passage and the bypass passage selectively, and the shutoff valve opens or closes according to the temperature of the cooling water flowing through the cooling water circulating passage. When the temperature of the atmosphere is low, the passage selector plate opens the heating passage, and the shutoff valve opens the cooling water circulating passage to heat intake air in the air cleaner in order that the reduction of engine output may be prevented. When the temperature of the atmosphere is higher than a predetermined level, the thermosensitive driving mean operates the passage selector plate so as to close the heating passage and to open the bypass passage to make intake air bypass the heat exchanger. When the temperature of the cooling water rises beyond a predetermined level, the shutoff valve closes to suppress the rise of the temperature of the heat exchanger and to stop heating intake air by stopping the circulation of the cooling water through the heat exchanger. The operation of the passage selector plate on the basis of the temperature of intake air and the operation of the shutoff valve on the basis of the temperature of the cooling water can individually and automatically be controlled. Therefore, the timing of stopping the heating of intake air can properly and surely adjusted, so that the reduction of engine output, the occurrence of knocking and the increase of fuel consumption due to the excessive rise of intake air temperature can be prevented. When intake air need not be heated, the passage selector plate opens the bypass passage to make intake air bypass the heat exchanger and hence the heat exchanger does not impart any resistance against the flow of intake air.

In the air heater according to the present invention, the cooling water circulating passage through which the cooling water is circulated through the heat exchanger may be a bypass passage bypassing a radiator to circulate the cooling water continuously while the internal combustion engine is in operation. If an icing-preventive bypass passage originally formed in the internal combustion engine and bypassing the radiator to prevent the icing of the throttle valve and the air control valve for controlling the supply of secondary air of the internal combustion engine by continuously circulating the cooling water is used for circulating the cooling water through the heat exchanger, any additional cooling water circulating passage need not be formed in the internal combustion engine.

According to a second aspect of the present invention an air heater for an air cleaner comprising an air cleaner case, and an air cleaner element dividing the interior of the air cleaner case into a lower dust chamber provided with an air inlet and an upper clean chamber provided with an air outlet comprises a heat exchanger, through which the cooling water of an internal combustion engine is circulated to make the cooling water and intake air exchange heat, disposed under the air cleaning element in the dust chamber in parallel to the air cleaner element. Air taken through the air inlet into the dust chamber is heated by the heat exchanger while the same flows upward, the heated air flows through the air cleaner element into the clean chamber, and flows further through the air outlet toward the internal combustion engine. Thus, the density of air is kept on an appropriate level to promote the atomization of the fuel so that the reduction of engine output may be suppressed and fuel consumption is reduced. Since the clean chamber is formed over the dust chamber, and the heat exchanger is disposed under and in parallel to the air cleaner element, intake air is heated uniformly, the flow of heated intake air is straightened, heated intake air is distributed uniformly on the air cleaner element for cleaning. Since the flow of heated intake air is distributed uniformly on the air cleaner element, the air cleaner element filters intake air efficiently, the air cleaner element is dirtied uniformly, and hence the life of the air cleaner element is extended. Since intake air flows upward in the air cleaner, large particles are arrested by the heat exchanger and unable to reach the air cleaner element, so that the air cleaner element is not dirtied rapidly and the life of the air cleaner element can be extended.

In the air heater according to the present invention, the heat exchanger may be placed in a cooling water circulating bypass passage bypassing the radiator of the internal combustion engine so circulate the cooling water continuously while the internal combustion engine is in operation. If an icing-preventive bypass passage originally formed in the internal combustion engine and bypassing the radiator to prevent the icing of the throttle valve and the air control valve for controlling the supply of secondary air of the internal combustion engine by continuously circulating the cooling water is used for circulating the cooling water through the heat exchanger, any additional cooling water circulating passage need not be formed in the internal combustion engine.

In the air heater according to the present invention, the dust chamber may be defined by triangular side walls symmetrical with each other, a front wall connecting the side walls, a rear wall connecting the side walls, and a bottom wall connected to the lower edges of the side walls, the front wall and the rear wall, and the air inlet may be formed in a lowermost part of the bottom wall. Since the bottom wall has inclined parts, and the dust chamber formed in a lower part of the air cleaner case has the shape of a funnel expanding from the air inlet formed in the lowermost part of the bottom wall toward the upper end of the dust chamber, intake air will not stagnate in the dust chamber, intake air taken through the air inlet into the dust chamber flows smoothly upward and is heated and cleaned, and heated, cleaned intake air can efficiently flow out of the clean chamber.

In the air heater according to the present invention, one end part of the heat exchanger may penetrate and may elastically be supported on the front wall, and the other end part of the same may elastically be supported on a step formed in a part of the bottom wall near the rear wall. When the heat exchanger is disposed in the dust chamber of the air cleaner and thus elastically supported on the walls defining the dust chamber, the heat exchanger can be combined with the air cleaner case by a simple structure capable of suppressing the influence of vibrations on the heat exchanger and by easy assembling work without requiring strict considerations for sealing.

In the air heater according to the present invention, the heat exchanger may be supported with an inlet connector and an outlet connector attached thereto penetrating elastic members forced in openings formed in the front wall and may be fastened to the step of the bottom wall with a bolt. Since the front end part of the heat exchanger is supported by the inlet and the outlet connector, the heat exchanger needs a small number of parts and work for attaching the heat exchanger to the air cleaner case can be facilitated.

In the air heater according to the present invention, the inlet and the outlet connector of the heat exchanger may be connected to an icing-preventive bypass passage originally formed in the internal combustion engine and bypassing the radiator to circulate the cooling water continuously while the internal combustion engine is in operation. When the inlet and outlet connector penetrating the front wall of the air cleaner case are connected to the icing-preventive bypass passage, any additional circulation passage is not necessary for circulating the cooling water through the heat exchanger.

BRIEF DESCRIPTION OF THE DRAWINGS

The above and other objects, features and advantages of the present invention will become more apparent from the following description taken in connection with the accompanying drawings, in which:

FIG. 11 is a side elevation of a thermosensitive driving device provided with a member formed of a shape memory alloy;

FIG. 12 is a side elevation of the thermosensitive driving device shown in FIG. 11 in a state different from that shown in FIG. 11;

FIG. 15 is a sectional view of the air cleaner shown in FIG. 13;

FIG. 16 is a typical view of an air heater;

FIG. 28 is a side elevation of an air cleaner provided with an air heater in a ninth embodiment according to the present invention;

FIG. 30 is a side elevation of a lower half case of an air cleaner case;

FIG. 36 is a sectional view of an air cleaner provided with an air heater in a tenth embodiment according to the present invention;

FIG. 40 is a longitudinal sectional view of the air cleaner shown in FIG. 37;

DESCRIPTION OF THE PREFERRED EMBODIMENTS

Figure 1:
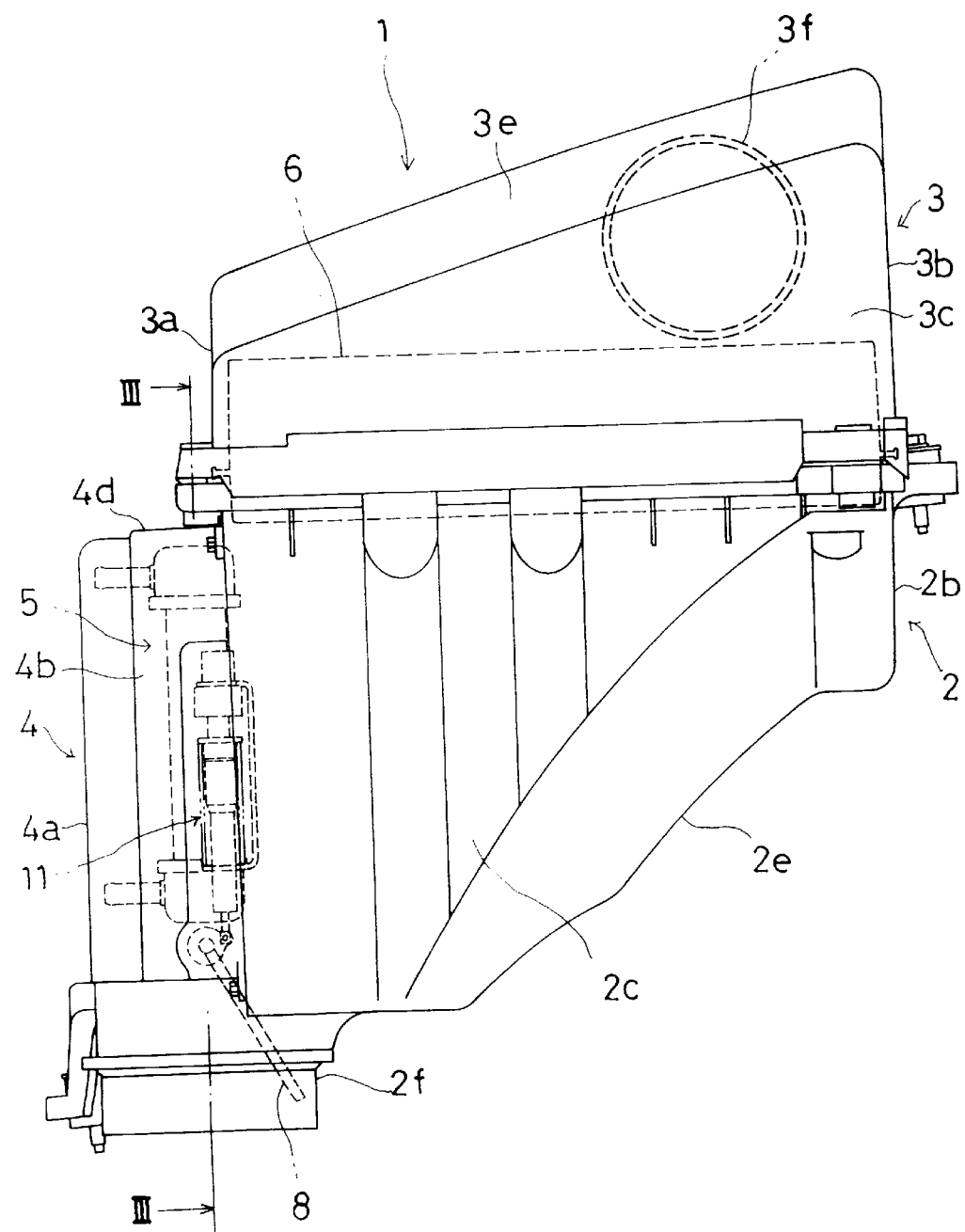
FIG. 1 is side elevation of an air cleaner provided with an air heater in a first embodiment according to the present invention.
Figure 2:
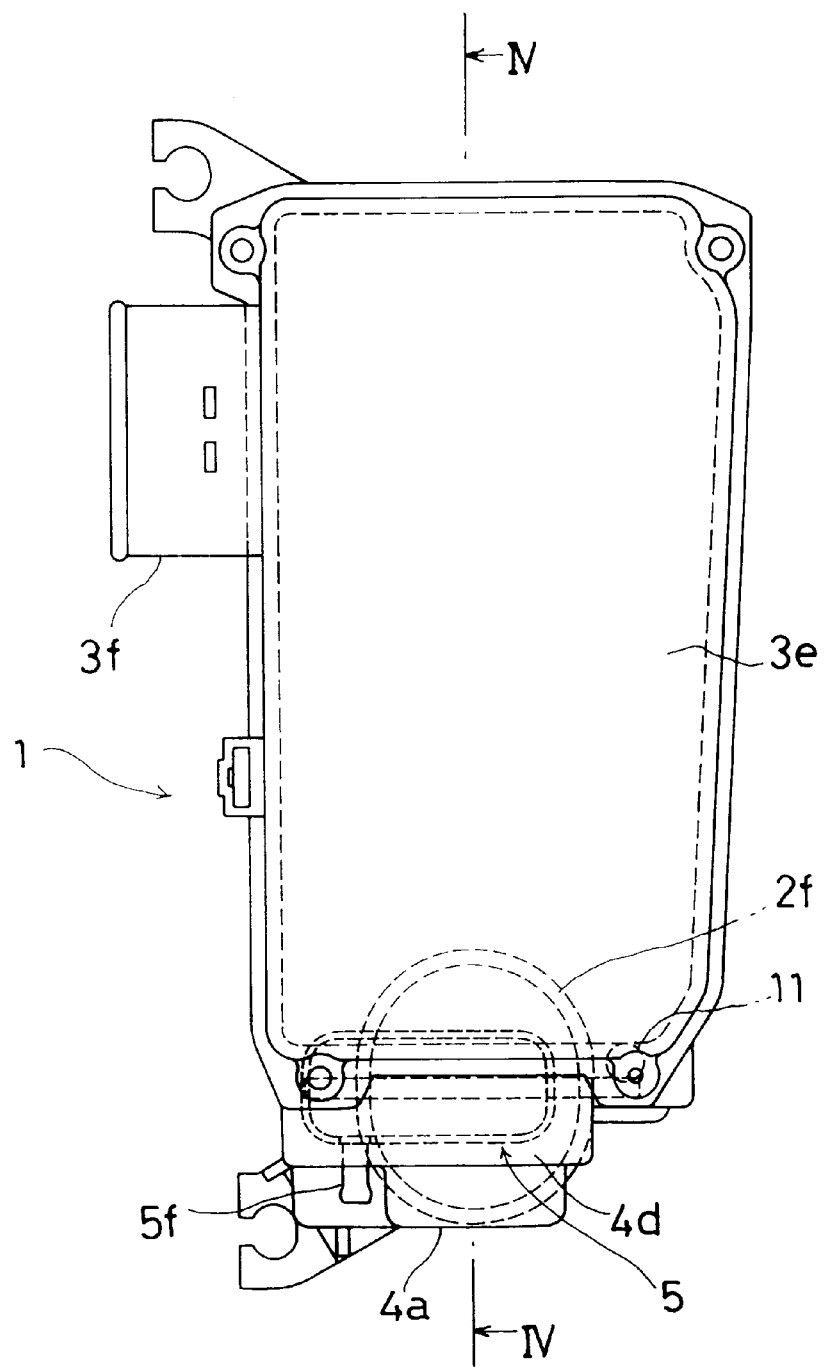
FIG. 2 is a plan view of the air cleaner shown in FIG. 1.

Preferred embodiments of the present invention will be described hereinafter with reference to the accompanying drawings, in which like reference characters designate like or corresponding parts throughout the drawings.

First Embodiment

Figure 3:
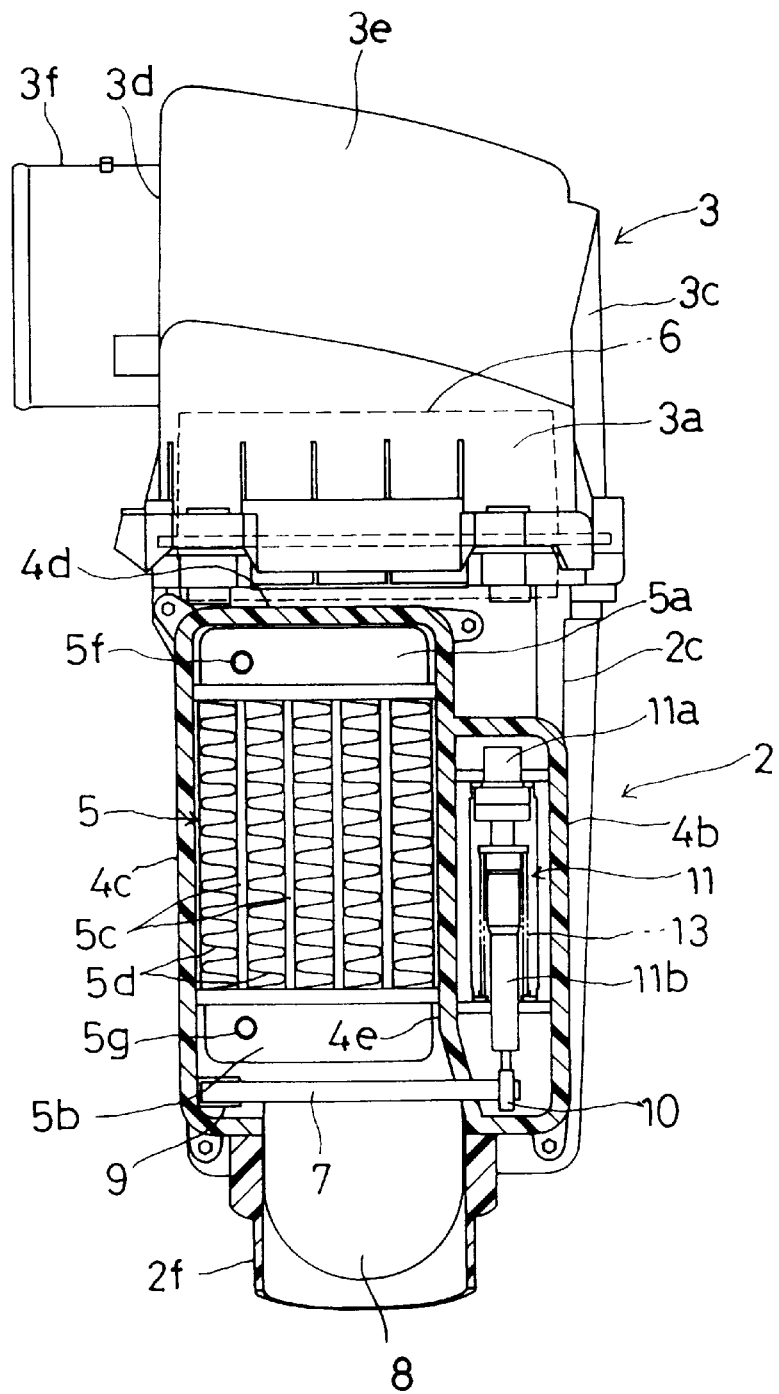
FIG. 3 is a sectional view taken on line III—III in FIG. 1.
Figure 4:
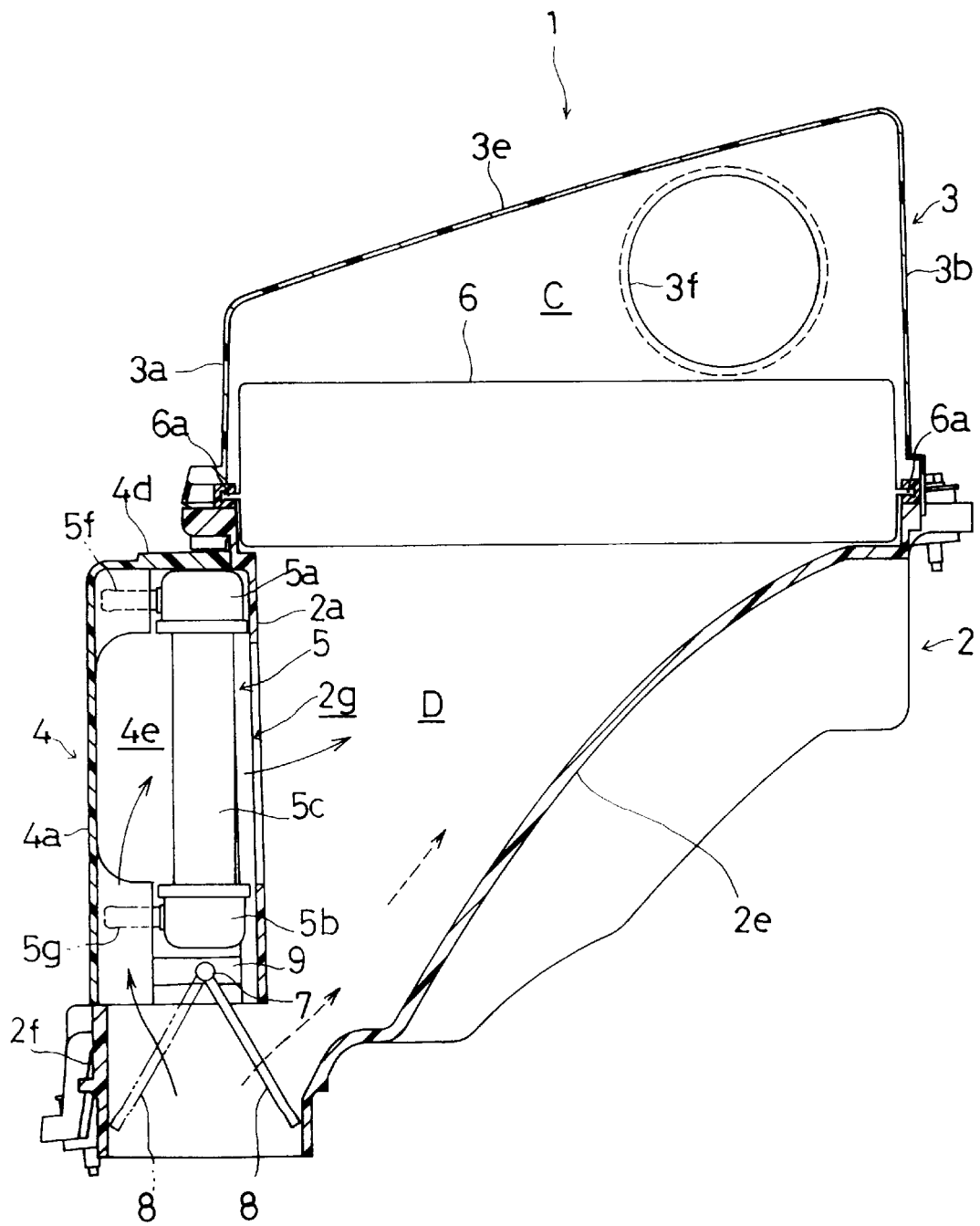
FIG. 4 is a sectional view taken on line IV—IV in FIG. 2.
Figure 5:
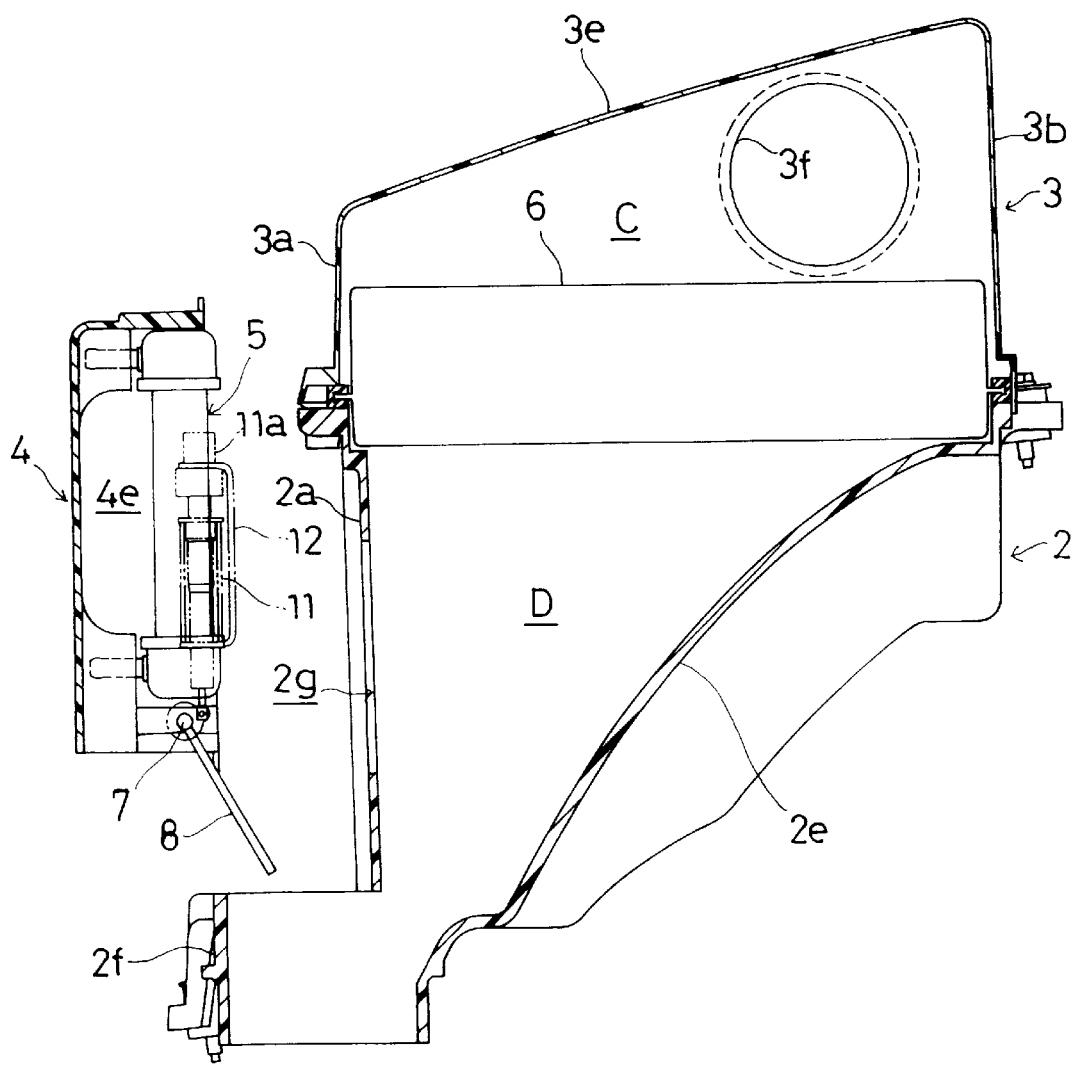
FIG. 5 is a sectional view, similar to FIG. 4, in which a heat exchanger case combined with the air heater is separated from an air cleaner case.

Referring to FIGS. 1 to 7, an air cleaner 1 for an internal combustion engine 20 has a lower half case 2 and an upper half case 3 put on and joined to the lower half case 2. A heat exchanger case 4 is attached to a front wall 2a of the lower half case 2. The lower half case 2 has a rectangular, open, upper end defined by a parting surface, and has a front wall 2a, a rear wall 2b, a substantially triangular left side wall 2c, a substantially triangular right side wall 2d, and a bottom wall 2e. The bottom wall 2e is joined to the inclined lower edges of the left side wall 2c and the right side wall 2d declining toward the front, and the lower edges of the front wall 2a and the rear wall 2b. An air inlet pipe 2f having open upper and open lower ends is connected to the front end part of the bottom wall 2e with its axis extended vertically. Referring to FIG. 5, a front half part of the air inlet pipe 2f protrudes forward from the front wall 2a, and a front half of the upper end of the same opens on the outer side of the front wall 2a, and a rear half of the upper end opens on the inner side of the front wall 2a. A large rectangular opening 2g is formed in the front wall 2a of the lower half case 2. The upper half case 3 has a rectangular, open, lower end defined by a parting surface and has a front wall 3a, a rear wall 3b, a left side wall 3c, a right side wall 3d and a top wall 3e. The height of the front wall 3a is smaller than that of the rear wall 3b. An air outlet pipe 3f projects to the right from a rear part of the right side wall 3d. The air cleaner case is formed by joining together the respective parting surfaces of the lower half case 2 and the upper half case 3. An air cleaner element 6 having a rectangular shape in a plane is fitted in the open lower end of the upper half case 3 in a horizontal position with a flange 6a thereof sandwiched between the respective parting surfaces of the lower half case 2 and the upper half case 3. A space extending under the air cleaner element 6 in the lower half case 2 is a dust chamber D, and a space extending over the air cleaner element 6 in the upper half case 3 is a clean chamber C.

Figure 6:
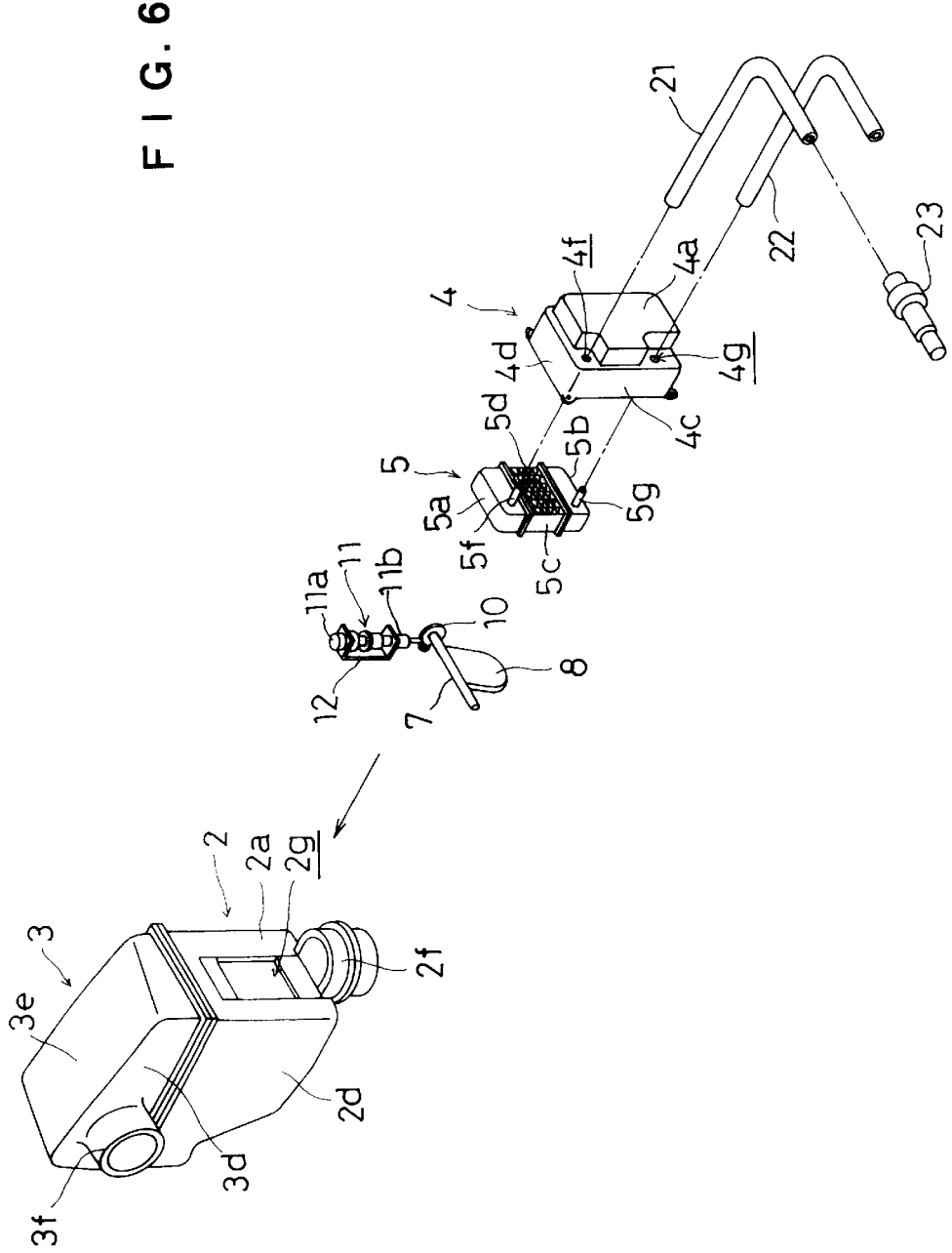
FIG. 6 is an exploded perspective view of the air cleaner shown in FIG. 1.

The heat exchanger case 4 is fastened to the front wall 2a of the lower half case 2 with bolts so as to cover the open upper end of the air inlet pipe 2f. The heat exchanger case 4 has the shape of a substantially rectangular, shallow pan having a front wall 4a, a left side wall 4b, a right side wall 4c, and an upper wall 4d. The heat exchanger case 4 is attached to the front wall 2a of the lower half case 2 so as to cover the opening 2g and the front half part of the open upper end of the air inlet pipe 2f protruding forward from the front wall 2a of the lower half case 2 to define a heating passage 4e. A heat exchanger 5 is fitted in the open rear part of the heat exchanger case 4 so that the front surface thereof faces the heating passage 4e and the rear surface thereof faces the rectangular opening 2g when the heat exchanger case 4 is attached to the lower half case 2. The cooling water of the internal combustion engine 20 is circulated through the heat exchanger 5 and exchanges heat with intake air. Basically, the heat exchanger 5 is similar in construction to the radiator of the internal combustion engine 20. As shown in FIG. 6, the heat exchanger 5 comprises an upper water tank 5a, a lower water tank 5b, a plurality of tubes 5c having a flat cross section and extended in parallel to each other between the upper water tank 5a and the lower water tank 5b, and corrugated fins 5d disposed between and attached to the adjacent tubes 5c. An inlet connector 5f and an outlet connector 5g are attached to right parts (left parts as viewed in FIG. 6) of the respective front walls of the upper water tank 5a and the lower water tank 5b, respectively, so as to extend forward. The heat exchanger case 4 is provided with round holes 4f and 4g provided with grommets. When the heat exchanger 5 is fitted in the heat exchanger case 4, the inlet connector 5f and the outlet connector 5g extend through the round holes 4f and 4g, respectively, and project outside from the front surface of the heat exchanger case 4.

A vertically elongate space is defined in a left side part of the interior of the heat exchanger case 4 by a partition wall 4i parallel to the left side wall 4b to contain a thermosensitive driving device 11 therein.

A turnable shaft 7 is extended horizontally between and supported for turning on the right side wall 4c and the partition wall 4i at a position near the lower water tank 5b of the heat exchanger 5. As shown in FIG. 3, a passage selector plate 8 has a base end edge fixed to a middle part of the shaft 7. The shaft 7 has a right end part (left end part as viewed in FIG. 3) supported for turning in a bearing 9, and a left end part (right end part as viewed in FIG. 3) penetrating the partition wall 4i so as to project into the space in which the thermosensitive driving device 11 is placed. The passage selector plate 8 has a lower part having a circular free edge and inserted in the air inlet pipe 2f.

A circular plate 10 is mounted on the left end of the shaft 7 extending in the space containing the thermosensitive driving device 11. The thermosensitive driving device 11 comprises a temperature sensor 11a containing a wax, an elongate actuating member 11b extending from the temperature sensor 11a, a holder 12 holding the temperature sensor 11a and the actuating member 11b, and a spring 13 biasing the actuating member 11b upward. The holder 12 is formed by bending the opposite end parts of a rectangular plate in the same direction. As shown in FIG. 3, the temperature sensor 11a is fitted in a hole formed in the upper bent end part of the holder 12, the actuating member 11b is extended slidably through a hole formed in the lower bent end part of the holder 12, and the spring 13 is extended between a flange 11c formed on the actuating member 11b and the lower bent end part of the holder 12. The thermosensitive driving device 11 is disposed in the space between the partition wall 4i and the left side wall 4b, the holder 12 is fixed in place, and a lower end part of the actuating member 11b is pivotally connected to a peripheral part of the circular plate 10 mounted on the shaft 7.

Thus, the heat exchanger 5 is fitted in the heat exchanger case 4, the shaft 7 holding the passage selector plate 8 is supported on the right side wall 4c and the partition wall 4i, the holder 12 of the thermosensitive driving device 11 is held on the heat exchanger case 4 to form the air heater in an integral unit as shown in FIG. 5. The heat exchanger case 4 is fastened to the front wall 2a of the lower half case 2 of the air cleaner case so as to cover the rectangular opening 2g formed in the front wall 2a of the lower half case 2 and the front half of the open upper end of the air inlet pipe 2f, and the passage selector plate 8 is inserted in the air inlet pipe 2f as shown in FIG. 4. The temperature sensor 11a of the thermosensitive driving device 11 senses the temperature of intake air taken into the dust chamber D of the air cleaner 1.

The wax of the temperature sensor 11a expands and contracts according to the temperature of intake air and the actuating member 11b is moved accordingly. If the temperature of intake air rises, the wax expands to move the actuating member 11b axially downward against the resilience of the spring 13, whereby the circular plate 10 is turned to turn the passage selector plate 8. If the internal combustion engine 20 is started when the temperature of the atmosphere is low, the passage selector plate 8 is turned to a position indicated by continuous lines in FIG. 4 to open the heating passage formed in the heat exchanger case 4 and to close a bypass passage connecting the air inlet pipe 2f directly to the dust chamber D. When the temperature of intake air in the dust chamber D rises beyond a predetermined level, the thermosensitive driving device 11 turns the passage selector plate 8 to a position indicated by imaginary lines in FIG. 4 to close the heating passage formed in the heat exchanger case 4 and to open the bypass passage to enable intake air to flow from the air inlet pipe 2f directly into the dust chamber D.

Figure 7:
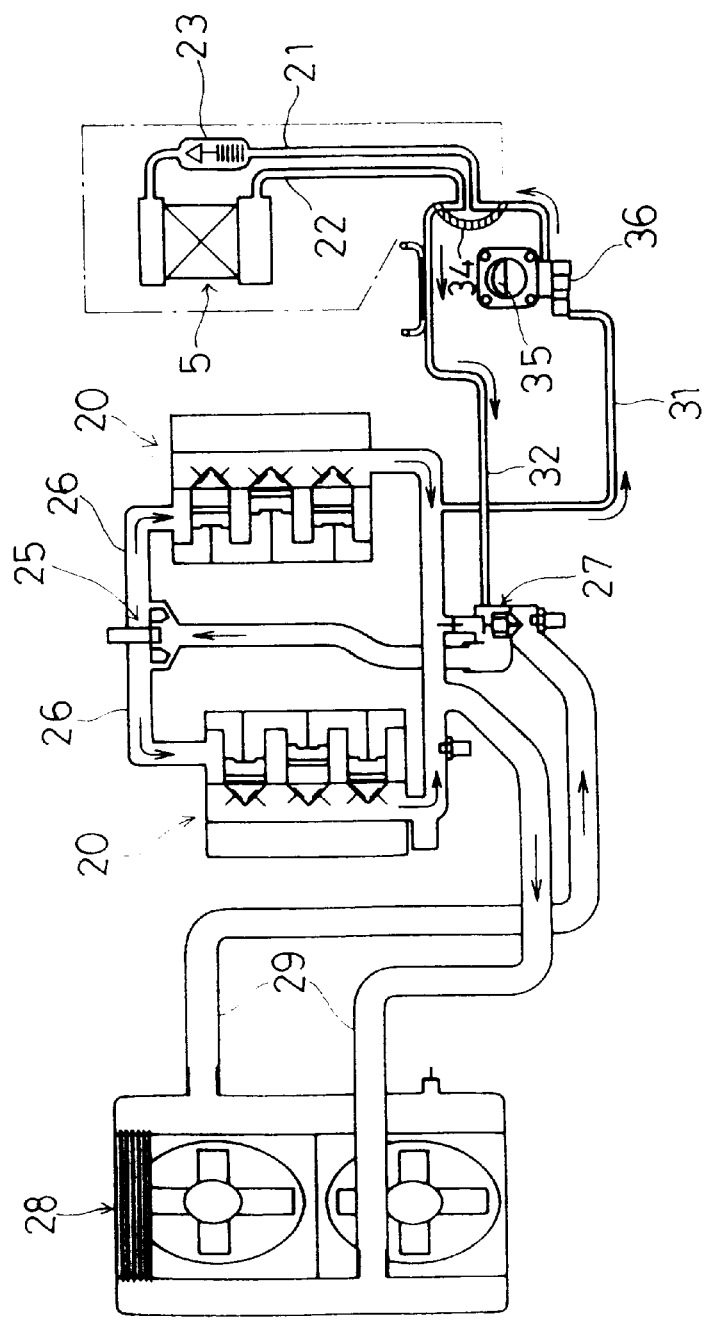
FIG. 7 is a schematic view of principal cooling water circulating passages included in an internal combustion engine.

A cooling water supply pipe 21 provided with a wax type shutoff valve 23, and a cooling water discharge pipe 22 are connected to the inlet connector 5f and the outlet connector 5g projecting outside from the heat exchanger case 4, respectively, as shown in FIG. 6 to circulate the cooling water of the internal combustion engine 20 through the heat exchanger 5 as shown in FIG. 7.

Referring to FIG. 7, showing principal cooling water circulating passages of the internal combustion engine 20, the cooling water is urged to flow through a cooling water circulating passage 26 connected to a radiator 28 for the internal combustion engine 20 and provided with a thermostat 27 by a water pump 25. The thermostat 27 opens or closes the cooling water circulating passage 26 according to the temperature of the cooling water to circulate the cooling water through the radiator 28 or to stop the circulation of the cooling water through the radiator 28. While the internal combustion engine 20 is in a warming-up period subsequent to the start of the same, the cooling water circulating passage 26 connected to the radiator 28 is closed to make the cooling water flow only through the internal combustion engine 20. After the temperature of the cooling water has risen to a predetermined temperature and the internal combustion engine 20 has warmed up, the cooling water circulating passage 26 is opened to circulate the cooling water cooled by the radiator 28 through the internal combustion engine 20 for cooling.

A first bypass passage 31 has one end connected to a section of the cooling water circulating passage 26 on the downstream side of the internal combustion engine 20, and the other end connected to the cooling water supply pipe 21. A second bypass passage 32 has one end connected to a section of the cooling water circulating passage 26 on the downstream side of the thermostat 27, and the other end connected to the cooling water discharge pipe 22. The first bypass passage 31 and the second bypass passage 32 are connected by a connecting passage 34. The cooling water is circulated continuously through the bypass passages 31 and 32 and the connecting passage 34 regardless of the condition of the thermostat 27 while the internal combustion engine 20 is in operation for icing prevention. The bypass passages 31 and 32 are icing-preventive bypass passages originally included in the internal combustion engine 20 to prevent the icing of an air control valve 36 for controlling secondary air supply. The cooling water supply pipe 21 and the cooling water discharge pipe 22 are connected to the bypass passages 31 and 32 to circulate the cooling water through the heat exchanger 5. The hot cooling water immediately after being discharged from the internal combustion engine 20 is supplied through the first bypass passage 31 to the heat exchanger 5. Therefore, the cooling water heated by the internal combustion engine 20 starts flowing through the heat exchanger 5 immediately after the start of the internal combustion engine 20 to heat intake air in the air cleaner 1. When intake air need not be heated, the shutoff valve 23 closes the cooling water supply pipe 21 to stop supplying the cooling water to the heat exchanger 5.

Thus, the heat exchanger 5 through which the cooling water of the internal combustion engine 20 circulates is fitted in the heat exchanger case 4, and the heat exchanger case 4 is attached to the air cleaner case with the heat exchanger 5 facing the dust chamber D.

In a state where the temperature of the atmosphere is low and the internal combustion engine 20 has just been started, the passage selector plate 8 is set at the position indicated by continuous lines in FIG. 4 to close the bypass passage directly connected to the dust chamber D and to open the heating passage 4e formed in the heat exchanger case 4 on the upstream side of the heat exchanger 5. Then, intake air f lows through the air inlet pipe 2f into the heating passage 4e as indicated by the arrows, intake air is heated by the heat exchanger 5 while the same flows through spaces between the corrugated fins 5d of the heat exchanger 5, heated intake air flows upward through the dust chamber D and is filtered and cleaned by the air cleaner element 6, and heated, clean intake air is supplied through the clan chamber C, the air outlet pipe 3f and a throttle valve 35 to the internal combustion engine 20.

Air of a very low temperature has a large density. As mentioned above, engine output will drop if unheated intake air of such a very low temperature is supplied to the internal combustion engine 20. Therefore, intake air is heated in the air cleaner 1 by the heat exchanger 5 through which the cooling water, the temperature of which starts rising immediately after the start of the internal combustion engine, is circulated to supply intake air of an appropriate density capable of promoting the atomization of the fuel. Thus, the reduction of engine output can be suppressed and the fuel consumption rate of the internal combustion engine 20 can be improved.

Knocking occurs if the temperature of intake air is excessively high. The thermosensitive driving device 11 turns the passage selector plate 8 to a position indicated by imaginary lines in FIG. 4 to close the heating passage 4e formed in the heat exchanger case 4 and to open the bypass passage directly connected to the dust chamber D when the temperature of the cooling water rises as the internal combustion engine 20 continues operating and the temperature of intake air rises beyond a predetermined level. Consequently, intake air flows directly into the dust chamber D as indicated by the arrow of broken lines, flows without being heated through the air cleaner element 6, and thus cleaned intake air is supplied to the internal combustion engine 20. Thus, the passage selector plate 8 is operated automatically so as to close the heating passage 4e and to open the bypass passage, and the timing of operation of the passage selector plate 8 is adjusted properly according to the temperature of intake air in the air cleaner 1 to stop heating intake air in satisfactory response to the variation of the temperature of intake air. Thus, the reduction of engine output, the occurrence of knocking and the increase of fuel consumption rate due to the excessively high temperature of intake air can be prevented. The shutoff valve 23 closes to stop circulating the cooling water through the heat exchanger 5 when the temperature of the cooling water rises beyond a predetermined level.

Since the air heater in the first embodiment is assembled in an integral unit on the heat exchanger case 4, the air heater can easily be attached to and removed from the air cleaner 1. If the air heater is unnecessary, the heat exchanger case 4 holding the air heater is removed from the lower half case 2 of the air cleaner case, and only the heat exchanger case 4 may be attached to the lower half case 2 of the air cleaner case.

The thermosensitive driving device 11 of the air heater is disposed in the heat exchanger case 4 in parallel to one side of the heat exchanger 5, which enables the efficient use of space. Thus, the components of the air heater are assembled on the heat exchanger case 4 in a compact construction.

Since the passage selector plate 8 is placed in the air inlet pipe 2f through which intake air is taken into the space covered with the heat exchanger case 4, the passage selector plate 8 may be relatively small and the driving force of the thermosensitive driving device 11 may be relatively low. Therefore the air heater can be formed in a small, compact construction.

Second Embodiment

Figure 8:
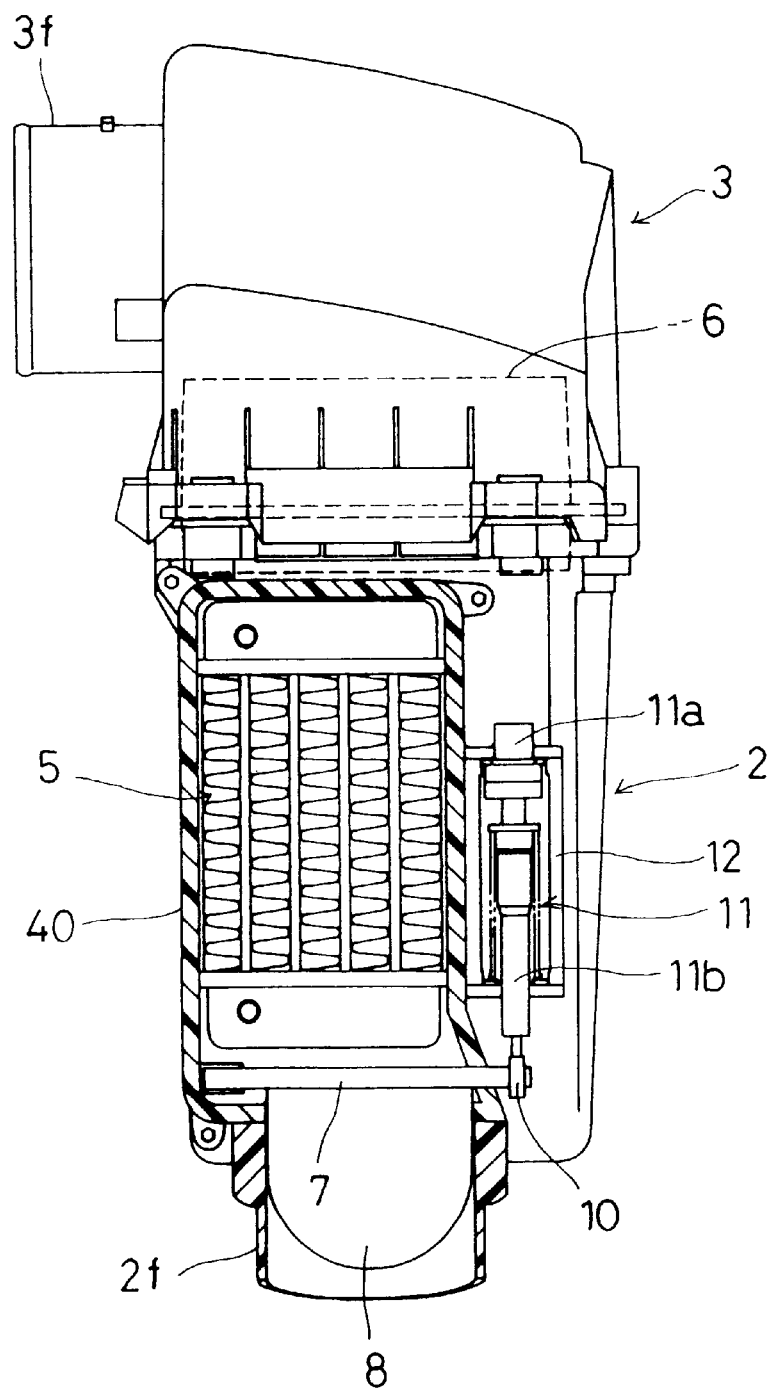
FIG. 8 is a sectional view, similar to FIG. 3, of an air cleaner provided with an air heater in a second embodiment according to the present invention.

An air heater in a second embodiment according to the present invention will be described hereinafter with reference to FIG. 8, in which the description of parts like or corresponding to those shown in FIGS. 1 to 7 will be omitted to avoid duplication. The thermosensitive driving device 11 employed in the first embodiment has the temperature sensor 11a which senses the temperature of intake air in the dust chamber D. As shown in Fig. 8, the air heater in the second embodiment according to the present invention is provided with a thermosensitive driving device 11 disposed outside a heat exchanger case 40. The thermosensitive driving device 11 has a heat sensor 11a capable of sensing the temperature of air substantially equal to that of air around an intake duct.

The timing of changing the position of a passage selector plate 8 included in the air heater can generally properly be adjusted to supply intake air of a proper temperature to the internal combustion engine 20

Third Embodiment

Figure 9:
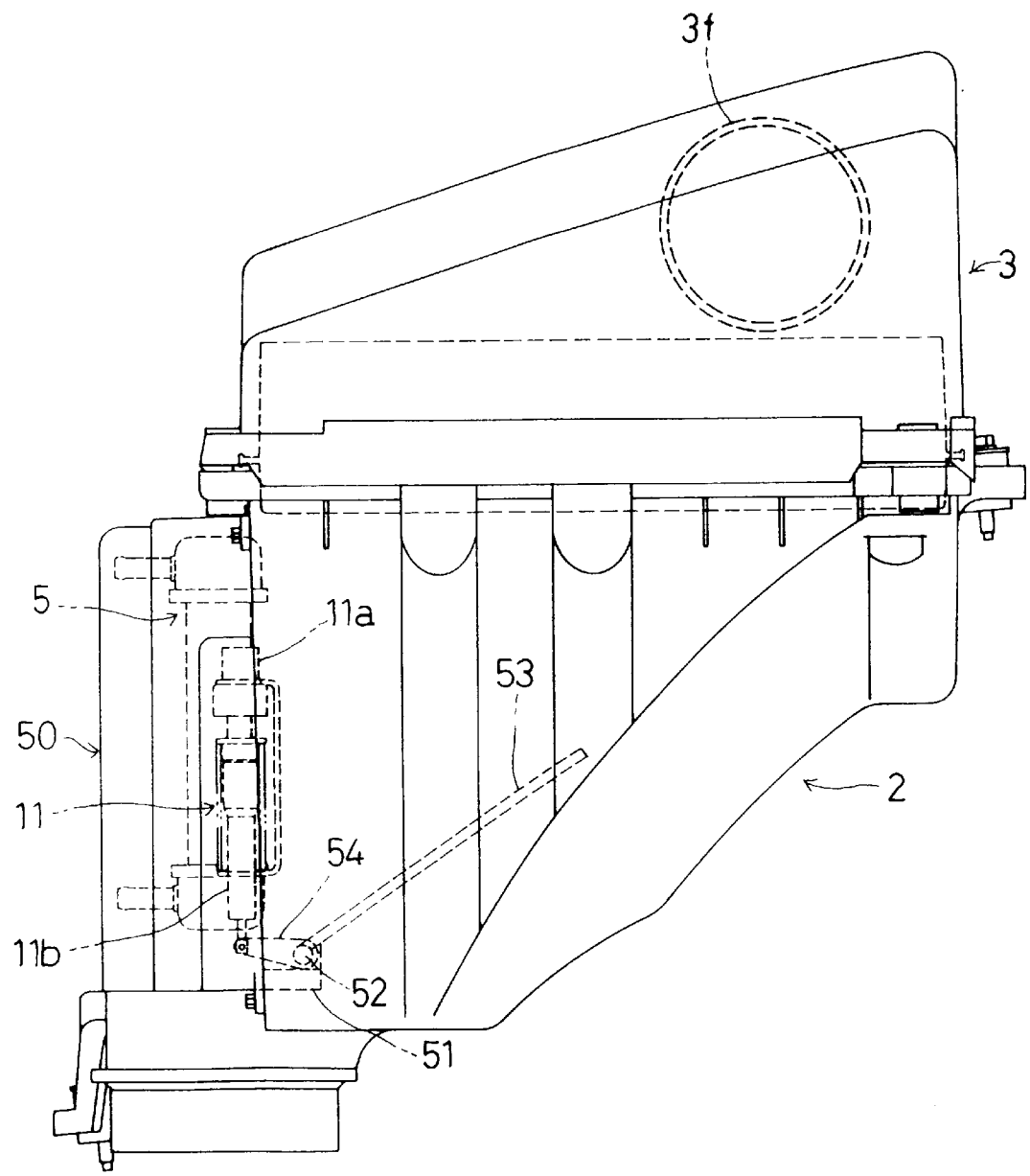
FIG. 9 is a side elevation of an air cleaner provided with an air heater in a third embodiment according to the present invention.

An air heater in a third embodiment according to the present invention will be described with reference to FIGS. 9 and 10, in which the description of parts like or corresponding to those of the foregoing embodiments will be omitted to avoid duplication.

A heat exchanger case 50 substantially the same in shape as the heat exchanger case 4 employed in the first embodiment. The heat exchanger case 50 is provided inside with a partition wall. Support arms 51 are extended rearward from the lower ends of a right side wall and the partition wall of the heat exchanger case 50, a turnable shaft 52 is supported for turning on respective rear end parts of the support arms 51, and a rectangular passage selector plate 53 is fixed to the turnable shaft 52. Those components of the air heater are assembled in a unit on the heat exchanger case 50. As shown in FIG. 10, the support arms 51 extend into the dust chamber D so as to lie below the rectangular opening 2g of the front wall 2a of the lower half case 2 when the heat exchanger case 50 holding the components of the air heater is attached to the front wall 2a of the lower half case 2. The passage selector plate 53 is able to turn in the dust chamber D between a heating passage closing position indicated by imaginary lines in FIG. 10 where the passage selector plate 53 is in close contact with the inner surface of the front wall 2a of the lower half case 2 to cover the rectangular opening 2g, and a bypass passage closing position indicated by continuous lines in FIG. 10 where the free edge of the passage selector plate 53 is in contact with the inner surface of the inclined bottom wall 2e of the lower half case 2 to close a bypass passage. A turning arm 54 is fitted on the turnable shaft 52, and the free end of the turning arm 54 is pivotally connected to the lower end of the actuating member 11b of the thermosensitive driving device 11. The passage selector plate 53 is turned between the heating passage closing position and the bypass passage closing position by the thermosensitive driving device 11.

Figure 10:
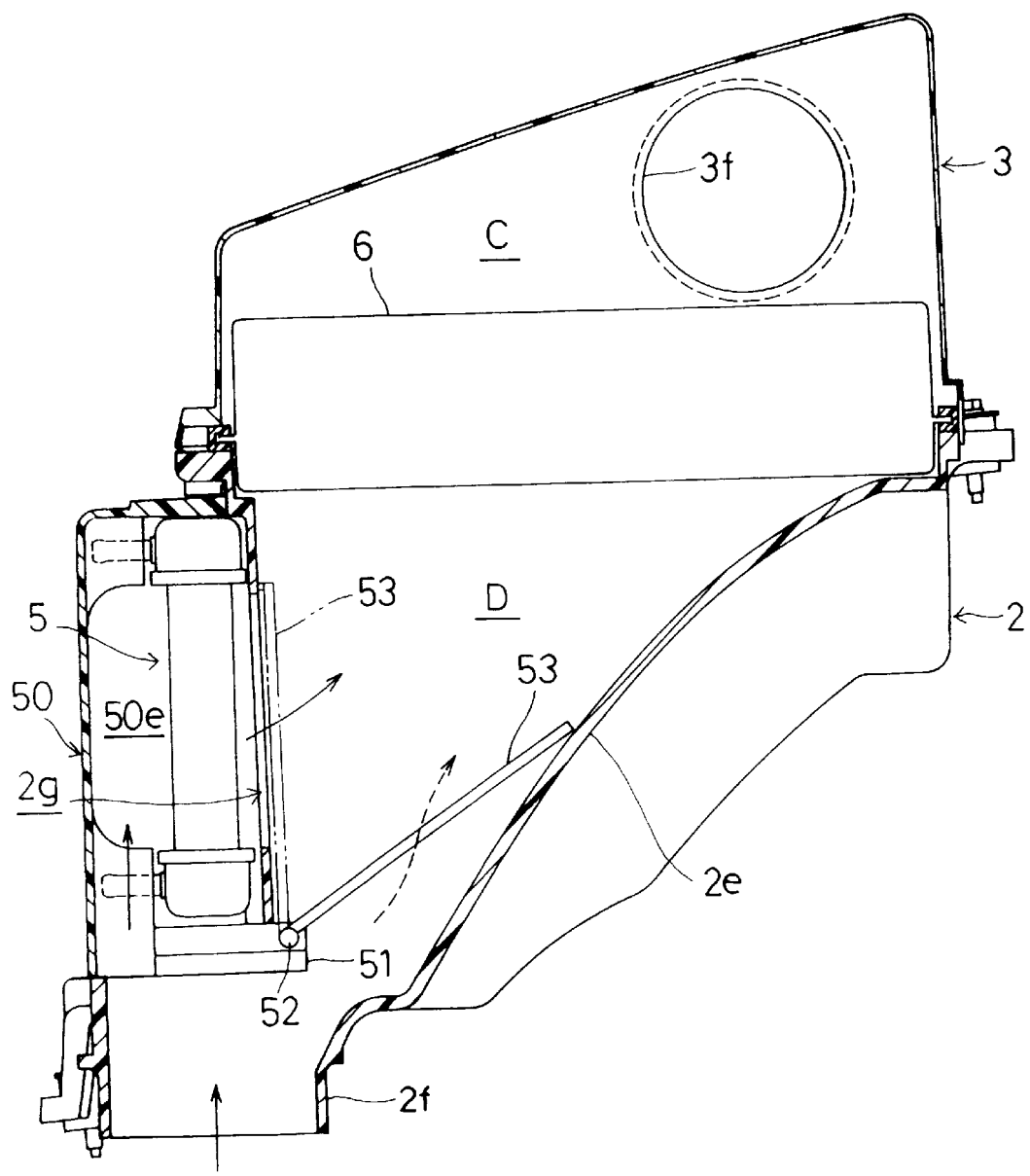
FIG. 10 is a sectional view of the air cleaner shown in FIG. 9.

In a state where the temperature of the atmosphere is low and the internal combustion engine 20 has just been started, the passage selector plate 53 is set at the position indicated by continuous lines in FIG. 10 to close the bypass passage directly connected to the dust chamber D and to open the heating passage 50e formed in the heat exchanger case 4 on the upstream side of the heat exchanger 5. Then, intake air flows through the air inlet pipe 2f into the heating passage 50e as indicated by the arrows, intake air is heated by the heat exchanger 5 while the same flows through spaces between the corrugated fins 5d of the heat exchanger 5, heated intake air flows upward through the dust chamber D and is filtered and cleaned by the air cleaner element 6, and heated, clean intake air is supplied through the clan chamber C to the internal combustion engine 20.

Intake air is heated to supply intake air of an appropriate density capable of promoting the atomization of the fuel even if the temperature of the atmosphere is very low. Thus, the reduction of engine output can be suppressed and the fuel consumption rate of the internal combustion engine 20 can be improved.

The thermosensitive driving device 11 turns the passage selector plate 53 to a position indicated by imaginary lines in FIG. 10 to close the heating passage 50e formed in the heat exchanger case 4 by covering the rectangular opening 2g formed opposite to the heat exchanger 5 and to open the bypass passage directly connected to the dust chamber D when the temperature of the cooling water rises as the internal combustion engine 20 continues operating and the temperature of intake air rises beyond a predetermined level. Consequently, intake air flows directly into the dust chamber D as indicated by the arrows of lines, flows without being heated through the air cleaner element 65, and thus cleaned intake air is supplied to the internal combustion engine 20. Thus, the passage selector plate 53 is operated automatically so as to close the heating passage 50e and to open the bypass passage, and the timing of operation of the passage selector plate 53 is adjusted properly according to the temperature of intake air in the air cleaner 1 to stop heating intake air in satisfactory response to the variation of the temperature of intake air. Thus, the reduction of engine output, the occurrence of knocking and the increase of fuel consumption rate due to the excessively high temperature of intake air can be prevented. Since the heating of intake air can surely be stopped by isolating the heat exchanger 5 from the dust chamber D by the passage selector plate 53 when intake air need not be heated, the occurrence of knocking can surely be prevented.

Since the components of the air heater are assembled in a unit on the heat exchanger case 50, the air heater can easily be attached to and removed from the air cleaner 1. Thus, the air heater can additionally be incorporated into various types of air cleaners when necessary.

FIGS. 11 and 12 show a thermosensitive driving device 60 which can be employed in the foregoing embodiments instead of the thermosensitive driving device 11 provided with the wax type temperature sensor 11a. The thermosensitive driving device 60 is provided with a member formed of a shape memory alloy. Referring to FIG. 11, the thermosensitive driving device 60 has a round rod 61 provided with flanges 62 and 63 in upper and lower end parts thereof, a coil spring 64 of a shape memory alloy wound around a part of the round rod 61 between the flanges 62 and 63, a holding member 65 holding to a part of the coil spring 62, and an actuating rod 66 attached to the holding member 65 and extending downward along the round rod 61 beyond the lower end of the round rod 61 and having a bent lower end part 66a.

An upper part of the coil spring 62 above the holding member 65 is contracted and a lower part of the same below the holding member 65 is expanded as shown in FIG. 11 when the temperature of the coil spring 62 is low, so that the actuating rod 66 is at its upper position. The upper part of the coil spring 62 is expanded and the lower part of the same is contacted as shown in FIG. 12 when the temperature of the coil spring 62 is high, so that the actuating rod 66 is at its lower position. The thermosensitive driving device 60 is held on the heat exchanger case 4 (50), and the bent lower end part 66a of the actuating rod 66 is connected to the circular plate 10 (turning arm 54) to turn the passage selector plate 8 (53) for selecting the heating passage or the bypass passage.

The thermosensitive driving device 60 provided with the coil spring 64 of a shape memory alloy is simple and small in construction and is effective in forming the air heater in a compact construction. An upper end part 61a projecting upward from the flange 62 of the round rod 61 may be used as a temperature sensing part and may be exposed to intake air in a space for measuring the temperature of intake air. Heat received by the upper end part 61a is transferred through the round rod 61 to the coil spring 64 of a shape memory alloy to move the actuating rod 66 according to the temperature of intake air.

Fourth Embodiment

Referring to FIGS. 13 to 17, an air cleaner 101 for an internal combustion engine 120 has a lower half case 102 and an upper half case 103 put on and joined to the lower half case 102. A heat exchanger case 104 is attached to a front wall 102a of the lower half case 102. The lower half case 102 has a rectangular, open, upper end defined by a parting surface, and has the front wall 102a, a rear wall 102b, a substantially triangular left side wall 102c, a substantially triangular right side wall 102d, and a bottom wall 102e. The bottom wall 102e is joined to the inclined lower edges of the left side wall 102c and the right side wall 102d declining toward the front, and the lower edges of the front wall 102a and the rear wall 102e. An air inlet pipe 102f having open upper and open lower ends is connected to the front end part of the bottom wall 102e with its axis extended vertically.

Figure 13:
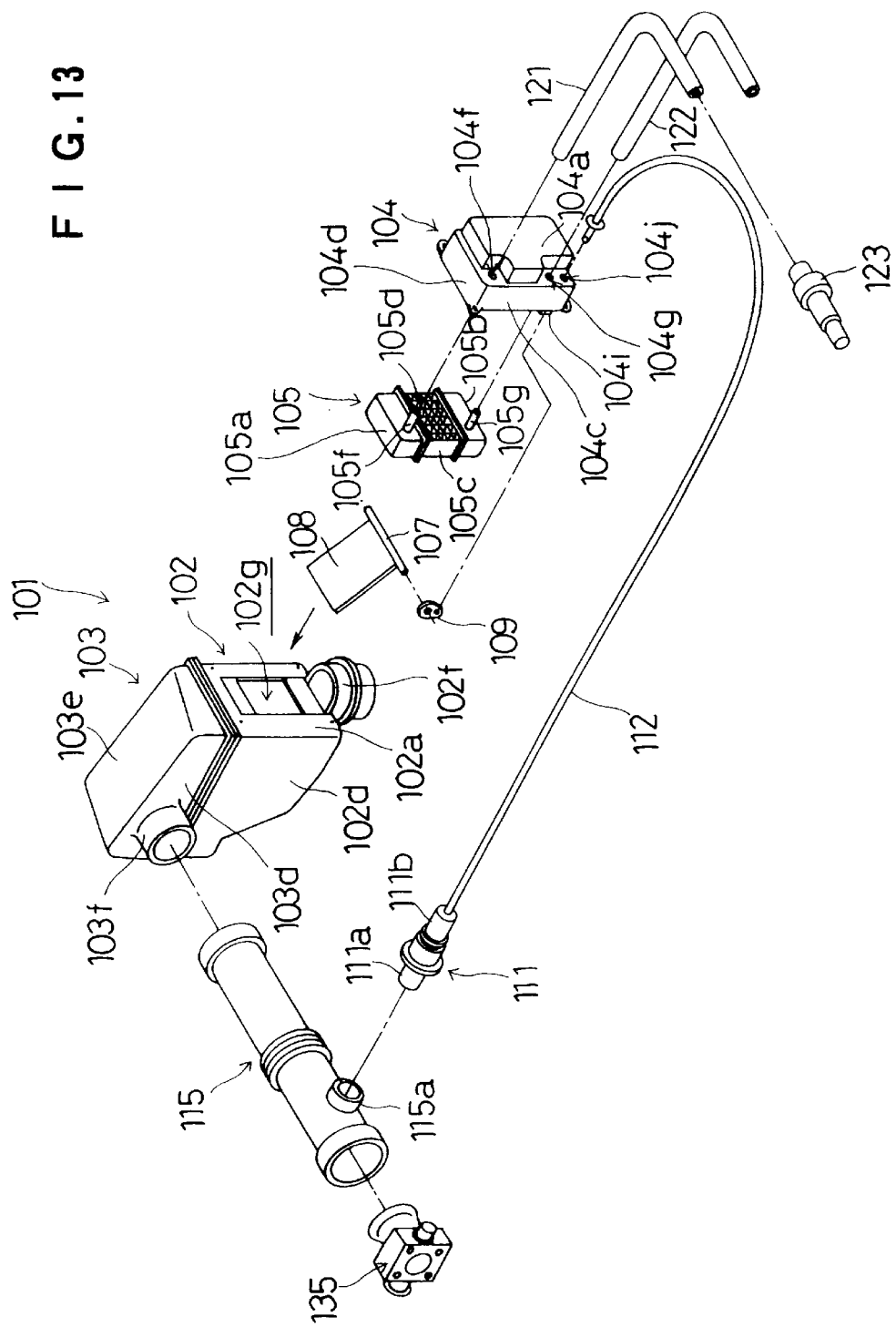
FIG. 13 is an exploded perspective view of an air cleaner provided with an air heater in a fourth embodiment according to the present invention.
Figure 14:
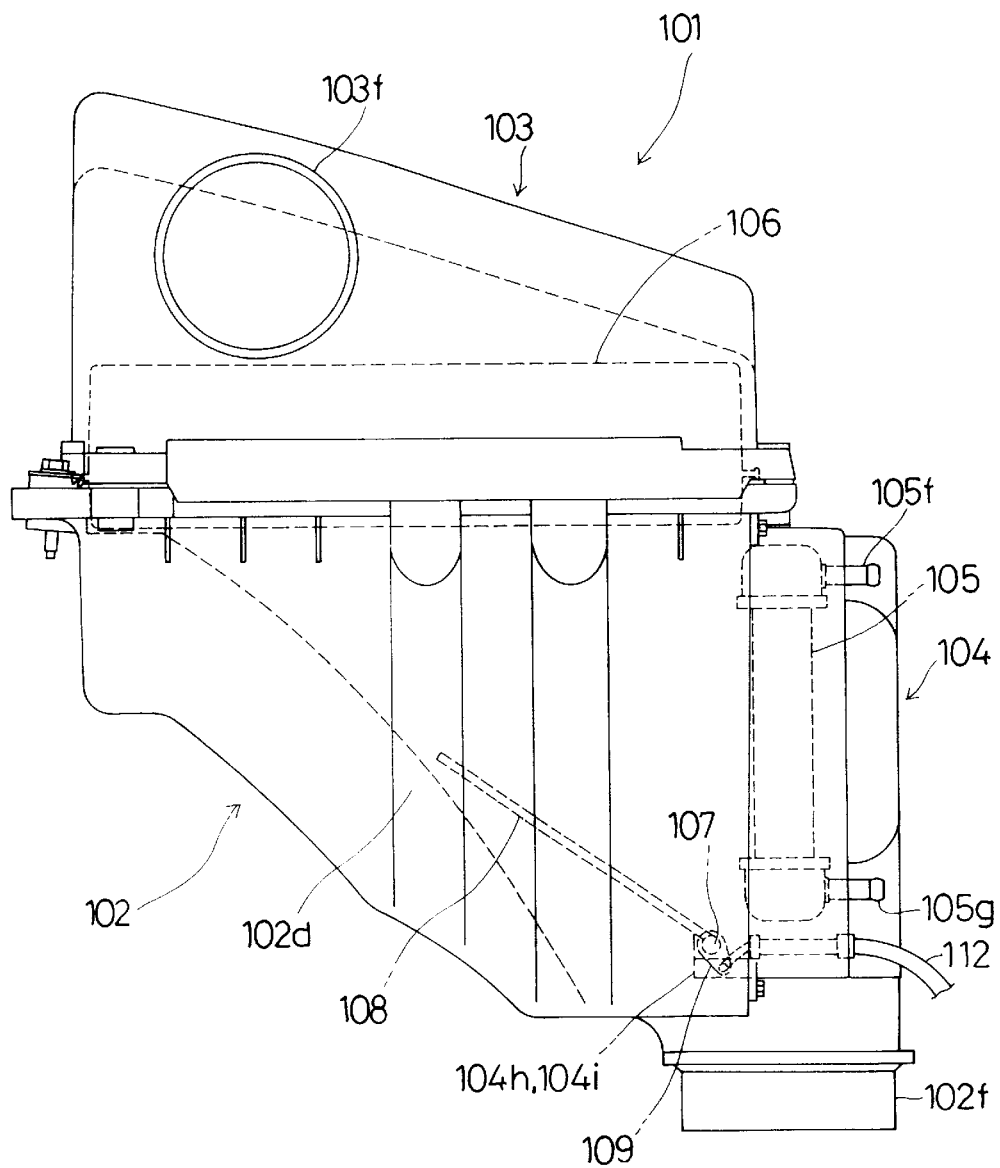
FIG. 14 is a side elevation of the air cleaner shown in FIG. 13.

Referring to FIG. 13, a front half part of the air inlet pipe 102f protrudes forward from the front wall 102a, and a front half of the upper end opens on the outer side of the front wall 102a, and a rear half of the upper end of the same opens on the inner side of the front wall 102a. A large rectangular opening 102g is formed in the front wall 102a of the lower half case 102. The upper half case 103 has a rectangular, open, lower end defined by a parting surface corresponding to the parting surface of the lower half case 102 and has a front wall 103a, a rear wall 103b, a left side wall 103c, a right side wall 103d and a top wall 103e. The height of the front wall 103a is smaller than that of the rear wall 103b. The side walls 103c and 103d of a substantially trapezoidal shape extend between the front wall 103a and the rear wall 103b. The top wall 103e is connected to the inclined upper edges of the side walls 103c and 103d and the upper edges of the front wall 103a and the rear wall 103b. An air outlet pipe 103f projects to the right from a rear part of the right side wall 103d.

The air cleaner case is formed by joining together the respective parting surfaces of the lower half case 102 and the upper half case 103.

An air cleaner element 106 having a rectangular shape in a plane is fitted in the open lower end of the upper half case 103 in a horizontal position with a flange 106a thereof sandwiched between the respective parting surfaces of the lower half case 102 and the upper half case 103. A space extending under the air cleaner element 106 in the lower half case 102 is a dust chamber D, and a space extending over the air cleaner element 106 in the upper half case 103 is a clean chamber C.

The heat exchanger case 104 is fastened to the front wall 102a of the lower half case 102 with bolts so as to cover the open upper end of the air inlet pipe 102f. The heat exchanger case 104 has the shape of a substantially rectangular, shallow pan having a front wall 104a, a left side wall 104b, a right side wall 104c, and an upper wall 104d. The heat exchanger case 104 is attached to the front wall 102a of the lower half case 102 so as to cover the opening 102g and the front half part of the open upper end of the air inlet pipe 102f protruding forward from the front wall 102a of the lower half case 102 to define a heating passage 104e. A heat exchanger 105 is fitted in the open rear part of the heat exchanger case 104 so that the front surface thereof faces the heating passage 104e and the rear surface thereof faces the rectangular opening 102g when the heat exchanger case 104 is attached to the lower half case 102. The cooling water of the internal combustion engine 120 is circulated through the heat exchanger 105 and exchanges heat with intake air.

Basically, the heat exchanger 105 is similar in construction to the radiator of the internal combustion engine 120. As shown in FIG. 13, the heat exchanger 105 comprises an upper water tank 105a, a lower water tank 105b, a plurality of tubes 105c having a flat cross section and extended in parallel to each other between the upper water tank 105a and the lower water tank 105b, and corrugated fins 105d disposed between and attached to the adjacent tubes 105c. An inlet connector 105f and an outlet connector 105g are attached to right parts (left parts as viewed in FIG. 13) of the respective front walls of the upper water tank 105a and the lower water tank 105b, respectively, so as to extend forward. The heat exchanger case 104 is provided with round holes 104f and 104g provided with grommets. When the heat exchanger 105 is fitted in the heat exchanger case 104, the inlet connector 105f and the outlet connector 105g extend through the round holes 104f and 104g, respectively, and project outside from the front surface of the heat exchanger case 104.

Support arms 104h and 104i are extended rearward from the lower ends of the left side wall 104b and the right side wall 104c of the heat exchanger case 104, a turnable shaft 107 is supported for turning on respective rear end parts of the support arms 104h and 104i, and a rectangular passage selector plate 108 is fixed to the turnable shaft 107. A turning arm 109 is mounted on one end part of the turnable shaft 107. Those components of the air heater are assembled in a unit on the heat exchanger case 50. As shown in FIG. 15, the support arms 104h and 104i extend into the dust chamber D so as to lie below the rectangular opening 102g of the front wall 102a of the lower half case 102 when the heat exchanger case 104 combined with the heat exchanger 105 and the passage selector plate 108 is attached to the lower half case 102. The passage selector plate 108 is able to turn in the dust chamber D between a heating passage closing position indicated by imaginary lines in FIG. 15 where the passage selector plate 108 is vertical and is in close contact with the inner surface of the front wall 102a of the lower half case 102 to cover the rectangular opening 102g, and a bypass passage closing position indicated by continuous lines in FIG. 15 where the free edge of the passage selector plate 108 is in contact with the inner surface of the inclined bottom wall 102e of the lower half case 102 to close a bypass passage. When the passage selector plate 108 is at the bypass passage closing position indicated by continuous lines, the heating passage 104e passing through the heat exchanger 105 is opened and the bypass passage directly connected to the dust chamber D is closed. When the passage selector plate 108 is at the heating passage closing position indicated by imaginary lines, the heating passage 104e is closed and the by pass passage directly connected to the dust space D is opened.

As shown in FIG. 13, an intake duct 115 is connected to the air inlet pipe 103f connected to the upper half case 103. The intake duct 115 is connected through a throttle valve 135 to the internal combustion engine 120. A connector 115a is attached to a part of the intake duct 115 on the upstream side of and near the throttle valve 135, and a thermosensitive driving device 111 is connected to the connector 115a. The thermosensitive driving device 111 comprises a temperature sensor 111a containing a wax and an actuating member 111b extending from the temperature sensor 111a. The thermosensitive driving device 111 is attached to the connector 115a with the temperature sensor 111a inserted in the intake duct 115. A flexible cable 112 has one end connected to the actuating member 111b, and the other end connected to the free end of the turning arm 109 mounted on the turnable shaft 107 fixedly holding the passage selector plate 108. The flexible cable 112 is extended into the heat exchanger case 104 through a small hole 104j formed below the round hole 104g in the heat exchanger case 104.

FIG. 16 is a typical view of the air heater incorporated into the intake system of the internal combustion engine 120. The interior of the air cleaner case of the air cleaner 101 is divided into the dust chamber D and the clean chamber C by the air cleaner element 106. The passage selector plate 108 for selectively opening the heating passage 104e passing through the heat exchanger 105 or the bypass passage is disposed in the dust chamber D. The thermosensitive driving device 111 is connected to the intake duct 115 connecting the clean chamber C to the throttle valve 135 with its temperature sensor 111a inserted in the intake duct 115. The thermosensitive driving device 111 operates the passage selector plate 108 through the flexible cable 112 according to the temperature of intake air flowing through the intake duct 115.

Figure 17:
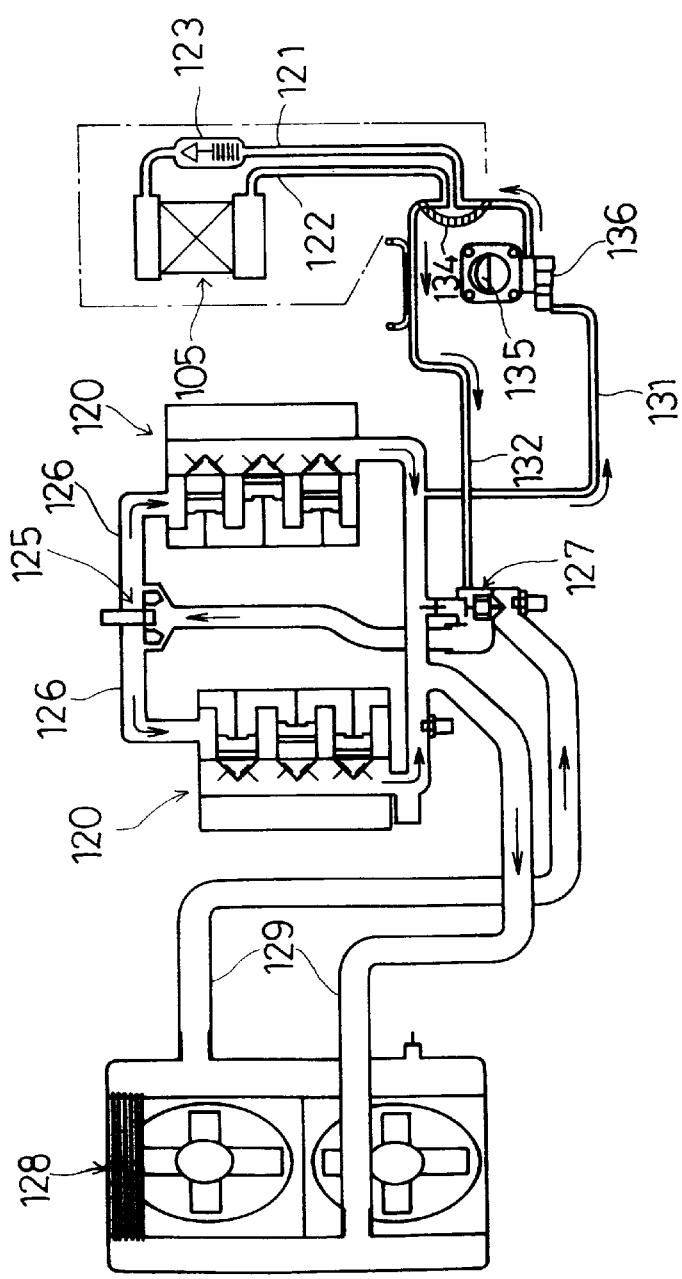
FIG. 17 is a schematic view of principal cooling water circulating passages included in an internal combustion engine.

As shown in FIG. 13, a cooling water inlet pipe 121 provided with a wax type shutoff valve 123 and a cooling water outlet pipe 122 are connected to the inlet connector 105f and the outlet connector 105g projecting outside from the front surface of the heat exchanger case 104, respectively. As shown in FIG. 17, the cooling water of the internal combustion engine 120 is circulated through the heat exchanger 105.

Referring to FIG. 17, showing principal cooling water circulating passages of the internal combustion engine 120, the cooling water is urged to flow through a cooling water circulating passage 126 connected to a radiator 128 for the internal combustion engine 120 and provided with a thermostat 127 by a water pump 125. The thermostat 127 opens or closes the cooling water circulating passage 126 according to the temperature of the cooling water to circulate the cooling water through the radiator 128 or to stop the circulation of the cooling water through the radiator 128. While the internal combustion engine 120 is in a warming-up period subsequent to the start of the same, the cooling water circulating passage 126 connected to the radiator 128 is closed to make the cooling water flow only through the internal combustion engine 120. After the temperature of the cooling water has risen to a predetermined temperature and the internal combustion engine 120 has warmed up, the cooling water circulating passage 126 is opened to circulate the cooling water cooled by the radiator 128 through the internal combustion engine 120 for cooling.

A first bypass passage 131 has one end connected to a section of the cooling water circulating passage 126 on the downstream side of the internal combustion engine 120, and the other end connected to the cooling water supply pipe 121. A second bypass passage 132 has one end connected to a section of the cooling water circulating passage 126 on the downstream side of the thermostat 127, and the other end connected to the cooling water discharge pipe 122. The first bypass passage 131 and the second bypass passage 132 are connected by a connecting passage 134. The cooling water is circulated continuously through the bypass passages 131 and 132 and the connecting passage 134 regardless of the condition of the thermostat 127 while the internal combustion engine 120 is in operation for icing prevention. The bypass passages 131 and 132 are icing-preventive bypass passages originally included in the internal combustion engine 120 to prevent the icing of an air control valve 136 for controlling secondary air supply. The cooling water supply pipe 121 and the cooling water discharge pipe 122 are connected to the bypass passages 131 and 132 to circulate the cooling water through the heat exchanger 105. The hot cooling water immediately after being discharged from the internal combustion engine 120 is supplied through the first bypass passage 131 to the heat exchanger 105. Therefore, the cooling water heated by the internal combustion engine 120 starts flowing through the heat exchanger 105 immediately after the start of the internal combustion engine 120 to heat intake air in the air cleaner 101. When intake air need not be heated, the shutoff valve 123 closes the cooling water supply pipe 121 to stop supplying the cooling water to the heat exchanger 105.

Thus, the heat exchanger 105 through which the cooling water of the internal combustion engine 120 circulates is fitted in the heat exchanger case 104, and the heat exchanger case 104 is attached to the air cleaner case with the heat exchanger 105 facing the dust chamber D.

In a state where the temperature of the atmosphere is low and the internal combustion engine 120 has just been started, the passage selector plate 108 is set at the position indicated by continuous lines in FIG. 15 to close the bypass passage directly connected to the dust chamber D and to open the heating passage 104e formed in the heat exchanger case 104 on the upstream side of the heat exchanger 105. Then, intake air flows through the air inlet pipe 102f into the heating passage 104e as indicated by the arrows, intake air is heated by the heat exchanger 105 while the same flows through spaces between the corrugated fins 105d of the heat exchanger 105, heated intake air flows upward through the dust chamber D and is filtered and cleaned by the air cleaner element 106, and heated, clean intake air is supplied through the clan chamber C, the air outlet pipe 103f and the throttle valve 135 to the internal combustion engine 120.

Air of a very low temperature has a large density. As mentioned above, engine output will drop if unheated intake air of such a very low temperature is supplied to the internal combustion engine 120. Therefore, intake air is heated in the air cleaner 101 by the heat exchanger 105 through which the cooling water, the temperature of which starts rising immediately after the start of the internal combustion engine, is circulated to supply intake air of an appropriate density capable of promoting the atomization of the fuel. Thus, the reduction of engine output can be suppressed and the fuel consumption rate of the internal combustion engine 120 can be improved.

Knocking occurs if the temperature of intake air is excessively high. The thermosensitive driving device 111 turns the passage selector plate 108 to a position indicated by imaginary lines in FIG. 15 to close the heating passage 104e formed in the heat exchanger case 104 and to open the bypass passage directly connected to the dust chamber D when the temperature of the cooling water rises as the internal combustion engine 120 continues operating and the temperature of intake air rises beyond a predetermined level. Consequently, intake air flows directly into the dust chamber D as indicated by the arrow of broken lines, flows without being heated through the air cleaner element 106, and thus cleaned intake air is supplied to the internal combustion engine 120. Thus, the passage selector plate 108 is operated automatically so as to close the heating passage 104e and to open the bypass passage, and the timing of operation of the passage selector plate 108 is adjusted properly according to the temperature of intake air in the intake duct 115 to stop heating intake air in satisfactory response to the variation of the temperature of intake air. Thus, the reduction of engine output, the occurrence of knocking and the increase of fuel consumption rate due to the excessively high temperature of intake air can be prevented. The shutoff valve 123 closes to stop circulating the cooling water through the heat exchanger 105 when the temperature of the cooling water rises beyond a predetermined level.

Since the heat exchanger 105 and the passage selector plate 108 of the air heater in the fourth embodiment is placed in and supported on the heat exchanger case 104, the air heater can easily be attached to and removed from the air cleaner 101. If the air heater is unnecessary, the heat exchanger case 104 is removed from the lower half case 102 of the air cleaner case, and only the heat exchanger case 104 may be attached to the lower half case 102 of the air cleaner case. Thus, the air heater can optionally be incorporated into various types of air cleaners when necessary.

Since the thermosensitive driving device 111 attached to the intake duct 115 is connected to the passage selector plate 108 supported on the heat exchanger case 104 by the flexible cable 112, the degree of freedom of arrangement of parts in the engine room is increased. The thermosensitive driving device 111 may be connected to the passage selector plate 108 by a linkage. Although only the temperature sensor 111*a* of the thermosensitive driving device 111 is inserted in the intake duct 115 in this embodiment, the thermosensitive driving device 111 may wholly be inserted in the intake duct 115 and only the flexible cable 112 may be extended outside the intake duct 115.

Figure 18:
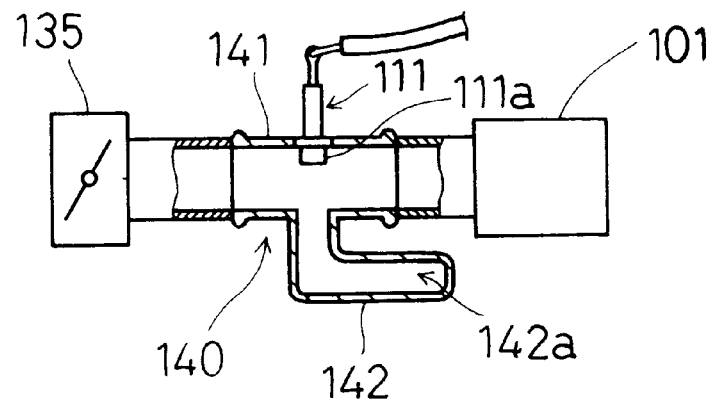
FIG. 18 is a schematic sectional view of a structure formed by attaching a thermosensitive driving device to an intake duct provided with a silencer.
Figure 19:
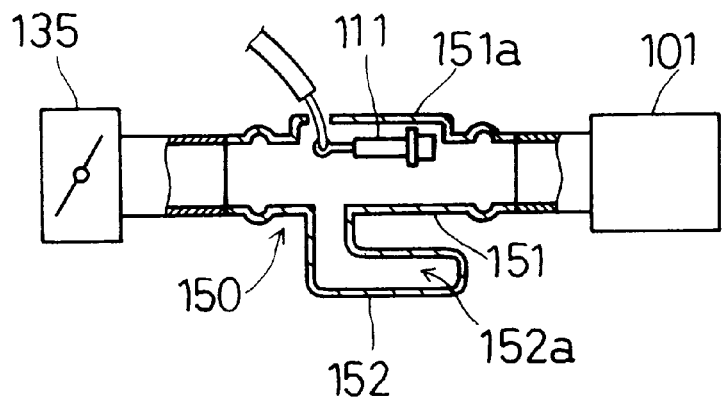
FIG. 19 is a schematic sectional view of another structure formed by attaching a thermosensitive driving device to an intake duct provided with a silencer.
Figure 20:
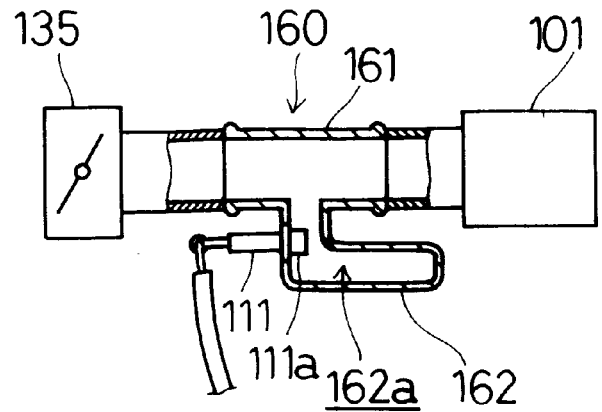
FIG. 20 is a schematic sectional view of a third structure formed by attaching a thermosensitive driving device to an intake duct provided with a silencer.

FIGS. 18 to 20 show combinations of the thermosensitive driving device 111 with different intake ducts with silencer.

Referring to FIG. 18, an intake duct 140 connecting the air cleaner 101 to the throttle valve 135 comprises, in an integral construction, a main duct 141 and an L-shaped branch tube 142 connected to the main duct 141 and having a closed end. The branch tube 142 defines a silencing chamber 142*a*. The temperature sensor 11*a* of the thermosensitive driving device 111 is inserted in the main duct 141. The branch tube 142 formed integrally with the main duct 141 enhances the structural strength of the intake duct 140.

Referring to FIG. 19, an intake duct 150 connecting the air cleaner 101 to the throttle valve 135 comprises, in an integral construction, a main duct 151 and an L-shaped branch tube 152 connected to the main duct 151 and having a closed end. The thermosensitive driving device 111 is inserted wholly in an expanded part 151*a* formed in the main duct 151. The thermosensitive driving device 111 is attached firmly to the intake duct 150 having a high strength.

Referring to FIG. 20, an intake duct 160 connecting the air cleaner 101 to the throttle valve 135 comprises, in an integral construction, a main duct 161 and an L-shaped branch tube 162 connected to the main duct 151 and having a closed end. The thermosensitive driving device 111 is inserted wholly in an expanded part 151*a* formed in the main duct 151. The thermosensitive driving device 111 is attached to the branch tube 162 with its temperature sensor 111*a* inserted in the branch tube 162. The temperature of intake air being actually supplied to the internal combustion engine can be measured in a silencing chamber 162*a* defined by the branch tube 162 without being affected by the flow of intake air, so that an intake air heating operation can be controlled on the basis of the accurately measured temperature of intake air.

It is desirable that the thermosensitive driving device 111 is attached to the intake duct or the branch tube so that the thermosensitive driving device 111 is not exposed to the effect of wind. The thermosensitive driving device 111 is attached to a rear part of the intake duct with respect to the traveling direction of the vehicle or the front side of the thermosensitive driving device 111 is covered with a component of the vehicle, such as a battery, or a cover to shield the thermosensitive driving device 111 from the direct effect of wind.

Fifth Embodiment

An air heater in a fifth embodiment according to the present invention will be described with reference to FIG. 21, in which parts like or corresponding to those of the air heater in the fourth embodiment are designated by the same reference characters and the description thereof will be omitted to avoid duplication.

The air heater in the fifth embodiment is similar in construction to the air heater in the fourth embodiment, except that the former is different from the latter in the following particulars. Referring to FIG. 21, the air heater in the fifth embodiment is provided with a passage selector plate 173 supported for turning in the air inlet pipe 102*f* connected to the lower half case 102. A heat exchanger case 170 has side walls provided at their lower end parts with support members 171. A turnable shaft 172 is supported for turning on the support members 171 below the heat exchanger 105, and the base end edge of the passage selector plate 173 fixed to the turnable shaft 172. The passage selector plate 173 has a lower part having a circular free edge and inserted in the air inlet pipe 102*f*. A turning arm 174 is mounted on one end part of the turnable shaft 172, and the flexible cable 112 connected to the thermosensitive driving device, not shown, attached to the intake duct, not shown, is connected to the free end of the turning arm 174 in the heat exchanger case 170.

Figure 21:
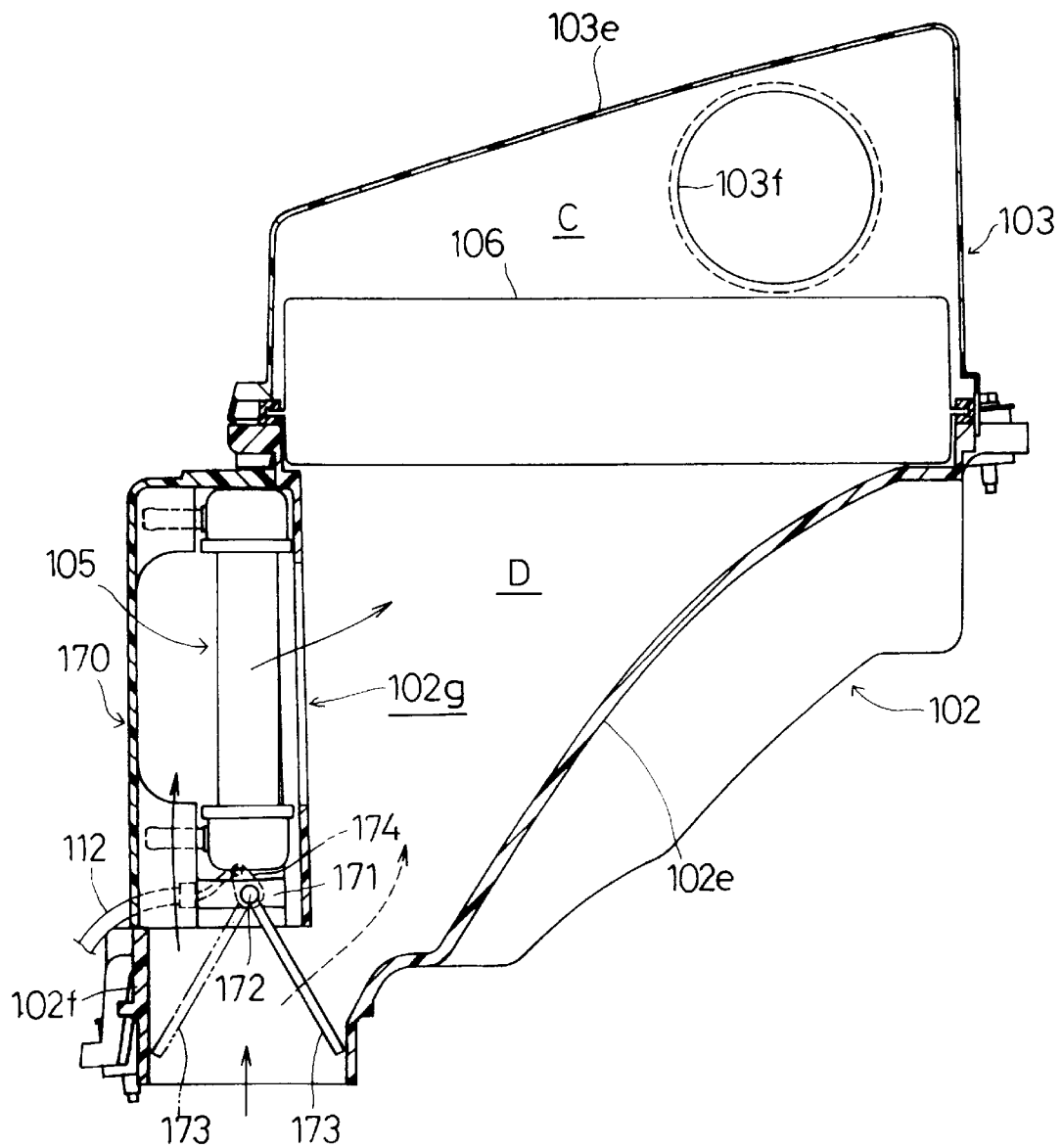
FIG. 21 is a sectional view of an air cleaner provided with an air heater in a fifth embodiment according to the present invention.

In a state where the temperature of the atmosphere is low and the internal combustion engine 120 has just been started, the passage selector plate 173 is set at the position indicated by continuous lines in FIG. 21 to close the bypass passage directly connected to the dust chamber D and to open the heating passage formed in the heat exchanger case 170 on the upstream side of the heat exchanger 105. Then, intake air flows through the air inlet pipe 102*f* into the heating passage as indicated by the arrows, intake air is heated by the heat exchanger 105 while the same flows through the heat exchanger 105, heated intake air flows upward through the dust chamber D and is filtered and cleaned by the air cleaner element 106, and heated, clean intake air is supplied through the clean chamber C, the air outlet pipe 103*f* and the throttle valve 135 to the internal combustion engine 120. Intake air is heated when the temperature of the atmosphere is very low to supply intake air of an appropriate temperature capable of promoting the atomization of the fuel. Thus, the reduction of engine output can be suppressed and the fuel consumption rate of the internal combustion engine 120 can be improved. If the temperature of intake air actually being supplied to the internal combustion engine 120 rises beyond a predetermined temperature, the thermosensitive driving device 111 sets the passage selector plate 173 at a position indicated by imaginary lines in FIG. 21 to close the heating passage passing through the heat exchanger 105 and to open the bypass passage directly connected to the dust chamber D. Consequently, intake air flows into the dust chamber D as indicated by the arrow of broken lines without being heated, is filtered and cleaned by the air cleaner element 106 and cleaned intake air is supplied to the internal combustion engine 120.

Thus, the passage selector plate 173 is operated automatically so as to close the heating passage and to open the bypass passage, and the timing of operation of the passage selector plate 173 is adjusted properly according to the temperature of intake air in the intake duct 115 to stop heating intake air in satisfactory response to the variation of the temperature of intake air. Thus, the reduction of engine output, the occurrence of knocking and the increase of fuel consumption rate due to the excessively high temperature of intake air can be prevented.

The temperature sensor 111a of the thermosensitive driving device 111 may be of either a wax type or a coil spring type using a coil spring of a shape memory alloy. A thermosensitive driving device provided with a coil spring of a shape memory alloy is simple and small in construction and is effective in forming the air heater in a compact construction.

Sixth Embodiment

Referring to FIGS. 22 to 25, an air cleaner 201 for an internal combustion engine 220 has a lower half case 202 and an upper half case 203 put on and joined to the lower half case 202. A heat exchanger case 204 is attached to a front wall 202a of the lower half case 202. The lower half case 202 has a rectangular, open, upper end defined by a parting surface, and has the front wall 202a, a rear wall 202b, a substantially triangular left side wall 202c, a substantially triangular right side wall 202d, and a bottom wall 202e. The bottom wall 202e is joined to the inclined lower edges of the left side wall 202c and the right side wall 202d declining toward the front, and the lower edges of the front wall 202a and the rear wall 202b.

Figure 22:
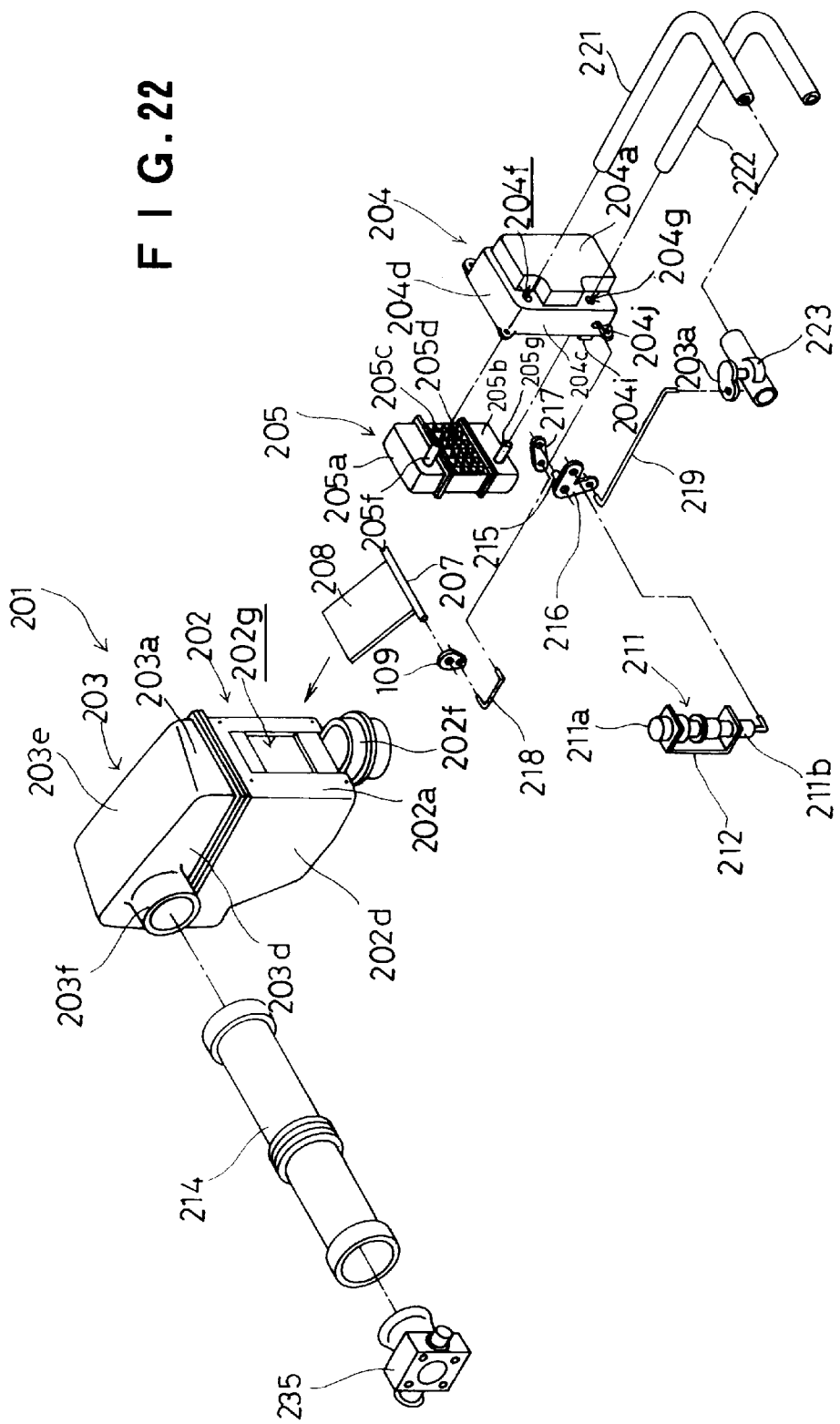
FIG. 22 is an exploded perspective view of an air cleaner provided with an air heater in a sixth embodiment according to the present invention.
Figure 23:
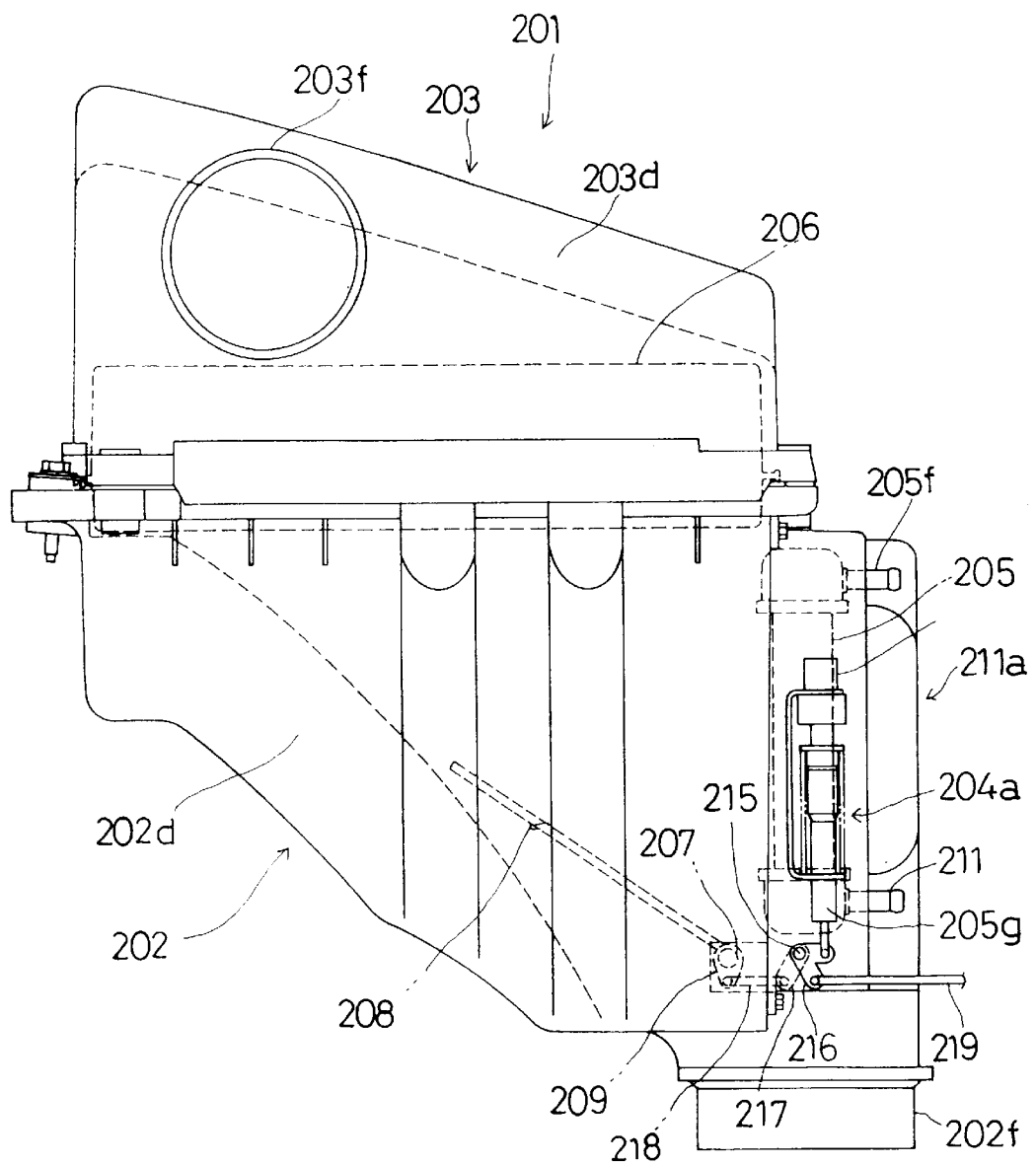
FIG. 23 is a side elevation of the air cleaner shown in FIG. 22.

Referring to FIG. 22, an air inlet pipe 202f having open upper and open lower ends is connected to the front end part of the bottom wall 202e with its axis extended vertically so as to protrude forward. A front half part of the air inlet pipe 202f protrudes forward from the front wall 202a, and a front half of the upper end opens on the outer side of the front wall 202a, and a rear half of the upper end of the same opens on the inner side of the front wall 202a. A large rectangular opening 202g is formed in the front wall 202a of the lower half case 202. The upper half case 203 has a rectangular, open, lower end defined by a parting surface corresponding to the parting surface of the lower half case 202 and has a front wall 203a, a rear wall 203b, a left side wall 203c, a right side wall 203d and a top wall 203e. The height of the front wall 203a is smaller than that of the rear wall 203b. The side walls 203c and 203d of a substantially trapezoidal shape extend between the front wall 203a and the rear wall 203b. The top wall 203e is connected to the inclined upper edges of the side walls 203c and 203d and the upper edges of the front wall 203a and the rear wall 203b. An air outlet pipe 203f projects to the right from a rear part of the right side wall 203d. The air cleaner case is formed by joining together the respective parting surfaces of the lower half case 202 and the upper half case 203.

Figure 24:
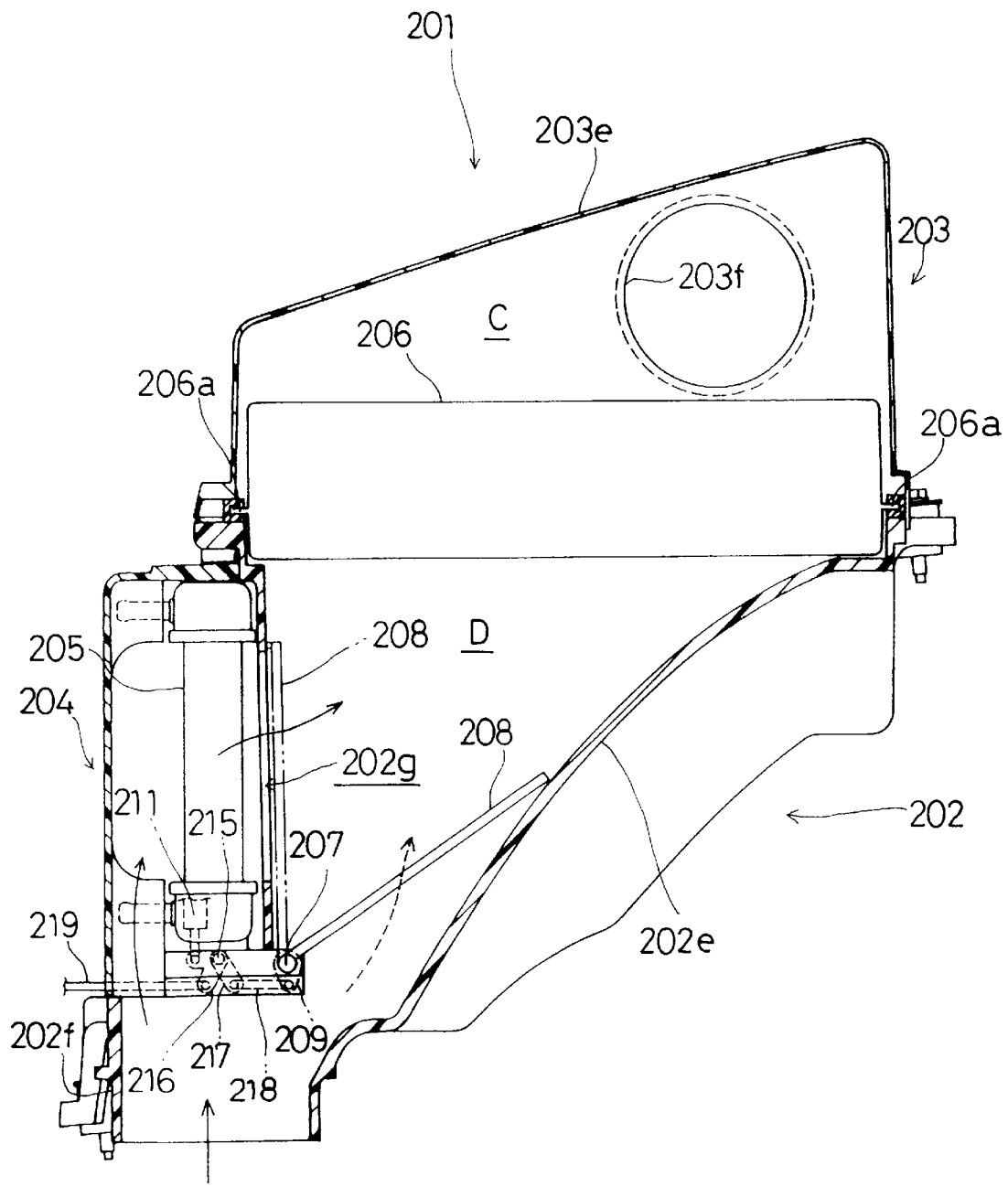
FIG. 24 is a sectional view of the air cleaner shown in FIG. 22.

As shown in FIG. 24, an air cleaner element 206 having a rectangular shape in a plane is fitted in the open lower end of the upper half case 203 in a horizontal position with a flange 206a thereof sandwiched between the respective parting surfaces of the lower half case 202 and the upper half case 203. A space extending under the air cleaner element 206 in the lower half case 202 is a dust chamber D, and a space extending over the air cleaner element 206 in the upper half case 203 is a clean chamber C.

The heat exchanger case 204 is fastened to the front wall 202a of the lower half case 202 with bolts so as to cover the open upper end of the air inlet pipe 202f. The heat exchanger case 204 has the shape of a substantially rectangular, shallow pan having a front wall 204a, a left side wall 204b, a right side wall 204c, and an upper wall 204d. The heat exchanger case 204 is attached to the front wall 202a of the lower half case 202 so as to cover the opening 202g and the front half part of the open upper end of the air inlet pipe 202f protruding forward from the front wall 202a of the lower half case 202 to define a heating passage 204e. A heat exchanger 205 having a rectangular shape in a plane is fitted in the open rear part of the heat exchanger case 204 so that the front surface thereof faces the heating passage 204e and the rear surface thereof faces the rectangular opening 202g when the heat exchanger case 204 is attached to the lower half case 202. The cooling water of the internal combustion engine 220 is circulated through the heat exchanger 205 and exchanges heat with intake air.

Basically, the heat exchanger 205 is similar in construction to the radiator of the internal combustion engine 220. As shown in FIG. 22, the heat exchanger 205 comprises an upper water tank 205a, a lower water tank 205b, a plurality of tubes 205c having a flat cross section and extended in parallel to each other between the upper water tank 205a and the lower water tank 205b, and corrugated fins 205d disposed between and attached to the adjacent tubes 205c. An inlet connector 205f and an outlet connector 205g are attached to right parts (left parts as viewed in FIG. 22) of the respective front walls of the upper water tank 205a and the lower water tank 205b, respectively, so as to extend forward. The heat exchanger case 204 is provided with round holes 204f and 204g provided with grommets. When the heat exchanger 205 is fitted in the heat exchanger case 204, the inlet connector 205f and the outlet connector 205g extend through the round holes 204f and 204g, respectively, and project outside from the front surface of the heat exchanger case 204. As shown in FIG. 22, a cooling water inlet pipe 221 provided with a shutoff valve 223 and a cooling water outlet pipe 222 are connected to the inlet connector 205f and the outlet connector 205g projecting outside from the front surface of the heat exchanger case 204, respectively. The cooling water of the internal combustion engine 220 is circulated through the heat exchanger 205.

Support arms 204h and 204i are extended rearward from the lower ends of the left side wall 204b and the right side wall 204c of the heat exchanger case 204, a turnable shaft 207 is supported for turning on respective rear end parts of the support arms 204h and 204i, and a rectangular passage selector plate 208 is fixed to the turnable shaft 207. A turning arm 209 is mounted on one end part of the turnable shaft 207. A round hole 204j is formed in a lower part of the right side wall 204c of the heat exchanger case 204, and a turnable shaft 215 is fitted in the round hole 204j and is supported for turning on the right side wall 204c. A bend in an L-shaped lever 216 is fixedly connected to an outer end part of the turnable shaft 215 projecting outside from the right side wall 204c. A turning arm 217 is fixedly mounted on an inner end part of the turnable shaft 215. The turning arm 217 is linked to the turning arm 209 fixedly mounted on the turnable shaft 207 by a connecting rod 218 extended inside the heat exchanger case 204, and the free end of one of the arms of the L-shaped lever 216 is linked to an operating member 223a for operating the shutoff valve 223 by a connecting rod 219 extended outside the heat exchanger case 204 to construct a linkage.

A thermosensitive driving device 211 is attached to a part of the right side wall 204c above the L-shaped lever 216. The thermosensitive driving device 211 has a wax type temperature sensor 211a, an actuating rod 211b extended from the temperature sensor 211a, and a holder 212 holding the temperature sensor 211a. The holder 212 is attached to the right side wall 204c so that the actuating rod 211b extends downward. The lower end of the actuating rod 211b of the thermosensitive driving device 211 is connected to the free end of the other arm of the L-shaped lever 216. When the actuating rod 211b of the thermosensitive driving device 211 is moved vertically, the L-shaped lever 2316 is turned about the axis of the turnable shaft 215 to open or close the shutoff valve 223 through the connecting rod 219 and, at the same time, to turn the turning arm 217 fixedly mounted on the turnable shaft 215, whereby the turning arm 209 and the passage selector plate 208 are turned to open or close the heating passage.

Principal components of the air heater including the heat exchanger 205, the thermosensitive driving device 211, the passage selector plate 208, and the linkage are mounted on the heat exchanger case 204. As shown in FIG. 24, the support arms 204h and 204i extend into the dust chamber D so as to lie below the rectangular opening 202g of the front wall 202a of the lower half case 202 when the heat exchanger case 204 is attached to the lower half case 202. The passage selector plate 208 supported on the rear end parts of the support arms 204h and 204i is able to turn in the dust chamber D between a heating passage closing position indicated by imaginary lines in FIG. 24 where the passage selector plate 208 is vertical and is in close contact with the inner surface of the front wall 202a of the lower half case 202 to cover the rectangular opening 202g, and a bypass passage closing position indicated by continuous lines in FIG. 24 where the free edge of the passage selector plate 208 is in contact with the inner surface of the inclined bottom wall 202e of the lower half case 202 to close a bypass passage. When the passage selector plate 208 is at the bypass passage closing position indicated by continuous lines, the heating passage 204e passing through the heat exchanger 205 as indicated by the arrows is opened and the bypass passage directly connected to the dust chamber D as indicated by the arrow of broken lines is closed. When the passage selector plate 208 is at the heating passage closing position indicated by imaginary lines, the heating passage 204e is closed and the by pass passage directly connected to the dust space D is opened.

As shown in FIG. 22, an intake duct 214 is connected to the air inlet pipe 203f connected to the upper half case 203. The intake duct 214 is connected through a throttle valve 235 to the internal combustion engine 220.

Figure 25:
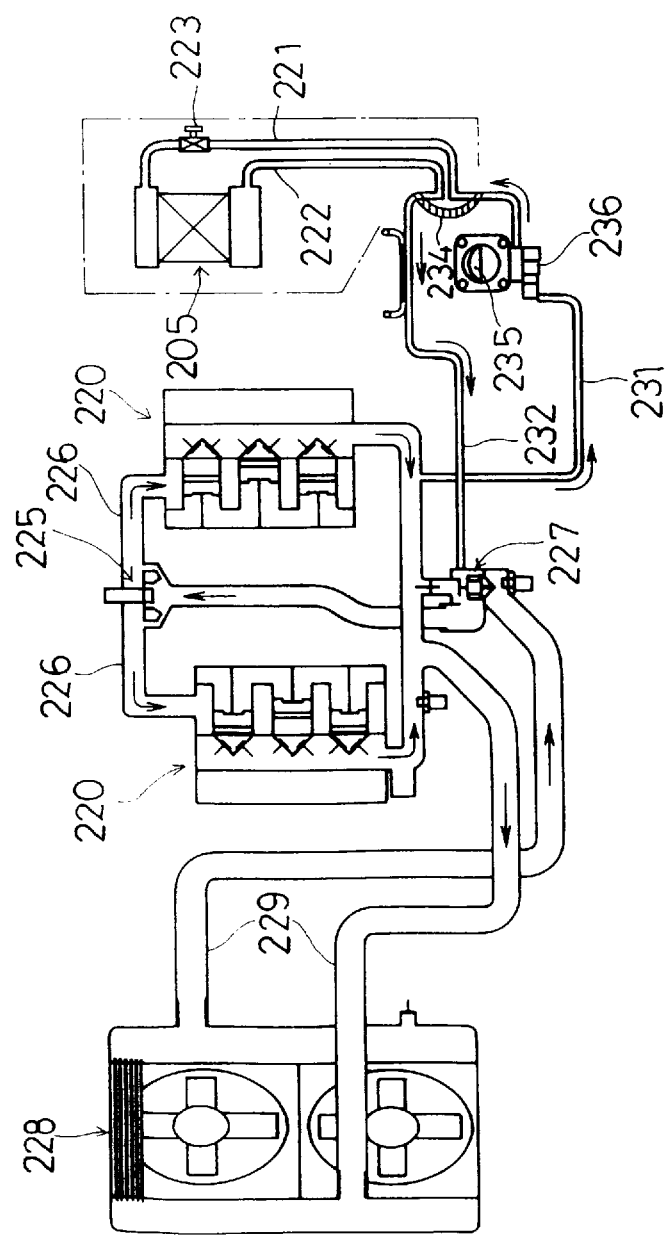
FIG. 25 is a schematic view of principal cooling water circulating passages included in an internal combustion engine.

FIG. 25 is a typical view of the air heater incorporated into the intake system of the internal combustion engine 220. The cooling water of the internal combustion engine 220 is circulated through the heat exchanger 205 as shown in FIG. 25 to heat intake air in the air cleaner.

Referring to FIG. 25, showing principal cooling water circulating passages of the internal combustion engine 120, the cooling water is urged to flow through a cooling water circulating passage 226 connected to a radiator 228 for the internal combustion engine 220 and provided with a thermostat 227 by a water pump 225. The thermostat 227 opens or closes the cooling water circulating passage 226 according to the temperature of the cooling water to circulate the cooling water through the radiator 228 or to stop the circulation of the cooling water through the radiator 228. While the internal combustion engine 220 is in a warming-up period subsequent to the start of the same, the cooling water circulating passage 226 connected to the radiator 228 is closed to make the cooling water flow only through the internal combustion engine 220. After the temperature of the cooling water has risen to a predetermined temperature and the internal combustion engine 220 has warmed up, the cooling water circulating passage 226 is opened to circulate the cooling water cooled by the radiator 228 through the internal combustion engine 220 for cooling.

A first bypass passage 231 has one end connected to a section of the cooling water circulating passage 226 on the downstream side of the internal combustion engine 220, and the other end connected to the cooling water supply pipe 221. A second bypass passage 232 has one end connected to a section of the cooling water circulating passage 126 on the downstream side of the thermostat 227, and the other end connected to the cooling water discharge pipe 222. The first bypass passage 231 and the second bypass passage 232 are connected by a connecting passage 234. The cooling water is circulated continuously through the bypass passages 231 and 232 and the connecting passage 234 for icing prevention regardless of the condition of the thermostat 227 while the internal combustion engine 220 is in operation. The bypass passages 231 and 232 are icing-preventive bypass passages originally included in the internal combustion engine 220 to prevent the icing of the throttle valve 235 and an air control valve 236 for controlling secondary air supply. The cooling water supply pipe 221 and the cooling water discharge pipe 222 are connected to the bypass passages 231 and 232 to circulate the cooling water through the heat exchanger 205. The hot cooling water immediately after being discharged from the internal combustion engine 220 is supplied through the first bypass passage 231 to the heat exchanger 205. Therefore, the cooling water heated by the internal combustion engine 220 starts flowing through the heat exchanger 205 immediately after the start of the internal combustion engine 220 to heat intake air in the air cleaner 201. When intake air need not be heated, the shutoff valve 223 closes the cooling water supply pipe 221 to stop supplying the cooling water to the heat exchanger 205.

Thus, the heat exchanger 205 through which the cooling water of the internal combustion engine 220 circulates is fitted in the heat exchanger case 204, and the heat exchanger case 204 is attached to the air cleaner case with the heat exchanger 205 facing the dust chamber D.

The thermosensitive driving device 211 is attached to the outer surface of the side wall of the heat exchanger case 204. The temperature sensor 211a senses the temperature of air around the intake duct approximately equal to the temperature of intake air actually supplied to the internal combustion engine 220. The timing of changing the position of the passage selector plate 208 is adjusted properly to supply intake air of an appropriate temperature to the internal combustion engine 220.

In a state where the temperature of the atmosphere is low and the internal combustion engine 220 has just been started, the passage selector plate 208 is set at the position indicated by continuous lines in FIG. 24 to close the bypass passage directly connected to the dust chamber D and to open the heating passage 204e formed in the heat exchanger case 204 on the upstream side of the heat exchanger 205. Then, intake air flows through the air inlet pipe 202f into the heating passage 204e as indicated by the arrows, intake air is heated by the heat exchanger 205 while the same flows through spaces between the corrugated fins 205d of the heat exchanger 205, heated intake air flows upward through the dust chamber D and is filtered and cleaned by the air cleaner element 206, and heated, clean intake air is supplied through the clean chamber C, the air outlet pipe 203f and the throttle valve 235 to the internal combustion engine 220. In this state, the shutoff valve 223 is open and the cooling air heated by the internal combustion engine 220 circulates through the heat exchanger 205. When the temperature of the atmosphere is very low, the density of air is large and engine output will drop if such air having a large density is supplied to the internal combustion engine 220. Therefore, intake air is heated in the air cleaner 201 by the heat exchanger 205 through which the cooling water, the heating of which is started immediately after the start of the internal combustion engine 220, is circulated to supply intake air of an appropriate temperature capable of promoting the atomization of the fuel. Thus, the reduction of engine output can be suppressed and the fuel consumption rate of the internal combustion engine 220 can be improved.

Knocking is liable to occur if the temperature of intake air actually being supplied to the internal combustion engine 220 is excessively high. The thermosensitive driving device 211 operates the passage selector plate 208 and the shutoff valve 223 simultaneously through the linkage to stop circulating the cooling water through the heat exchanger 205 and to make intake air flow through the bypass passage in the air cleaner 201 after the temperature of the cooling water has risen, the temperature of intake air heated by the heat exchanger 205 has risen and the temperature of air around the intake duct 214 has risen beyond a predetermined temperature. The passage selector plate 208 is set at a position indicated by imaginary lines in FIG. 24 to cover the inner surface of the heat exchanger 205 and to open the bypass passage directly connected to the dust chamber D, and the shutoff valve 223 closes the passage through which the cooling water flows into the heat exchanger 205. Consequently, intake air flows into the dust chamber D as indicated by the arrow of broken lines without being heated, is filtered and cleaned by the air cleaner element 206 without being heated by the heat exchanger 205, and cleaned intake air is supplied to the internal combustion engine 220. Since the passage through which the cooling water is supplied to the heat exchanger 205 is closed by the shutoff valve 223, the rise of the temperature of the heat exchanger 205 placed in the air cleaner 201 is suppressed to reduce the effect of the heat exchanger 205 on intake air to the least possible extent and the reliable control of intake air heating can be achieved. Thus, the passage selector plate 208 is operated automatically so as to close the heating passage and to open the bypass passage, and the timing of operation of the passage selector plate 208 is adjusted properly according to the temperature of intake air in the intake duct 215 to stop heating intake air in satisfactory response to the variation of the temperature of intake air. Thus, the reduction of engine output, the occurrence of knocking and the increase of fuel consumption rate due to the excessively high temperature of intake air can be prevented.

Since passage selector plate 208 and the thermosensitive driving device 211 are held together with the heat exchanger 205 on the heat exchanger case 204, the air heater can easily be attached to and removed from the air cleaner 201. If the air heater is unnecessary, the heat exchanger case 204 holding the principal components of the air heater is removed from the air cleaner 201, and only the heat exchanger case 104 may be attached to the air cleaner 201. Thus, the air heater can optionally be incorporated into various types of air cleaners when necessary.

Seventh Embodiment

An air heater in a seventh embodiment according to the present invention will be described with reference to FIG. 26, in which parts like or corresponding to those of the air heater in the sixth embodiment are designated by the same reference characters and the description thereof will be omitted to avoid duplication.

The air heater in the seventh embodiment is similar in construction to the air heater in the sixth embodiment, except that the former is different form the latter in the following particulars. Referring to FIG. 26, the air heater in the seventh embodiment is provided with a passage selector plate 243 supported for turning in the air inlet pipe 202f connected to the lower half case 202. A heat exchanger case 240 has side walls provided at their lower end parts with support members 241. A turnable shaft 242 is supported for turning on the support members 241 below the heat exchanger 205, and the base end edge of the passage selector plate 243 fixed to the turnable shaft 242. The passage selector plate 243 has a lower part having a circular free edge and inserted in the air inlet pipe 202f. A turning arm 244 is mounted on one end part of the turnable shaft 242. The turning arm 217 of the linkage formed on the right side wall of the heat exchanger case 240 is linked to a turning arm 244 by the connecting rod 218, and f an L-shaped lever 245 (which is somewhat different in shape from the L-shaped lever 216) is operated by the thermosensitive driving device 211 attached on the right side wall of the heat exchanger case 240.

Figure 26:
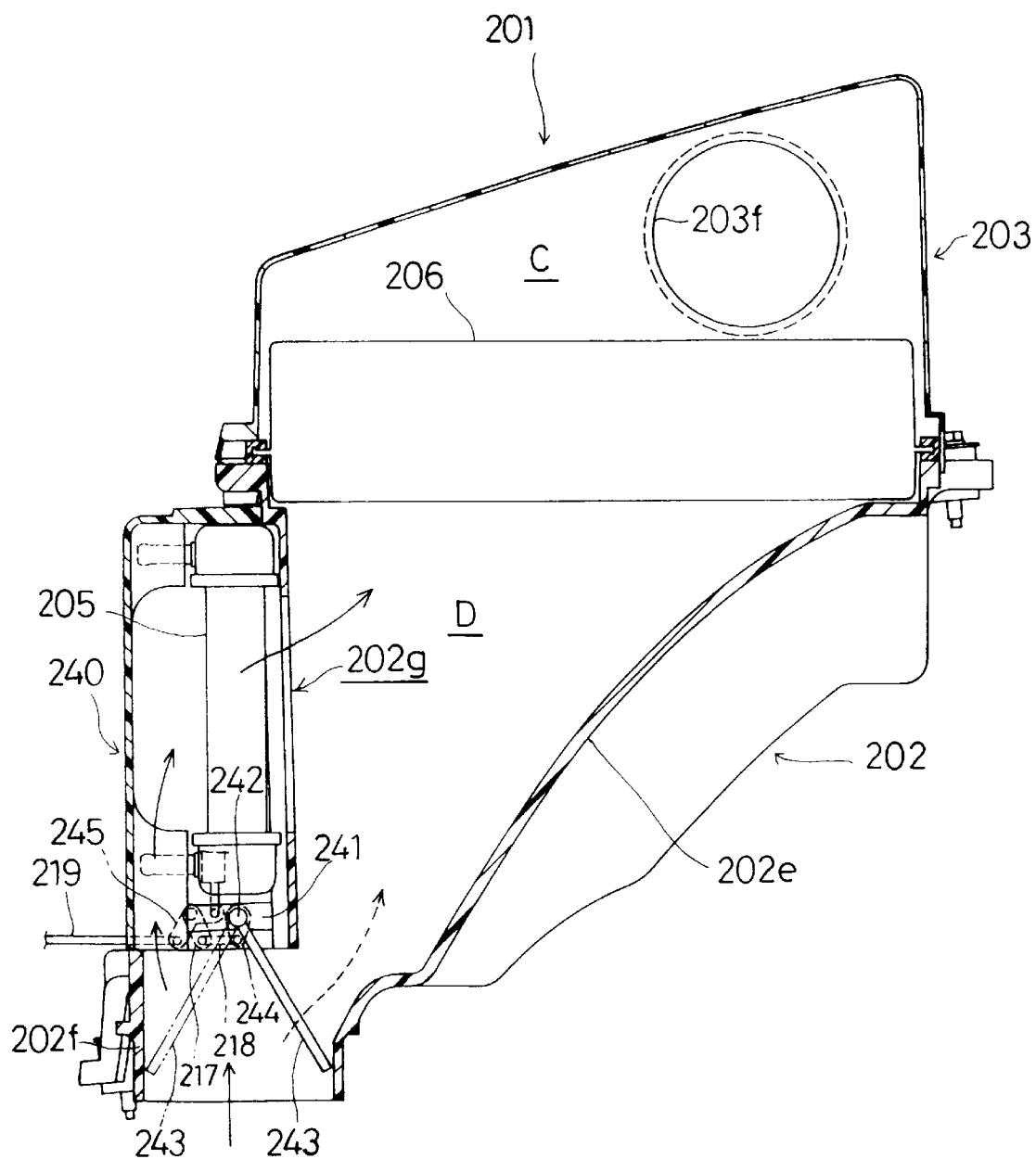
FIG. 26 is a sectional view of an air cleaner provided with an air heater in a seventh embodiment according to the present invention.

In a state where the temperature of the atmosphere is low and the internal combustion engine 220 has just been started, the passage selector plate 243 is set at the position indicated by continuous lines in FIG. 26 to close the bypass passage directly connected to the dust chamber D and to open the heating passage passing through the heat exchanger 205. Then, intake air flows through the air inlet pipe 202f into the heating passage as indicated by the arrows, intake air is heated by the heat exchanger 205 while the same flows through the heat exchanger 205, and heated intake air is supplied to the internal combustion engine 220. Intake air is heated when the temperature of the atmosphere is very low to supply intake air of an appropriate temperature capable of promoting the atomization of the fuel. Thus, the reduction of engine output can be suppressed and the fuel consumption rate of the internal combustion engine 220 can be improved. If the temperature of air around the intake duct approximately equal to the temperature of intake air actually being supplied to the internal combustion engine 220 rises beyond a predetermined temperature, the thermosensitive driving device 211 operates the passage selector plate 243 and the shutoff valve 223 through the linkage to set the passage selector plate 243 at a position indicated by imaginary lines in FIG. 26 to close the heating passage passing through the heat exchanger 205 and to open the bypass passage directly connected to the dust chamber D. Consequently, intake air flows into the dust chamber D as indicated by the arrow of broken lines without being heated, is filtered and cleaned by the air cleaner element 206 and cleaned intake air is supplied without being heated to the internal combustion engine 220.

Thus, the passage selector plate 243 is operated automatically so as to close the heating passage and to open the bypass passage, and the timing of operation of the passage selector plate 243 is adjusted properly according to the temperature of intake air in the intake duct 215 to stop heating intake air in satisfactory response to the variation of the temperature of intake air. Thus, the reduction of engine output, the occurrence of knocking and the increase of fuel consumption rate due to the excessively high temperature of intake air can be prevented.

The thermosensitive driving device 211 may be disposed inside the heat exchanger case so as to be exposed to the interior of the air cleaner to enable thermosensitive driving device 211 sense the temperature of intake air and to drive the passage selector plate and the shutoff valve for the improved control of air heating.

Eighth Embodiment

Figure 27:
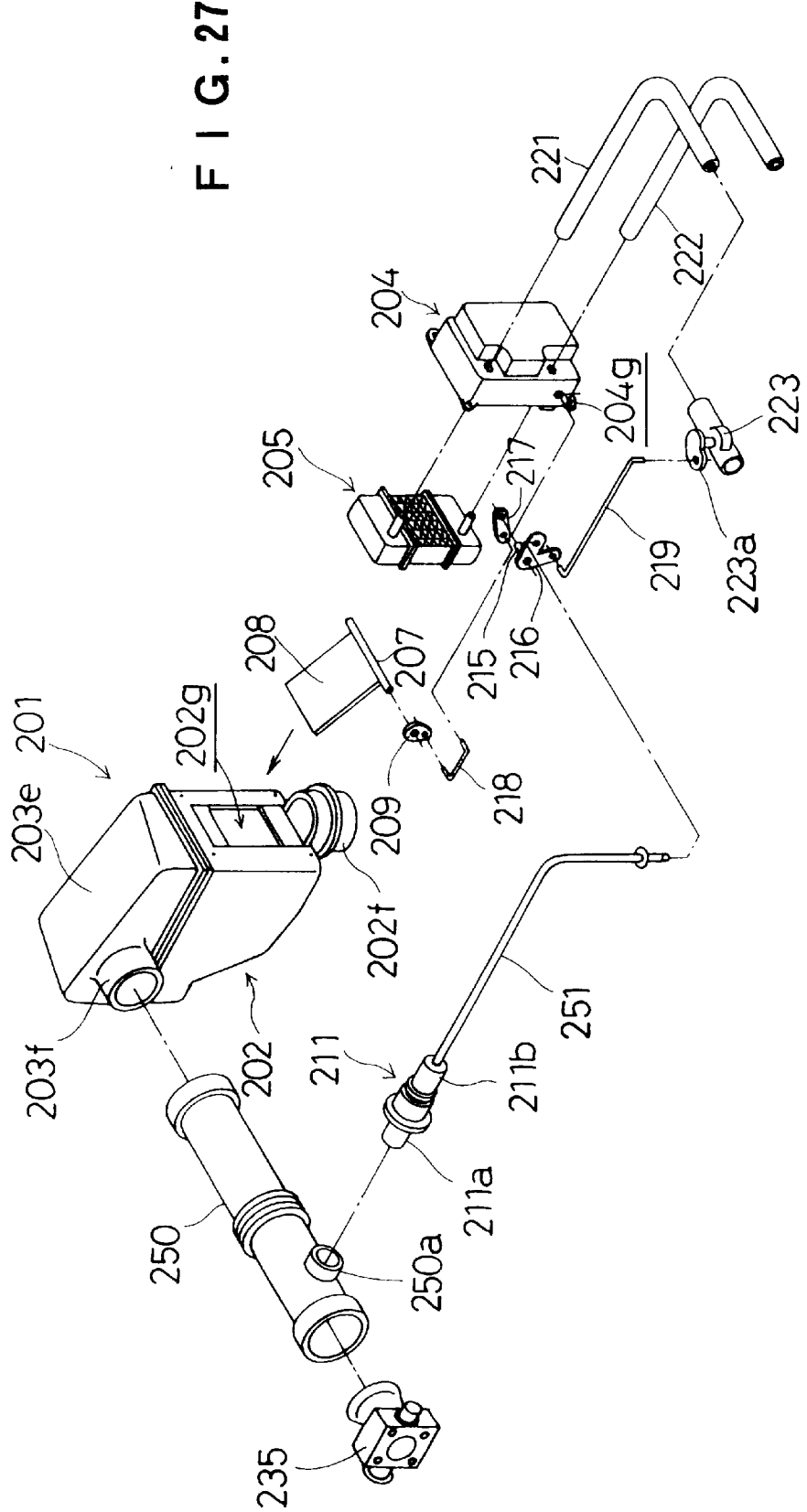
FIG. 27 is an exploded perspective view of an air cleaner provided with an air heater in an eighth embodiment according to the present invention.

An air heater in an eighth embodiment according to the present invention will be described with reference to FIG. 27, in which parts like or corresponding to those of the air heater in the seventh embodiment shown in FIG. 26 are designated by the same reference characters and the description thereof will be omitted to avoid duplication. The air heater in the eighth embodiment is similar in construction to the air heater in the seventh embodiment, except that the former has a thermosensitive driving device 211 attached to an intake duct 250, and uses a flexible cable 251 instead of the linkage.

A connector 250a is attached to a part of the intake duct 250 on the upstream side of and near a throttle valve 235. The thermosensitive driving device 211 comprises a temperature sensor 211a and an actuating member 211b extending from the temperature sensor 211a. The thermosensitive driving device 211 is attached to the connector 250a with the temperature sensor 211a inserted in the intake duct 250. The flexible cable 251 has one end connected to the actuating member 211b, and the other end connected to one of the arms of the L-shaped lever 216. The thermosensitive driving device 211 operates according to the temperature of intake air flowing through the intake duct 250 toward the internal combustion engine to drive the passage selector plate 208 and the shutoff valve 223 simultaneously through the cable 251 and the linkage for the automatic control of the operation for heating intake air. Since the operation for heating intake air is controlled on the basis of the temperature of intake air being actually supplied to the internal combustion engine, the timing of simultaneous operation of the passage selector plate 208 and the shutoff valve 223 can be adjusted properly, and the reduction of engine output, the occurrence of knocking and the increase of fuel consumption rate due to the excessively high temperature of intake air can be prevented. Although only the temperature sensor 211a of the thermosensitive driving device 211 is inserted in the intake duct 250 in this embodiment, the thermosensitive driving device 211 may wholly be inserted in the intake duct 250. The temperature sensor 211a of the thermosensitive driving device 211 may be of either a wax type or a coil spring type using a coil spring of a shape memory alloy. A thermosensitive driving device provided with a coil spring of a shape memory alloy is simple and small in construction and is effective in forming the air heater in a compact construction.

Ninth Embodiment

Figure 29:
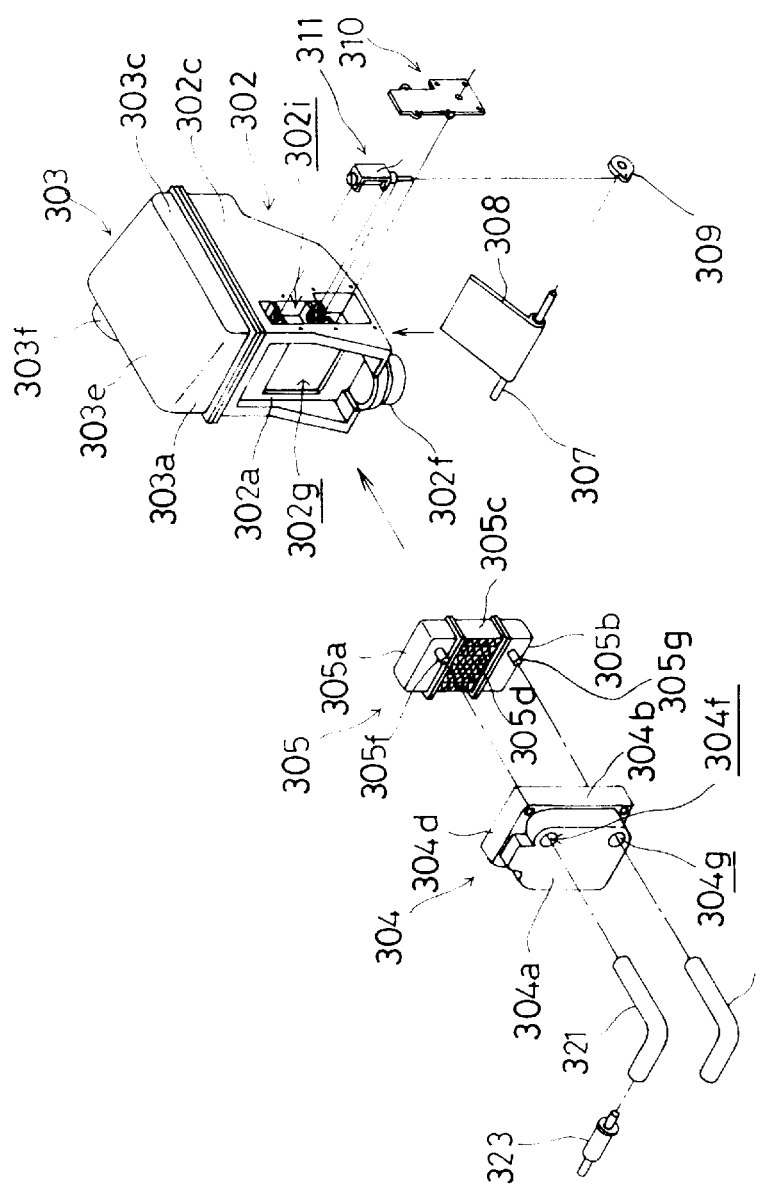
FIG. 29 is an exploded perspective view of the air cleaner shown in FIG. 28.
Figure 31:
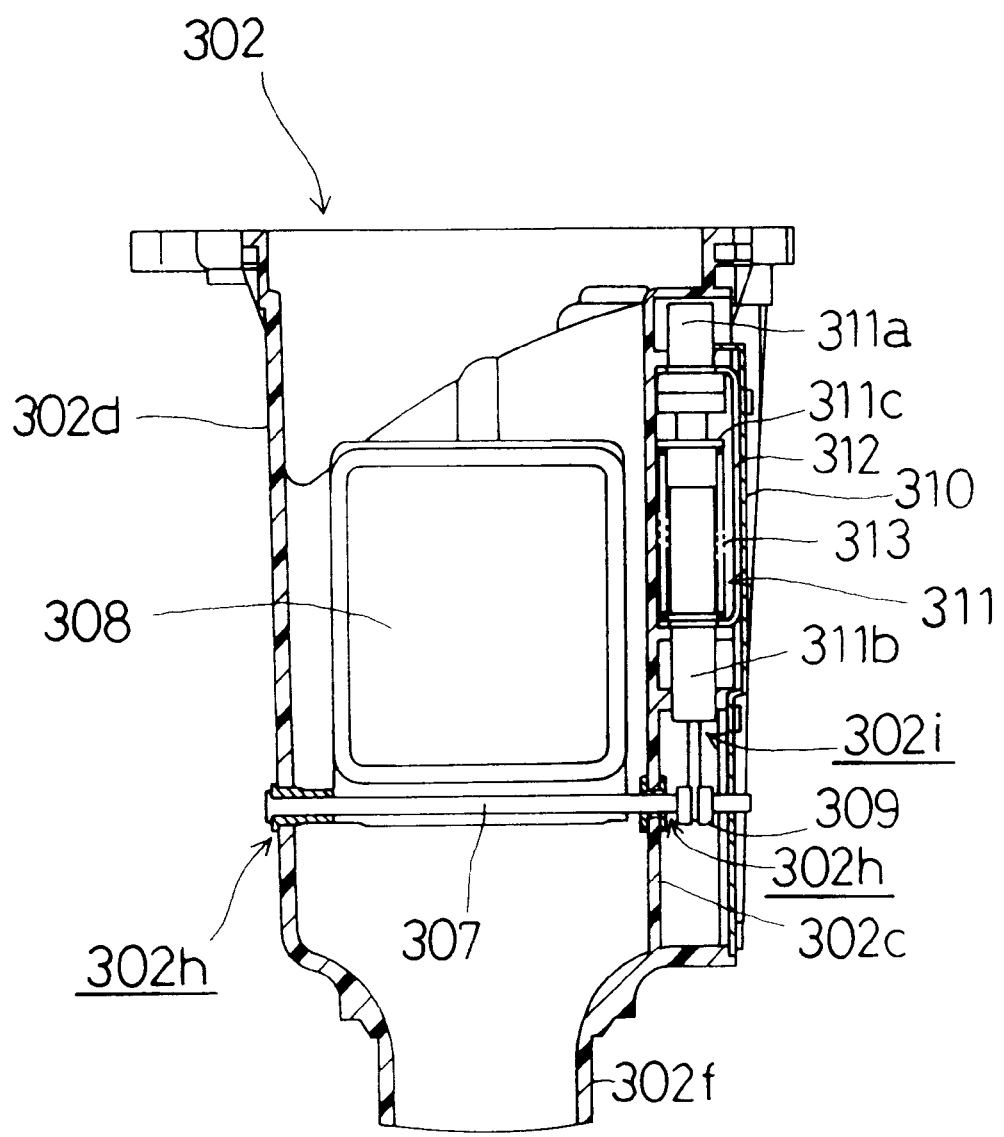
FIG. 31 is a sectional view taken on line IIIXI—IIIXI in FIG. 30.
Figure 32:
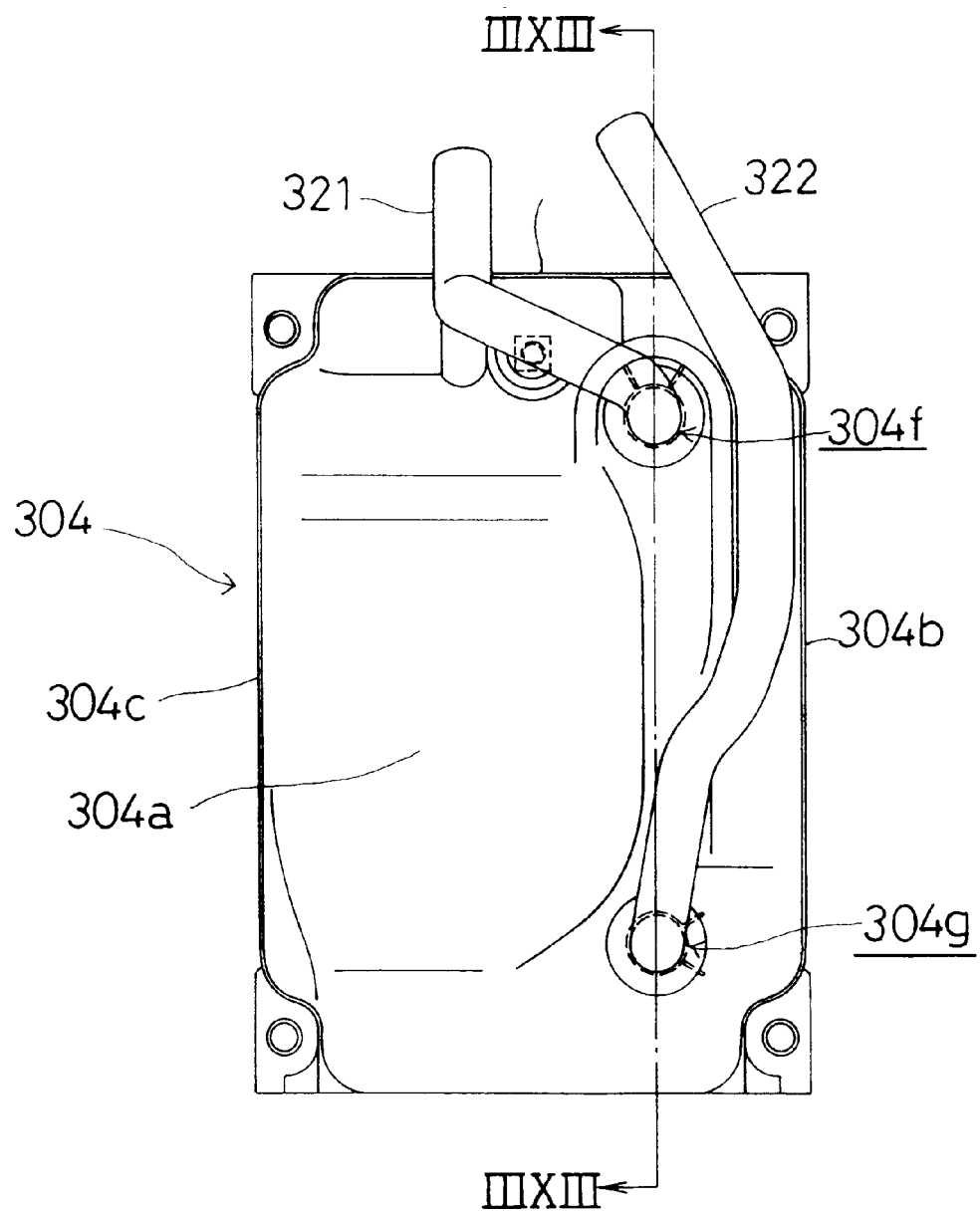
FIG. 32 is a front elevation of a heat exchanger case.
Figure 33:
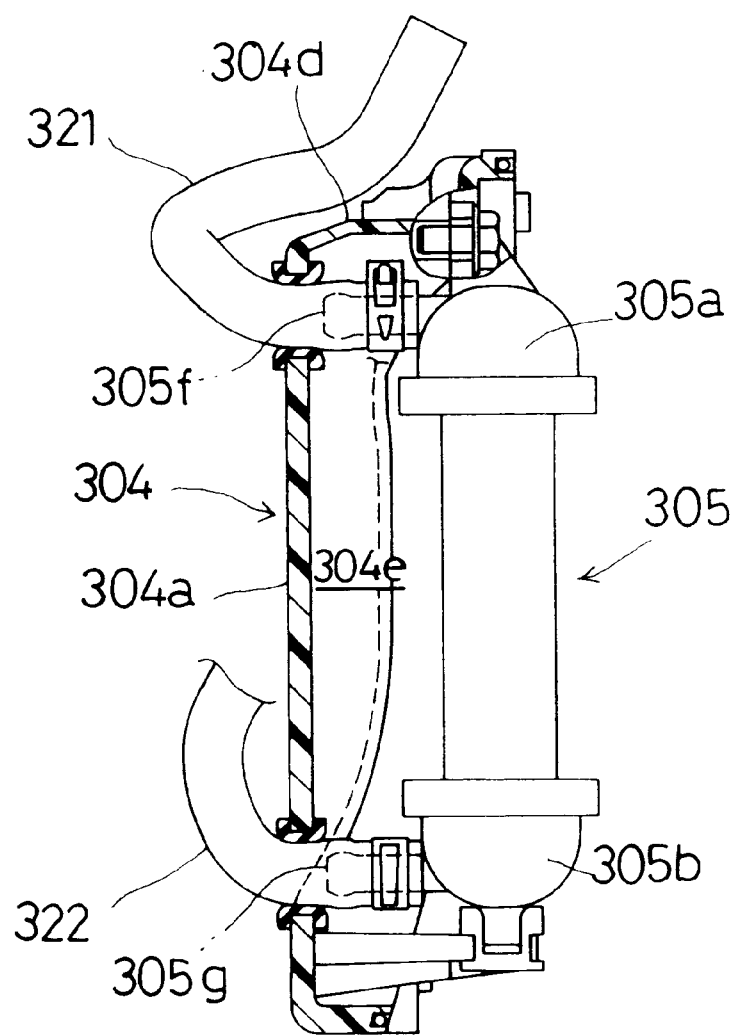
FIG. 33 is a sectional view taken on line IIIVIII–IIIXIII in FIG. 32.

An air heater in a ninth embodiment according to the present invention will be described with reference to FIGS. 28 to 35. An air cleaner 301 for an internal combustion engine 320 has a lower half case 302 and an upper half case 303 put on and joined to the lower half case 302. A heat exchanger case 304 is attached to a front wall 302a of the lower half case 302. The lower half case 302 has a rectangular, open, upper end defined by a parting surface, and has the front wall 302a, a rear wall 302b, a substantially triangular left side wall 302c, a substantially triangular right side wall 302d, and a bottom wall 302e. The bottom wall 302e is joined to the inclined lower edges of the left side wall 302c and the right side wall 302d declining toward the front, and the lower edges of the front wall 302a and the rear wall 302b. An air inlet pipe 202f having open upper and open lower ends is connected to the front end part of the bottom wall 302e with its axis extended vertically. Referring to FIG. 29, a front half part of the air inlet pipe 302f protrudes forward from the front wall 302a, and a front half of the upper end of the same opens on the outer side of the front wall 302a, and a rear half of the upper end opens on the inner side of the front wall 302a. A large rectangular opening 302g is formed in the front wall 302a of the lower half case 302.

Figure 34:
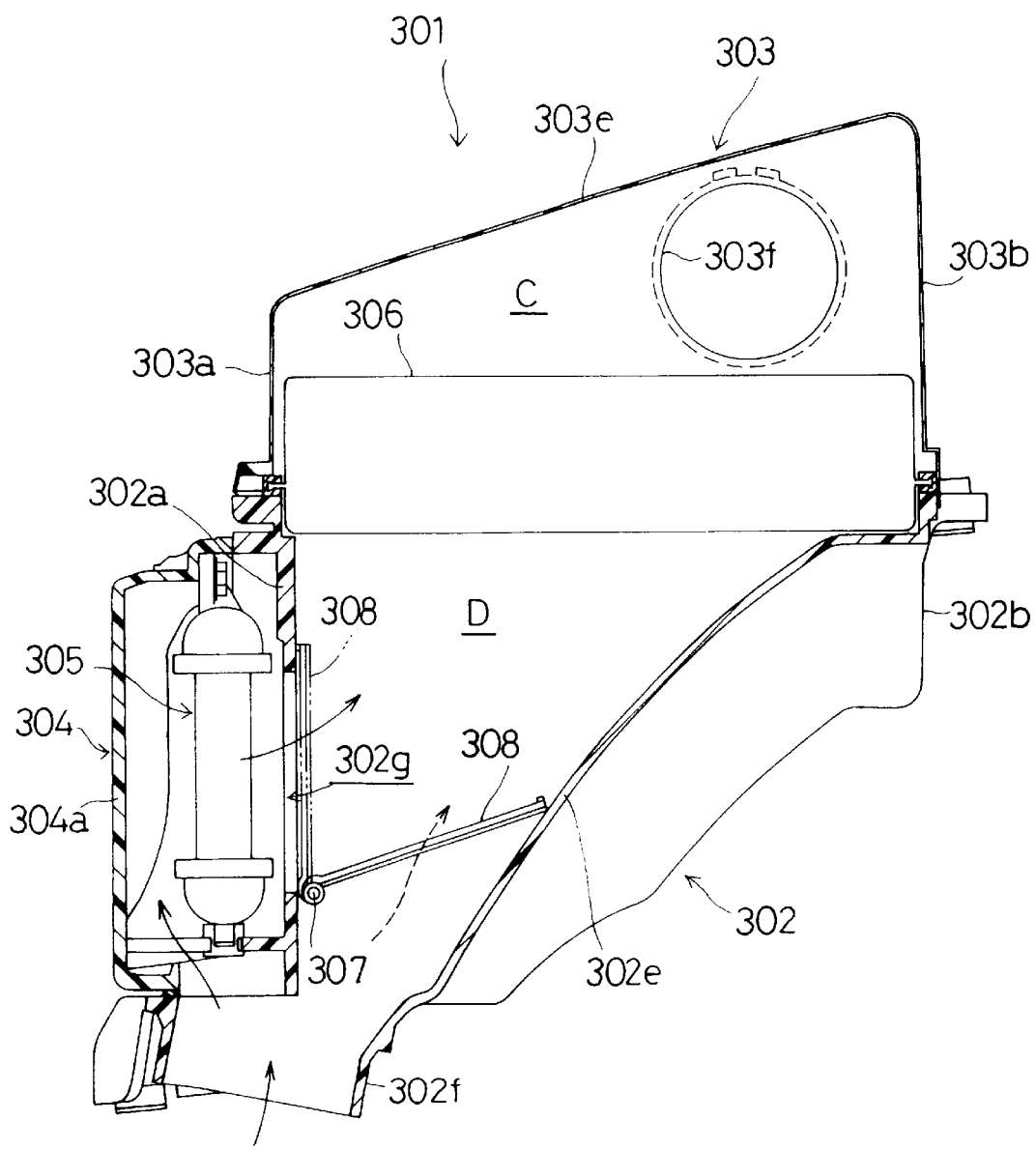
FIG. 34 is a sectional view of the air cleaner shown in FIG. 28.

Holes 302h are formed in parts of the side walls 302c and 302d near the lower edges of the same, respectively, and a turnable shaft 307 is inserted in the holes 302h and supported for turning on the side walls 302c and 302d. A base edge of a rectangular passage selector plate 308 is fixed to the turnable shaft 307. The turnable shaft 307 is extended along the lower edge of the rectangular opening 302g. The passage selector plate 308 fixed to the turnable shaft 307 can be turned between a heating passage closing position where the passage selector plate 308 is vertical and in contact with the inner surface of the front wall 302a to cover the rectangular opening 302g, and a heating passage opening position where the passage selector plate 308 is inclined and in contact with the inner surface of the bottom wall 302e (FIG. 34).

A turning arm 309 is fixedly mounted on one end part of the turnable shaft 307 projecting through the hole 302h from the left side wall 302c. A vertically elongate rectangular recess 302i is formed in the outer surface of the left side wall 302c at a position above the turning arm 309. A thermosensitive driving device 311 is fitted in the rectangular recess 302i and is held on the left side wall 302c. The thermosensitive driving device 311 comprises a temperature sensor 311a containing a wax, an elongate actuating member 311b extending from the temperature sensor 311a, a holder 312 holding the temperature sensor 311a, and a spring 313. The holder 312 is formed by bending the opposite end parts of a rectangular plate in the same direction. As shown in FIG. 30, the temperature sensor 311a is fitted in a hole formed in the upper bent end part of the holder 312, and the actuating member 311b is extended slidably through a hole formed in the lower bent end part of the holder 312, and the spring 313 is extended between a flange 311c formed on the actuating member 311b and the lower bent end part of the holder 312. The holder 312 of the thermosensitive driving device 311 is placed in the recess 302i and is fixed in place to the left side wall 302c, and the lower end of the actuating member 311b is connected to the free end of the turning arm 309 fixedly mounted on the turnable shaft 307. After thus placing the thermosensitive driving device 311 in the recess 302i, the recess 302i excluding an upper region thereof corresponding to the temperature sensor 311a of the thermosensitive driving device 311 is covered with a cover 310.

The upper half case 303 has a rectangular, open, lower end defined by a parting surface corresponding to the open upper end of the lower half case 302, and has a front wall 303a, a rear wall 303b, a trapezoidal left side wall 303c, a trapezoidal right side wall 303d and a top wall 303e. The height of the front wall 303a is smaller than that of the rear wall 303b. An air outlet pipe 303f projects to the right from a rear part of the right side wall 303d. The air cleaner case is formed by joining together the respective parting surfaces of the lower half case 302 and the upper half case 303. An air cleaner element 306 having a rectangular shape in a plane is fitted in the open lower end of the upper half case 303 in a horizontal position with a flange 306a thereof sandwiched between the respective parting surfaces of the lower half case 302 and the upper half case 303. A space extending under the air cleaner element 306 in the lower half case 302 is a dust chamber D, and a space extending over the air cleaner element 306 in the upper half case 303 is a clean chamber C (FIG. 34).

The heat exchanger case 304 is fastened to the front wall 302a of the lower half case 302 with bolts so as to cover the open upper end of the air inlet pipe 302f. The heat exchanger case 304 has the shape of a substantially rectangular, shallow pan having a front wall 304a, a left side wall 304b, a right side wall 304c, and an upper wall 304d. The heat exchanger case 304 is attached to the front wall 302a of the lower half case 302 so as to cover the opening 302g and the front half part of the open upper end of the air inlet pipe 302f protruding forward from the front wall 302a of the lower half case 302 to define a heating passage 304e.

A heat exchanger 305 is fitted in the open rear part of the heat exchanger case 304 so that the front surface thereof faces the heating passage 304e and the rear surface thereof faces the rectangular opening 302g when the heat exchanger case 304 is attached to the lower half case 302. The cooling water of the internal combustion engine 320 is circulated through the heat exchanger 305 and exchanges heat with intake air. Basically, the heat exchanger 305 is similar in construction to the radiator of the internal combustion engine 320. As shown in FIG. 29, the heat exchanger 305 comprises an upper water tank 305a, a lower water tank 305b, a plurality of tubes 305c having a flat cross section and extended in parallel to each other between the upper water tank 305a and the lower water tank 305b, and corrugated fins 305d disposed between and attached to the adjacent tubes 305c. An inlet connector 305f and an outlet connector 305g are attached to right parts (left parts as viewed in FIG. 29) of the respective front walls of the upper water tank 305a and the lower water tank 305b, respectively, so as to extend forward. A cooling water supply pipe 321 and a cooling water discharge pipe 322 are connected to the inlet connector 305f and the outlet connector 305g, respectively. The heat exchanger case 304 is provided with round holes 304f and 304g provided with grommets. When the heat exchanger 305 is fitted in the heat exchanger case 304, the inlet connector 305f and the outlet connector 305g extend through the round holes 304f and 304g, respectively, and project outside from the front surface of the heat exchanger case 304. The cooling water supply pipe 321 (or the cooling water discharge pipe 322) is provided with a wax type shutoff valve 232. The cooling water of the internal combustion engine 320 circulates through a cooling water circulating passage including the cooling water supply pipe 321, the heat exchanger 305 and the cooling water discharge pipe 322. The shutoff valve 323 opens or closes the cooling water circulating passage according to the temperature of the cooling water.

The heat exchanger case 304 holding the heat exchanger 305 is fastened to the front wall 302a of the lower half case 302 of the air cleaner case with bolts so as to cover the open upper end of the air inlet pipe 302f.

As mentioned above, the passage selector plate 308 can be turned between the heating passage closing position where the passage selector plate 308 is vertical and in contact with the inner surface of the front wall 302a as indicated by imaginary lines in FIG. 34 to cover the rectangular opening 302g, and a heating passage opening position where the passage selector plate 308 is inclined and in contact with the inner surface of the bottom wall 302e as indicated by continuous lines in FIG. 34. When the passage selector plate 308 is set at the heating passage opening position indicated by continuous lines, the heating passage 304e passing the heat exchanger 305 is opened and the bypass passage directly connected to the dust chamber D is closed. Consequently, intake air flows through the heat exchanger 305 as indicated by the arrows. When the passage selector plate 308 is set at the heating passage closing position indicated by imaginary lines, the heating passage 304e is closed and the bypass passage is opened. Consequently, intake air flows directly into the dust chamber D as indicated by the arrow of broken lines.

Figure 35:
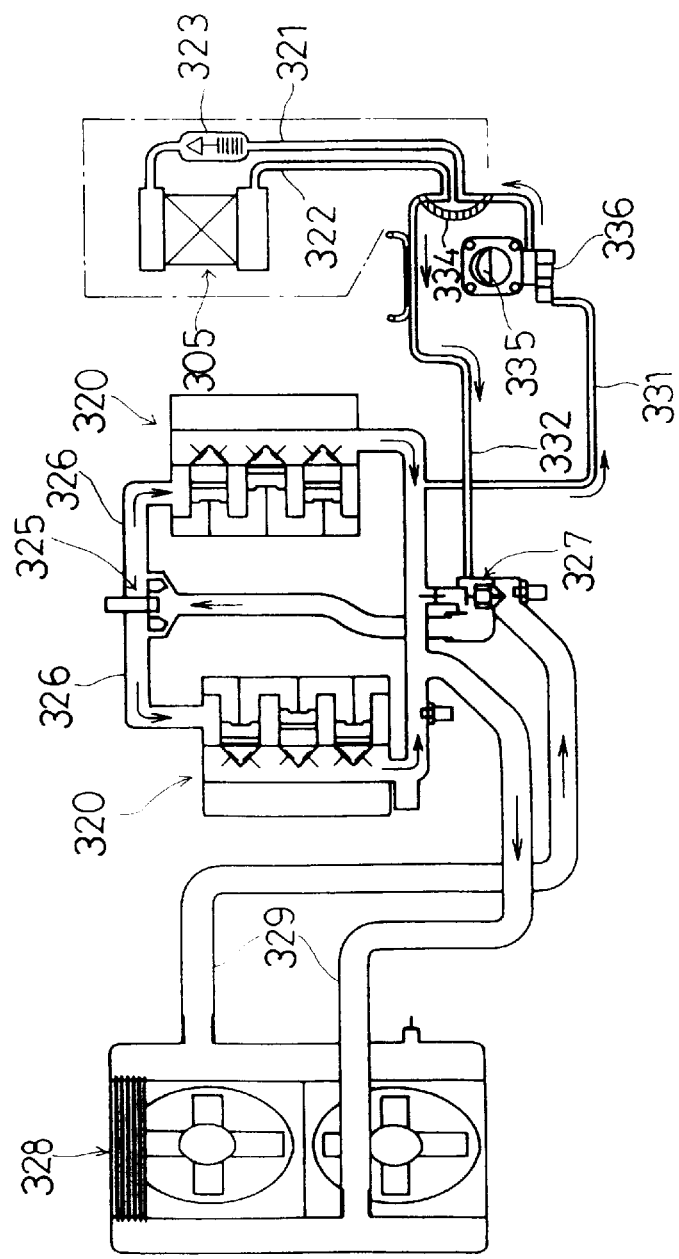
FIG. 35 is a schematic view of principal cooling water circulating passages included in an internal combustion engine.

The cooling water of the internal combustion engine 320 is circulated through the heat exchanger 305 to heat intake air in the air cleaner 301. Referring to FIG. 35, showing principal cooling water circulating passages of the internal combustion engine 320, the cooling water is urged to flow through a cooling water circulating passage 326 connected to a radiator 328 for the internal combustion engine 320 and provided with a thermostat 327 by a water pump 325. The thermostat 327 opens or closes the cooling water circulating passage 326 according to the temperature of the cooling water to circulate the cooling water through the radiator 328 or to stop the circulation of the cooling water through the radiator 328. While the internal combustion engine 320 is in a warming-up period subsequent to the start of the same, the cooling water circulating passage 326 connected to the radiator 328 is closed to make the cooling water flow only through the internal combustion engine 320. After the temperature of the cooling water has risen to a predetermined temperature and the internal combustion engine 320 has warmed up, the cooling water circulating passage 326 is opened to circulate the cooling water cooled by the radiator 328 through the internal combustion engine 320 for cooling.

A first bypass passage 331 has one end connected to a section of the cooling water circulating passage 326 on the downstream side of the internal combustion engine 320, and the other end connected to the cooling water supply pipe 321. A second bypass passage 332 has one end connected to a section of the cooling water circulating passage 326 on the downstream side of the thermostat 327, and the other end connected to the cooling water discharge pipe 322. The first bypass passage 331 and the second bypass passage 332 are connected by a connecting passage 334. The cooling water is circulated continuously through the bypass passages 331 and 332 and the connecting passage 334 for icing prevention regardless of the condition of the thermostat 327 while the internal combustion engine 320 is in operation. The bypass passages 331 and 332 are icing-preventive bypass passages originally included in the internal combustion engine 320 to prevent the icing of a throttle valve 335 and an air control valve 336 for controlling secondary air supply. The cooling water supply pipe 321 and the cooling water discharge pipe 322 are connected to the bypass passages 331 and 332 to circulate the cooling water through the heat exchanger 305. The hot cooling water immediately after being discharged from the internal combustion engine 320 is supplied through the first bypass passage 331 to the heat exchanger 305. Therefore, the cooling water heated by the internal combustion engine 320 starts flowing through the heat exchanger 305 immediately after the start of the internal combustion engine 320 to heat intake air in the air cleaner 301. When the temperature of the cooling water rises beyond a predetermined temperature, the shutoff valve 323 placed in the cooling water supply pipe 321 closes to stop the circulation of the cooling water through the heat exchanger 305. In this state, the cooling water flows through the first bypass passage 331, the connecting passage 334 and the second bypass passage 332, so that the cooling water can continuously be circulated through the air control valve 336. The connecting passage 334 may be omitted and the shutoff valve 323 may slightly be open even when the temperature of the cooling water rises beyond the predetermined temperature to allow the cooling water to flow at a low flow rate for icing prevention.

The thermosensitive driving device 311 is fixedly held on the outer surface of the side wall of the heat exchanger case 304, is able to sense the temperature of air around the intake duct of the internal combustion engine 320 approximately equal to the temperature of air actually supplied to the internal combustion engine 320, and the timing of changing the position of the passage selector plate 308 can properly be adjusted to supply intake air of an appropriate temperature to the internal combustion engine 320. In a state where the temperature of the atmosphere is low and the internal combustion engine 320 has just been started, the passage selector plate 308 is set at the heating passage opening position indicated by continuous lines in Fig. 34 to close the bypass passage directly connected to the dust chamber D and to open the heating passage passing through the heat exchanger 305. Then, intake air flows through the air inlet pipe 302f into the heating passage 304e in the heat exchanger case 304 as indicated by the arrows, intake air is heated by the heat exchanger 305 while the same flows through the corrugated fins 305d of the heat exchanger 305, and heated intake air flows upward through the dust chamber D, is cleaned by the air cleaner element 306 and, heated, clean intake air is supplied through the clean chamber C, the air outlet pipe 303f, the intake duct and the throttle valve 335 to the internal combustion engine 320. In this state, the shutoff valve 323 is open to circulate the cooling water heated by the internal combustion engine 320 through the heat exchanger 305. Intake air is heated when the temperature of the atmosphere is very low because engine output decreases if intake air of a high density is supplied to the internal combustion engine 320. Intake air is heated by the heat exchanger 305 through which the cooling water, the temperature of which starts rising immediately after the internal combustion engine 320 has been started, to supply intake air of an appropriate temperature capable of promoting the atomization of the fuel. Thus, the reduction of engine output can be suppressed and the fuel consumption rate of the internal combustion engine 320 can be improved. Knocking occurs if the temperature of intake air rises excessively. When the temperature of the cooling water rises as the internal combustion engine 320 continues operating and the temperature of intake air heated by the heat exchanger 305 rises, and the temperature of air around the intake duct rises beyond a predetermined temperature, such as 8° C., the thermosensitive driving device 311 operates the turning arm 309 to turn the passage selector plate 308 to the heating passage closing position indicated by imaginary lines in FIG. 34 to close the heating passage by covering the inner surface of the heat exchanger 305 and to open the bypass passage directly connected to the dust chamber D. Consequently, intake air flows from the air inlet pipe 302f into the dust chamber D as indicated by the arrow of broken lines without being heated, is filtered and cleaned by the air cleaner element 306 and cleaned intake air is supplied without being heated to the internal combustion engine 320.

When the temperature of the cooling water circulating through the heat exchanger 305 rises beyond a predetermined temperature, such as 80° C., the shutoff valve 323 closes to stop circulating the cooling water through the heat exchanger 305. Consequently, the rise of the temperature of the heat exchanger 305 in the air cleaner 301 is suppressed to reduce the effect of the heat exchanger 305 on intake air to the least possible extent and the reliable control of intake air heating can be achieved. Since the turning of the passage selector plate 308 to close the heating passage on the basis of the temperature of intake air, and the closing of the shutoff valve 323 on the basis of the temperature of the cooling water to stop the circulation of the cooling water through the heat exchanger 305 can individually and automatically be controlled, in satisfactory response to the variation of the temperature of intake air and that of the cooling water. Thus, the reduction of engine output, the occurrence of knocking and the increase of fuel consumption rate due to the excessively high temperature of intake air can be prevented.

Tenth Embodiment

An air heater in a tenth embodiment according to the present invention will be described with reference to FIG. 36, in which parts like or corresponding to those of the air heater in the ninth embodiment are designated by the same reference characters and the description thereof will be omitted to avoid duplication. The air heater in the tenth embodiment is similar in construction to the air heater in the ninth embodiment except that the former has a passage selector plate 343 supported for turning in an air inlet pipe 340f connected to a lower half case 340.

The lower half case 340 of an air cleaner provided with the air heater in the tenth embodiment is the same in shape as the lower half case 302 of the air cleaner 301 provided with the air heater in the ninth embodiment. A passage selector plate 343 has a base end edge fixed to a turnable shaft 342. The turnable shaft 342 has opposite end parts supported in holes formed in lower parts of the right and the left side walls of the heat exchanger case 304. The holes are formed at positions shifted slightly forward and obliquely downward relative to the positions of the holes 302h on the side walls of the heat exchanger case 304 employed in the ninth embodiment. The passage selector plate 343 fixed to the turnable shaft 342 has a circular free edge and is supported for turning in the air inlet pipe 340f.

A circular plate 344 is mounted on one end of the turnable shaft 342. The thermosensitive driving device 311 is held on the left side wall of the lower half case 340, and the actuating member 311c of the thermosensitive driving device 311 is pivotally connected to a peripheral part of the circular plate 344 mounted on the turnable shaft 342.

In a state where the temperature of the atmosphere is low and the internal combustion engine 320 has just been started, the passage selector plate 343 is set at the heating passage opening position indicated by continuous lines in FIG. 36 to close the bypass passage directly connected to the dust chamber D and to open the heating passage passing through the heat exchanger 305. Then, intake air flows through the air inlet pipe 302f into the heating passage in the heat exchanger case 304 as indicated by the arrows, intake air is heated by the heat exchanger 305, and heated, clean intake air is supplied to the internal combustion engine 320. In this state, the shutoff valve 323 is open to circulate the cooling water heated by the internal combustion engine 320 through the heat exchanger 305. Since intake air is heated in the air cleaner to promote the atomization of the fuel when the temperature of the atmosphere is very low, the reduction of engine output can be suppressed and the fuel consumption rate of the internal combustion engine 320 can be improved. When the temperature of air around the intake duct approximately equal to the temperature of intake air rises beyond a predetermined temperature, the thermosensitive driving device 311 turns the passage selector plate 343 to a position indicated by imaginary lines in FIG. 36 to close the heating passage by covering the inner surface of the heat exchanger 305 and to open the bypass passage directly connected to the dust chamber D. Consequently, intake air flows from the air inlet pipe 302f into the dust chamber D as indicated by the arrow of broken lines without being heated, is filtered and cleaned by the air cleaner element 306 and cleaned intake air is supplied without being heated to the internal combustion engine 320.

When the temperature of the cooling water circulating through the heat exchanger 305 rises beyond a predetermined temperature, the shutoff valve 323 closes to stop circulating the cooling water through the heat exchanger 305. Consequently, the rise of the temperature of the heat exchanger 305 in the air cleaner 301 is suppressed to reduce the effect of the heat exchanger 305 on intake air to the least possible extent and the reliable control of intake air heating can be achieved. Thus, the reduction of engine output, the occurrence of knocking and the increase of fuel consumption rate due to the excessively high temperature of intake air can be prevented.

The temperature sensor 311a of the thermosensitive driving device 311 may be of either a wax type or a coil spring type using a coil spring of a shape memory alloy. A thermosensitive driving device provided with a coil spring of a shape memory alloy is simple and small in construction and is effective in forming the air heater in a compact construction.

Eleventh Embodiment

Figure 37:
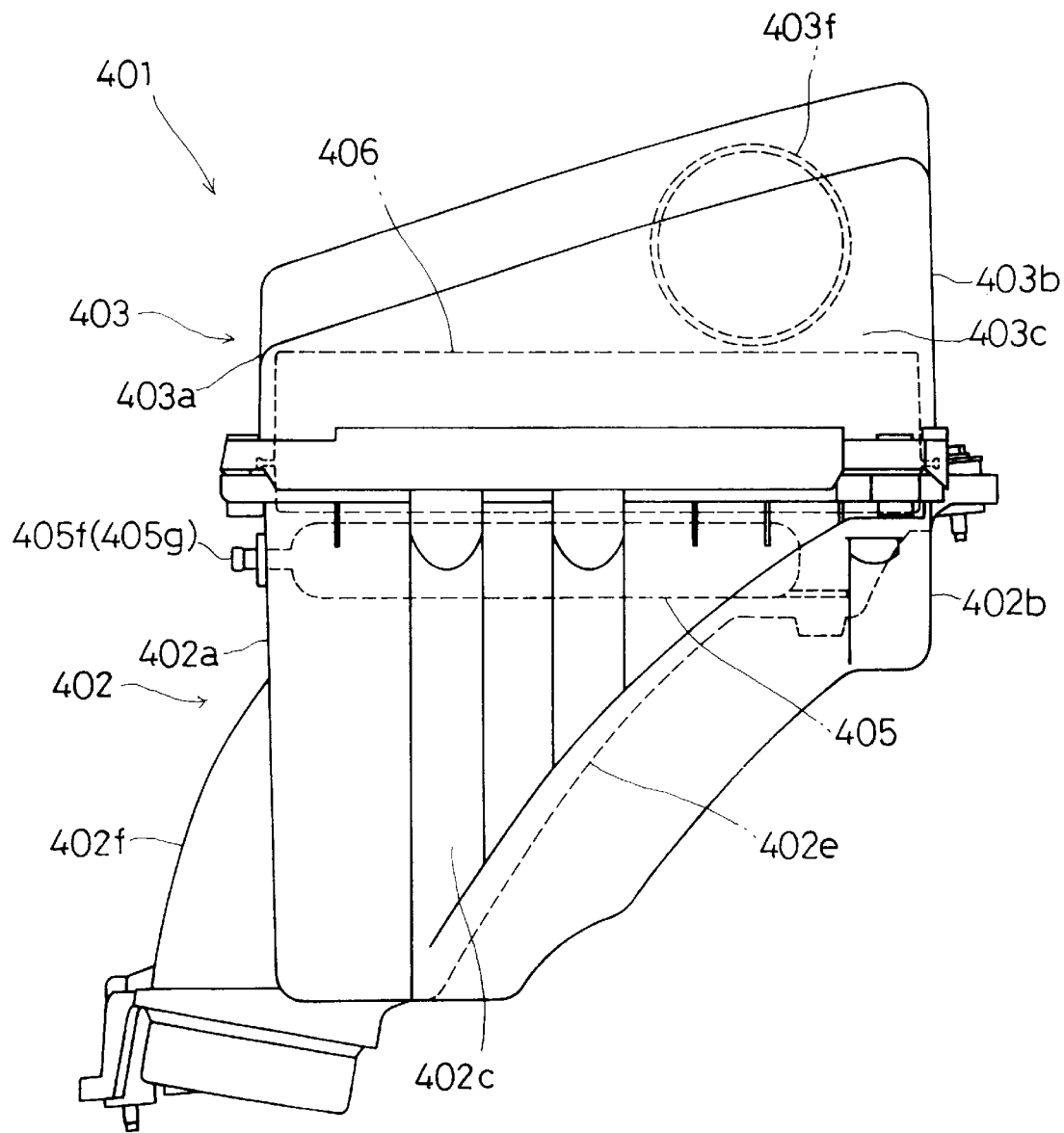
FIG. 37 is a side elevation of an air cleaner provided with an air heater in an eleventh embodiment according to the present invention.
Figure 38:
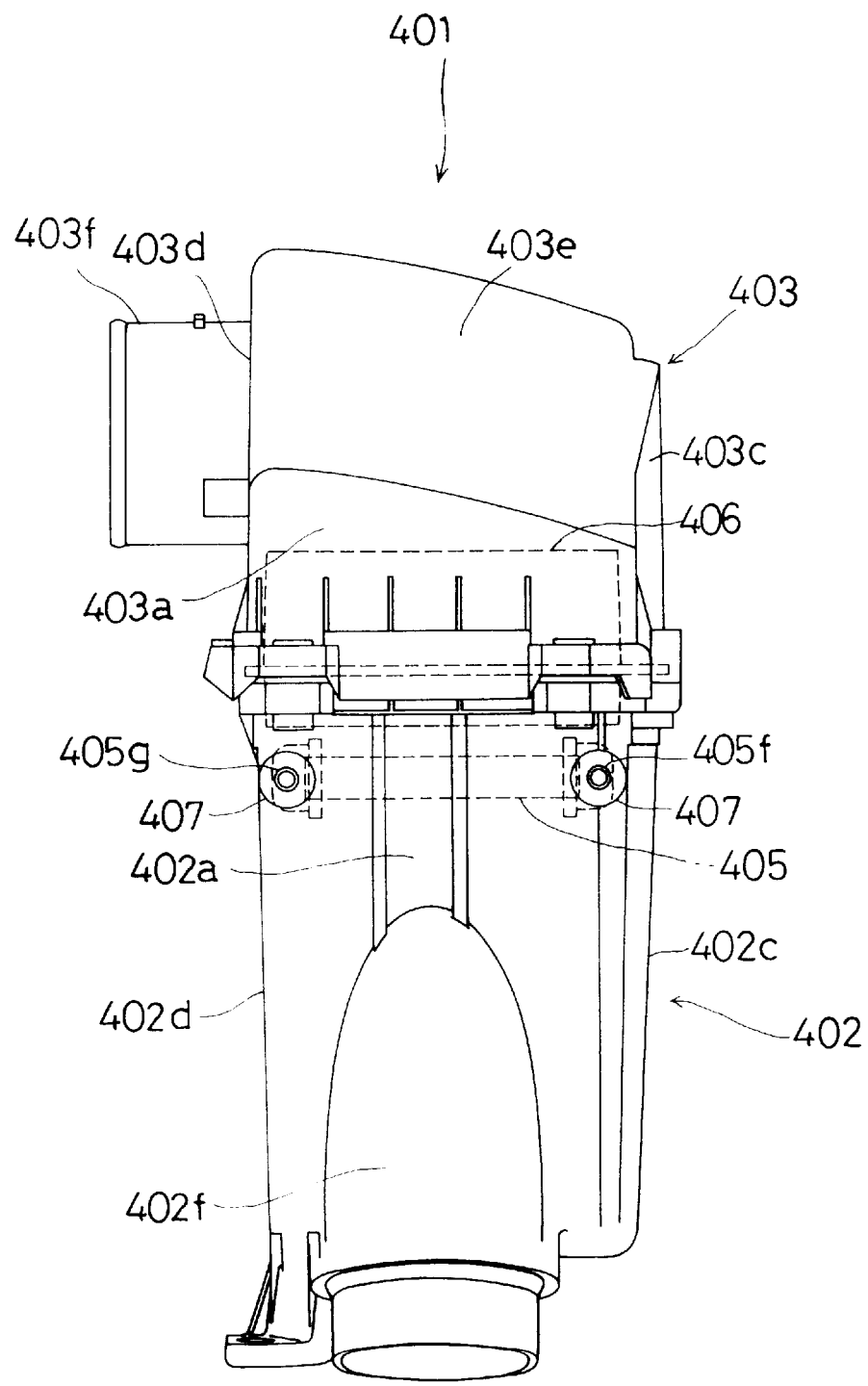
FIG. 38 is a front elevation of the air cleaner shown in FIG. 37.
Figure 39:
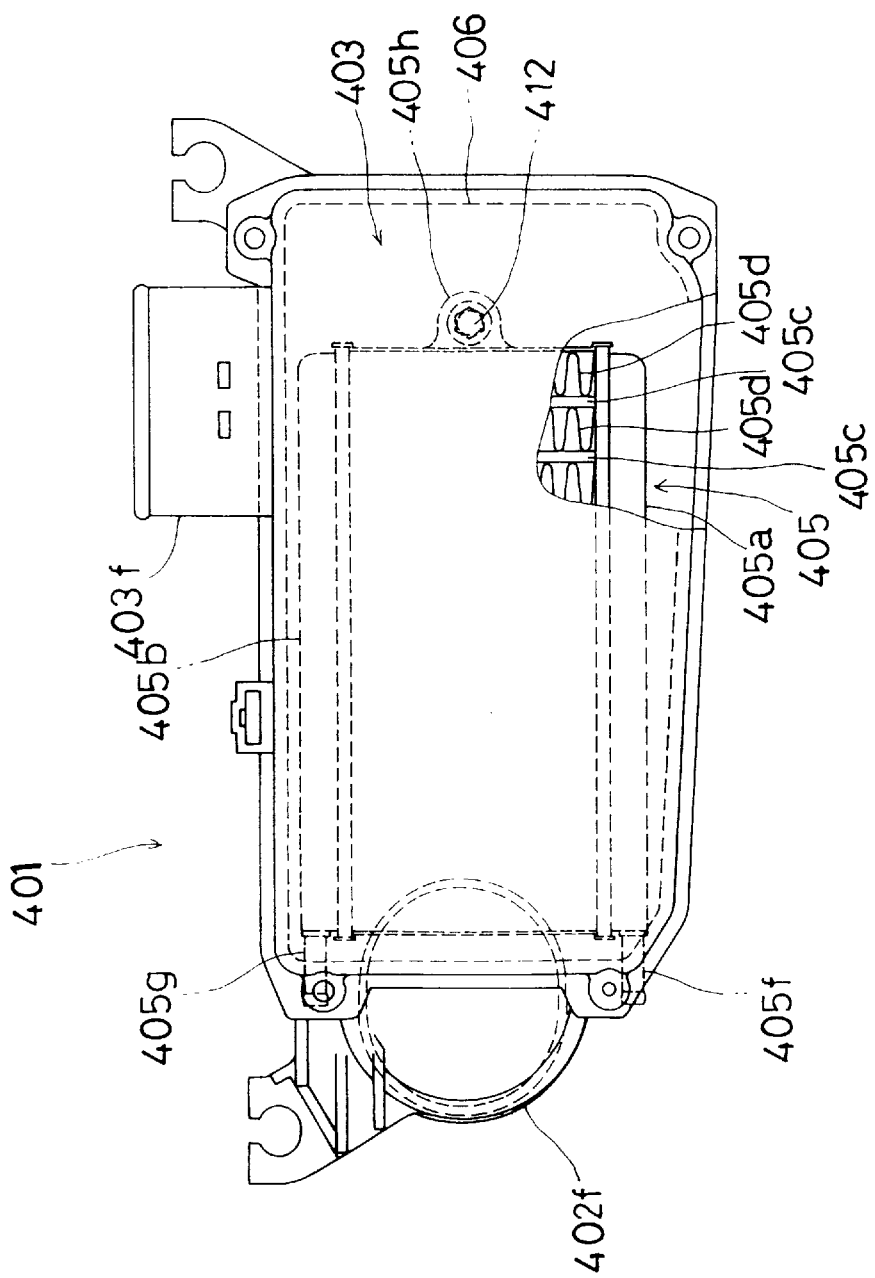
FIG. 39 is a partly cutaway plan view of the air cleaner shown in FIG. 37.

An air heater in an eleventh embodiment according to the present invention will be described with reference to FIGS. 37 to 41. Referring to FIGS. 37, 38 and 39, an air cleaner case 401 for an internal combustion engine 420 has a lower half case 402 and an upper half case 403 put on and joined to the lower half case 402. The lower half case 402 has a rectangular, open, upper end defined by a parting surface, and has a front wall 402a of a large height, a rear wall 502b of a small height, a substantially triangular left side wall 402c, a substantially triangular right side wall 402d, and a bottom wall 402e. The front wall 402a and the rear wall 402b are connected by the symmetrical side walls 402c and 402d. The bottom wall 402e is joined to the inclined lower edges of the left side wall 402c and the right side wall 402d declining toward the front, and the lower edges of the front wall 402a and the rear wall 402b. An air inlet pipe 402f having an open lower end is connected to the front end part of the bottom wall 402e so as to extend downward and to protrude partly forward from the front wall 402a. The upper half case 403 has a rectangular, open, lower end defined by a parting surface corresponding to that of the lower half case 402 and has a front wall 403a of a small height, a rear wall 403b of a large height, a substantially trapezoidal left side wall 403c, a substantially trapezoidal right side wall 403d and a top wall 403e. The front wall 403a and the rear wall 403b are connected by the side walls 403c and 403d. The top wall 403e is connected to the inclined upper edges of the side walls 403c and 403d and the upper edges of the front wall 403a and the rear wall 403b. An air outlet pipe 403f projects to the right from a rear part of the right side wall 403d.

The air cleaner case is formed by joining together the respective parting surfaces of the lower half case 402 and the upper half case 403. An air cleaner element 406 having a rectangular shape in a plane is fitted in the open lower end of the upper half case 403 in a horizontal position with a flange 406a thereof sandwiched between the respective parting surfaces of the lower half case 402 and the upper half case 403. A heat exchanger 405 having a rectangular shape in a plane is fitted in the open upper end of the lower half case 402 in a horizontal position so as to cover the open upper end of the lower half case 402. The cooling water of the internal combustion engine 420 is circulate through the heat exchanger 405 and exchanges heat with intake air. Basically, the heat exchanger 405 is similar in construction to the radiator of the internal combustion engine 420. As shown in FIG. 39, the heat exchanger 405 comprises a left water tank 405a, a right water tank 405b, a plurality of tubes 405c having a flat cross section and extended in parallel to each other between the left water tank 405a and the right water tank 405b, and corrugated fins 405d disposed between and attached to the adjacent tubes 405c. An inlet connector 405f and an outlet connector 405g are attached to the respective front walls of the left water tank 405a and the right water tank 405b, respectively, so as to extend forward. The front wall 402a of the lower half case 402 is provided in an upper left-hand part and an upper right-hand part thereof with round holes provided with rubber grommets 407. When the heat exchanger 405 is fitted in the upper end of the lower half case 402, the inlet connector 405f and the outlet connector 405g are forced to extend through the round holes provided with the rubber grommets 407, respectively, whereby the heat exchanger 405 is held by its front end part on the lower half case 402. A support lug 405h provided with an opening is extended rearward from the rear end of the heat exchanger 405. The support lug 405h is sandwiched between rubber pads 410 and 411, a and is fastened to a horizontal step formed in the bottom wall 402e so as to merge into the rear wall 402b with a bolt 412. An opening is formed in the step of the bottom wall 402e, a nut 413 is fixed to the outer surface of the step of the bottom wall 402 coaxially with the opening formed in the step of the bottom wall 402e, a tube 414 inserted through the rubber pads 410 and 411 and the support lug 405h is set coaxially with the opening formed in the step of the bottom wall 402e on the inner surface of the step of the bottom wall 402e, and a bolt 413 is inserted through the tube 414 and screwed in the nut 413 to fasten the support lug 405h to the bottom wall 402e. Thus, the heat exchanger 405 is set horizontally in the open upper end of the lower half case 402 with the inlet connector 405f and an outlet connector 405g extending forward from the respective front walls of the left water tank 405a and the right water tank 405b extended through the round holes provided with the rubber grommets 407, respectively, and the support lug 405h sandwiched between the rubber pads 410 and 411 and fastened with the bolt 412 to the step of the bottom wall 402e.

Referring to FIG. 40, when the upper half case 403 is joined to the upper end of the lower half case 402 to form the air cleaner case, the air cleaner element 406 divides the interior of the air cleaner case into a dust chamber D extending under the air cleaner 406 in the lower half case 402, and a clean chamber C extending over the air cleaner 406 in the upper half case 403. The heat exchanger 405 horizontally held in the lower half case 402 lies under the air cleaner element 406 close and in parallel to air cleaner element 406.

Figure 41:
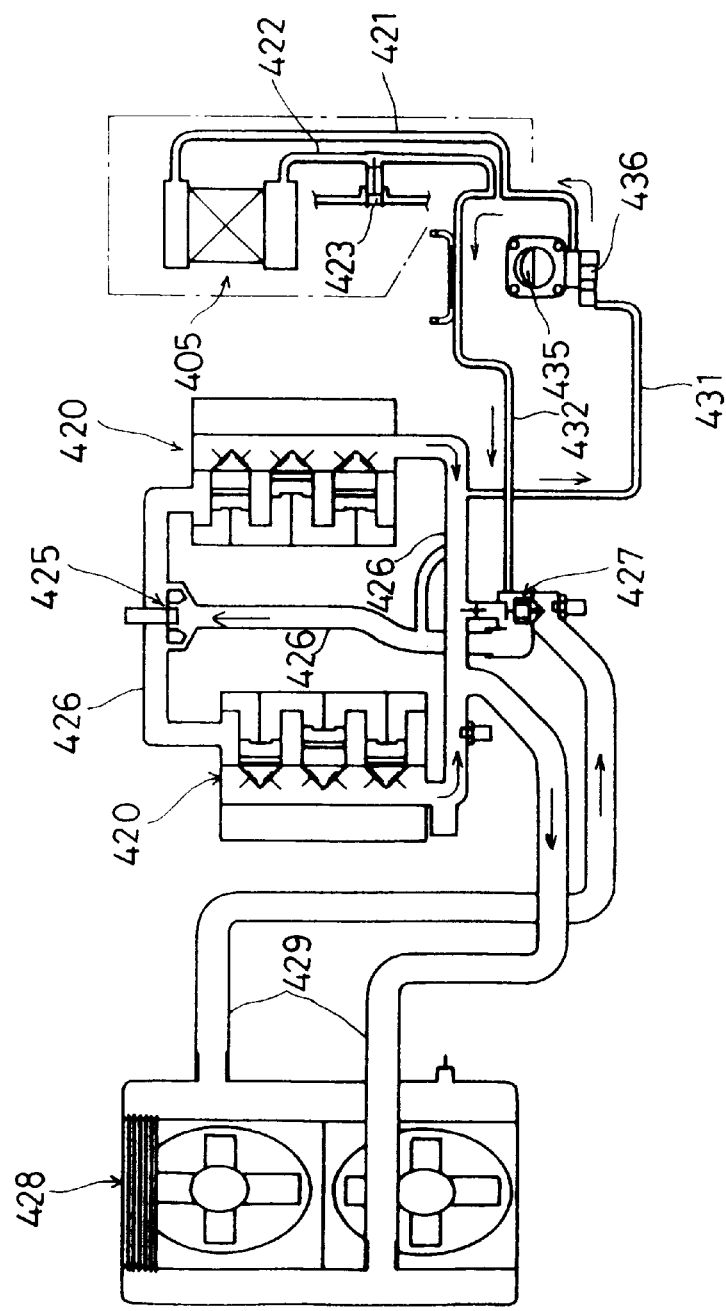
FIG. 41 is a schematic view of principal cooling water circulating passages included in an internal combustion engine.

A cooling water supply pipe and a cooling water discharge pipe 422 are connected to the inlet connector 405f and the outlet connector 405g of the heat exchanger 405, respectively, to circulate the cooling water through the heat exchanger 405. Referring to FIG. 41, showing principal cooling water circulating passages of the internal combustion engine 420, the cooling water is urged to flow through a cooling water circulating passage 426 connected to a radiator 428 for the internal combustion engine 420 and provided with a thermostat 427 by a water pump 425. The thermostat 427 allows or stops the flow of the cooling water between the cooling water circulating passage 426 and a passage 429 connected to the radiator 428 according to the temperature of the cooling water. While the internal combustion engine 420 is in a warming-up period subsequent to the start of the same, the circulation of the cooling water through the radiator 428 is stopped and the cooling water is circulated only through the internal combustion engine 420. After the temperature of the cooling water has risen to a predetermined temperature and the internal combustion engine 420 has warmed up, the cooling water is circulated through the radiator 428 to circulate the cooling water cooled by the radiator 428 through the internal combustion engine 420 for cooling.

A first bypass passage 431 has one end connected to a section of the cooling water circulating passage 426 on the downstream side of the internal combustion engine 420, and the other end connected to the cooling water supply pipe 421. A second bypass passage 432 has one end connected to a section of the cooling water circulating passage 426 on the downstream side of the thermostat 427, and the other end connected to the cooling water discharge pipe 422. The cooling water is circulated continuously through the bypass passages 431 and 432 for icing prevention regardless of the condition of the thermostat 427 while the internal combustion engine 420 is in operation. The bypass passages 431 and 432 are icing-preventive bypass passages originally included in the internal combustion engine 420 to prevent the icing of a throttle valve 435 and an air control valve 436 for controlling secondary air supply. The cooling water supply pipe 421 and the cooling water discharge pipe 422 are connected to the bypass passages 431 and 432 to circulate the cooling water through the heat exchanger 405. The hot cooling water immediately after being discharged from the internal combustion engine 420 is supplied through the first bypass passage 431 to the heat exchanger 405. Therefore, the cooling water heated by the internal combustion engine 420 starts flowing through the heat exchanger 405 immediately after the start of the internal combustion engine 420 to heat intake air in the air cleaner 401. The cooling water discharge pipe 422 may be provided with a shutoff valve 423 to stop the circulation of the cooling water through the heat exchanger 405 when intake air need not be heated. If the cooling water discharge pipe 422 is provided with a shutoff valve, it is preferable to connect the bypass passages 431 and 432 by a bypass passage, not shown, bypassing the heat exchanger 405 to achieve icing prevention while the circulation of the cooling water through the heat exchanger 405 is stopped.

Intake air flows through the air inlet pipe 402f connected to the lower half case 402 into the air cleaner 401. Intake air flows upward through the upward expanding dust chamber D, intake air is heated while the same flows substantially uniformly through the corrugated fins 405d of the heat exchanger 405 horizontally disposed over the dust chamber D, heated intake air is cleaned by the air cleaner element 406 overlying the heat exchanger 405 close to and in parallel to the heat exchanger 405 while the same flows through the air cleaner element 406 into the clean chamber C, and heated, cleaned intake air is supplied through the air outlet pipe 403f, an intake duct and the throttle valve 435 to the internal combustion engine 420. Intake air is heated when the temperature of the atmosphere is very low because engine output decreases if intake air of a high density is supplied to the internal combustion engine 420. Intake air is heated by the heat exchanger 405 through which the cooling water, the temperature of which starts rising immediately after the internal combustion engine 420 has been started, to supply intake air of an appropriate temperature and an appropriate density to suppress the reduction of engine output.

Since the interior of the air cleaner case is divided into the lower dust chamber D and the upper clean chamber C by the air cleaner element 406, and the heat exchanger 406 is disposed under the air cleaner element 406 in parallel to the same, intake air heated by the heat exchanger 405 flows upward, and flows uniformly through and is cleaned by the air cleaner element 406. Since uniformly heated intake air is distributed uniformly over the air cleaner element 406, the air cleaner element 406 is able to clean intake air efficiently, is dirtied uniformly, and hence the life of the air cleaner element 406 is extended. Since intake air flows in ascending currents in the air cleaner 401, large particles are arrested by the heat exchanger 405 and unable to reach the air cleaner element 406, so that the air cleaner element 406 is not dirtied rapidly and the life of the air cleaner element 406 can be extended. Since the bottom wall 402e of the lower half case 402 in which the dust chamber D is formed in inclined so that the dust chamber D expands upward from the air inlet pipe 402f, the stagnation of intake air in the dust chamber D can be suppressed, intake air is able to flow smoothly upward from the air inlet pipe 402f, and intake air can efficiently be heated, cleaned and supplied from the clean chamber C to the internal combustion engine 420.

Sealing arrangements necessary for sealing gaps between the inlet connector 405f and the outlet connector 405g of the heat exchanger 405 disposed in the dust chamber D of the air cleaner 401 are simple, as compared with sealing arrangements which may be necessary for the same purpose when the heat exchanger 405 is disposed in the clean chamber C. The gaps between the inlet connector 405f and the outlet connector 405g of the heat exchanger 405, and the lower half case 402 can satisfactorily be sealed by the inexpensive grommets 407. Since the heat exchanger 405 is disposed in the dust chamber D, work for changing the air cleaner element 406 is not obstructed by the heat exchanger 405.

Figure 42:
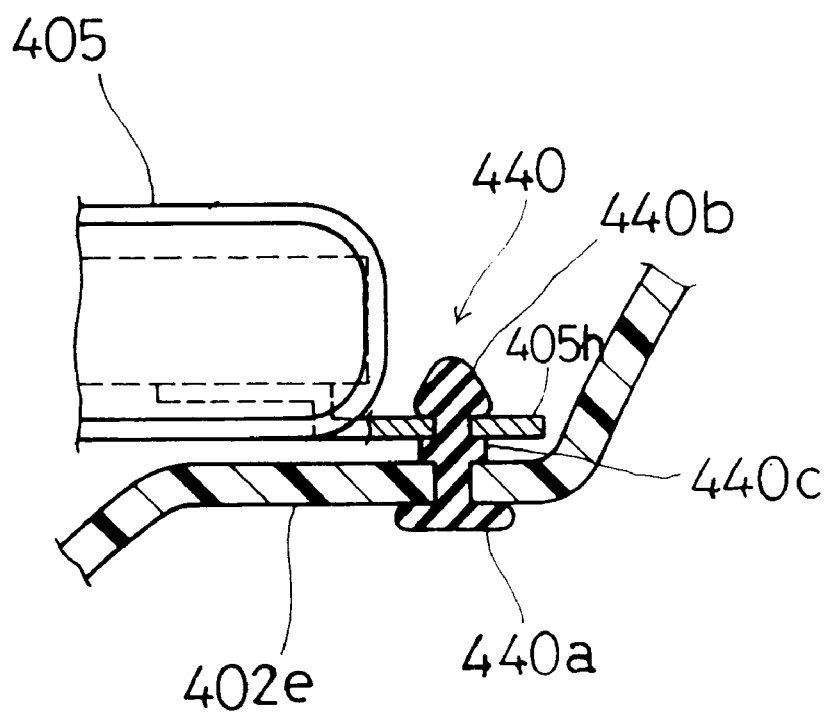
FIG. 42 is a sectional view of an essential part of the air cleaner shown in FIG. 37 of assistance in explaining another method of disposing a heat exchanger.

A holding member 440 of rubber as shown in FIG. 42 may be used, instead of the rubber pads 410 and 411 and the bolt 412, for holding the support lug 405h of the heat exchanger 405 on the step of the bottom wall 402e of the lower half case 402. The holding member 440 has a stem provided at its free end with an expanded part 440a, a conical head 440b, and an intermediate flange 440c of a predetermined thickness formed between the conical head 440b and the expanded part 440a. The conical head 440b and the intermediate flange 440c are inserted from outside through the round hole formed in the horizontal step of the bottom wall 402e inside so that a part of the bottom wall 402e around the round hole is sandwiched between the expanded part 440a and the intermediate flange 440c. The conical head 440b is inserted through the round hole of the support lug 405h so that a part of the support lug 405h around the round hole is sandwiched between the conical head 440b and the intermediate flange 440c. Thus, the rear part of the heat exchanger 405 can elastically be held on the rear wall 402e only by the holding member 440, which reduces the number of parts and facilitates assembling work.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. An air heater for an air cleaner comprising an air cleaner case, an air cleaner element dividing the interior of the air cleaner case into a dust chamber on an upstream side with respect to the flowing direction of intake air and a clean chamber on a downstream side with respect to the flowing direction of intake air, the clean chamber having an outlet pipe, and an intake duct connected to the air outlet pipe, said intake duct having a throttle valve, said air heater comprising:

a heat exchanger case covering an opening formed in the air cleaner case so as to open into the dust chamber, and forming a heating passage for heating intake air;

a heat exchanger, through which cooling water for cooling an internal combustion engine is circulated, disposed in the heating passage defined by the heat exchanger case opposite to part of the opening opening into the dust chamber;

a passage selector plate for selectively opening either the heating passage passing the heat exchanger or a bypass passage bypassing the heat exchanger; and a thermosensitive driving means provided with a temperature sensor for sensing temperature of intake air and capable of controlling the passage selector plate.

2. The air heater according to claim 1, wherein the passage selector plate and the thermosensitive driving means are disposed on the heat exchanger case.

3. The air heater according to claim 2, wherein the temperature sensor of the thermosensitive driving means is a wax type temperature sensor capable of expanding and contracting according to the variation of the temperature of intake air.

4. The air heater according to claim 3, wherein the passage selector plate is disposed at an inlet end of the heating passage defined by the heat exchanger case and is capable of being turned between a heating passage opening position where the passage selector plate opens the heating passage and closes the bypass passage, and a heating passage closing position where the passage selector plate closes the heating passage and opens the bypass passage.

5. The air heater according to claim 4, wherein the heat exchanger case, the heat exchanger, the passage selector plate and the thermosensitive driving means are combined in an integral heating unit capable of detachably attached to the air cleaner.

6. The air heater according to claim 2, wherein the thermosensitive driving means is attached to the heat exchanger case in parallel to a side of the heat exchanger.

7. The air heater according to claim 3, wherein the passage selector plate is capable of swinging in the dust chamber between a heating passage closing position where the passage selector plate covers a first part of the opening opening into the dust chamber, corresponding to the heat exchanger and opens a second part of the opening directly opening into the dust chamber, and a heating passage opening position where the passage selector plate is separated from the first part of the opening and covers the second part of the opening.

8. The air heater according to claim 1, wherein the thermosensitive driving means is disposed on a part of the intake duct near the throttle valve, and the thermosensitive driving means may be operatively connected to the passage selector plate by a cable or a linkage.

9. The air heater according to claim 8, wherein t at least the temperature sensor of the thermosensitive driving means is inserted in the intake duct.

10. The air heater according to claim 9, wherein the temperature sensor of the thermosensitive driving means is a wax type temperature sensor capable of expanding and contracting according to the variation of the temperature of intake air flowing through the intake duct.

11. The air heater according to claim 9, wherein the passage selector plate is supported on the heat exchanger case.

12. The air heater according to claim 8, wherein the intake duct is provided integrally with a silencing chamber, and at least the temperature sensor of the thermosensitive driving means is inserted in the silencing chamber of the intake duct.

13. The air heater according to claim 1, wherein a shutoff valve is provided in a cooling water circulating passage through which cooling water is circulated through the heat exchanger to open and close the cooling water circulating passage, and the thermosensitive driving means drives both the passage selector plate and the shutoff valve simultaneously through a linkage.

14. The air heater according to claim 13, wherein the thermosensitive driving means is attached to the heat exchanger case.

15. The air heater according to claim 13, wherein the thermosensitive driving means is disposed on a part of the intake duct near the throttle valve with at least the temperature sensor inserted in the intake duct, the cable connected to the thermosensitive driving means is connected to the linkage to operate the passage selector plate and the shutoff valve simultaneously.

16. The air heater according to claim 15, wherein the passage selector plate is supported on the heat exchanger case.

17. The air heater according to claim 15, wherein the passage selector plate is disposed in the air cleaner case, the thermosensitive driving means is disposed on the outer surface of a side wall of the air cleaner case, and a shutoff valve is placed in the cooling water circulating passage through which cooling water is circulated through the heat exchanger to open and close the cooling water circulating passage according to the temperature of the cooling water flowing through the cooling water circulating passage.

18. The air heater according to claim 17, wherein the temperature sensor of the thermosensitive driving means is a wax type temperature sensor capable of expanding and contracting according to the variation of the temperature of intake air.

19. The air heater according to claim 18, wherein the passage selector plate is capable of swinging in the dust chamber between a heating passage closing position where the passage selector plate covers a first part of the opening opening into the dust chamber, corresponding to the heat exchanger and opens a second part of the opening directly opening into the dust chamber, and a heating passage opening position where the passage selector plate is separated from the first part of the opening and covers the second part of the opening.

20. The air heater according to claim 18, wherein the passage selector plate is disposed at an inlet end of the heating passage defined by the heat exchanger case and is capable of being turned between a heating passage opening position where the passage selector plate opens the heating passage and closes the bypass passage, and a heating passage closing position where the passage selector plate closes the heating passage and opens the bypass passage.

21. The air heater according to claim 17, wherein the cooling water circulating passage through which the cooling water is circulated through the heat exchanger is a bypass passage bypassing a radiator to circulate the cooling water continuously while the internal combustion engine is in operation.

* * * * *